United States Patent
Kawasaki et al.

(10) Patent No.: US 12,052,783 B2
(45) Date of Patent: Jul. 30, 2024

(54) USER APPARATUS FOR PERFORMING A REGISTRATION PROCEDURE

(71) Applicants: SHARP KABUSHIKI KAISHA, Sakai (JP); FG Innovation Company Limited, Tuen Mun (HK)

(72) Inventors: Yudai Kawasaki, Sakai (JP); Masafumi Aramoto, Sakai (JP); Yasuo Sugawara, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 393 days.

(21) Appl. No.: 17/295,228

(22) PCT Filed: Nov. 15, 2019

(86) PCT No.: PCT/JP2019/044795
§ 371 (c)(1),
(2) Date: May 19, 2021

(87) PCT Pub. No.: WO2020/105546
PCT Pub. Date: May 28, 2020

(65) Prior Publication Data
US 2022/0007444 A1    Jan. 6, 2022

(30) Foreign Application Priority Data
Nov. 19, 2018 (JP) ................. 2018-216495

(51) Int. Cl.
*H04W 76/15* (2018.01)
*H04W 60/00* (2009.01)
*H04W 76/34* (2018.01)

(52) U.S. Cl.
CPC ........... *H04W 76/15* (2018.02); *H04W 60/00* (2013.01); *H04W 76/34* (2018.02)

(58) Field of Classification Search
CPC ..... H04W 76/15; H04W 60/00; H04W 76/34; H04W 76/11; H04W 76/12; H04W 48/18
See application file for complete search history.

(56) References Cited

U.S. PATENT DOCUMENTS

2018/0227743 A1    8/2018 Faccin et al.
2020/0336937 A1 *  10/2020 Youn ............... H04W 76/12
(Continued)

FOREIGN PATENT DOCUMENTS

| CN | 108462735 A | 8/2018 |
| CN | 108696950 A | 10/2018 |

(Continued)

OTHER PUBLICATIONS

Huawei S2-179524: Terminology realization and SLA simplification for network slicing Dec. 2017 (Year: 2017).*

(Continued)

*Primary Examiner* — Rina C Pancholi
(74) *Attorney, Agent, or Firm* — ScienBiziP, P.C.

(57) ABSTRACT

The present invention provides a communication method for realizing a function for URLLC that requires high-reliability and/or low-latency communication in a 5GS. A user apparatus can provide a communications method capable of realizing a URLLC function in a 5GS by performing the communication method, which comprises: receiving, in a registration procedure, a registration accept messages including DNN and S-NSSAI for URLLC; receiving, in a first PDU session establishment procedure, a PDU session establishment accept messages including information indicating that an SSC mode for a PDU session for URLLC is SSC mode 1; and transmitting, in a second PDU session establishment procedure, a PDU session establishment request messages including information indicating that the SSC mode for the PDU session for URLLC is SSC mode 1.

10 Claims, 9 Drawing Sheets

(56) References Cited

U.S. PATENT DOCUMENTS

2021/0037585 A1* 2/2021 Youn .................... H04W 76/30
2021/0153286 A1* 5/2021 Park .................... H04W 76/22

FOREIGN PATENT DOCUMENTS

| WO | 2018/206080 A1 | 11/2018 | |
| WO | WO-2018206080 A1 * | 11/2018 | ............ H04W 48/18 |
| WO | 2020105547 A1 | 5/2020 | |

OTHER PUBLICATIONS

3GPP TS 23.501 V15.3.0 (Sep. 2018) 3rd Generation Partnership Project; Technical Specification Group Services and System Aspects; System Architecture for the 5G System; Stage 2 (Release 15).

3GPP TS 23.502 V15.3.0 (Sep. 2018) 3rd Generation Partnership Project; Technical Specification Group Services and System Aspects; Procedures for the 5G System; Stage 2 (Release 15).

3GPP TR 23.725 V1.1.0 (Oct. 2018) 3rd Generation Partnership Project; Technical Specification Group Services and System Aspects; Study on enhancement of Ultra-Reliable Low-Latency Communication (URLLC) support in the 5G Core network (5GC) (Release 16).

Huawei, HiSilicon: "Terminology rationalisation and SLA simplification for network slicing", S2-179524, (Dec. 4, 2017) SA WG2 Meeting #124, Nov. 27-Dec. 1, 2017 Reno, U.S. of America.

Huawei et al. "OI#4b: TS 23.501: Network slicing interworking with eDécor", 3GPP Draft; S2-177319 TS23.502_Network Slicing Interworking With E Cor V1.0, 3rd Generation Partnership Project (3GPP), Mobile Competence Centre ; 650, Route Des Lucioles ; F-06921 Sophia-Antipolis CE vol. SA WG2, No. Ljubljana, Slovenia; Oct. 17, 2017 (Oct. 17, 2017), * paragraph [4.2.2.2.2] *.

"3rd Generation Partnership Project; Technical Specification Group Services and System Aspects; Study on 5GS Enhanced support of Vertical and LAN Services (Release 16)", 3GPP Standard; Technical, Report; 3GPP TR 23.734, 3rd Generation Partnership Project (3GPP), Mobile Competence Centre; 650, Route Des Lucioles; F-06921 Sophia-Antipolis Cedex; France, No. V0.3.0, Oct. 31, 2018 (Oct. 31, 2018), pp. 1-94, XP051487721, [retrieved on Oct. 31, 2018], * paragraph [6.23.2] *.

Huawei, HiSilicon, "Setting PDU session ID and S-NSSAI during PDU session establishment upon mobility from EPS to 5GS", C1-181357, 3GPP TSG-CT WG1 Meeting #109, Montreal (Canada), Feb. 26-Mar. 2, 2018 (Feb. 19, 2018).

* cited by examiner

USER APPARATUS FOR PERFORMING A REGISTRATION PROCEDURE

CROSS-REFERENCE TO RELATED APPLICATION

The present application claims priority based on Japanese Patent Application No. 2018-216495 filed on Nov. 19, 2018, the content of which is incorporated herein by reference.

FIELD

The present invention relates to a user apparatus.

BACKGROUND

In the 3rd Generation Partnership Project (3GPP), studies related to a system architecture of the next generation, i.e., a fifth generation, mobile communication system (i.e., 5G System; 5GS), have been started, and supports for new procedures and new functions have been discussed (refer to NPL 1 and NPL 2). In a 5GS, a 5G core network (5GC) has also been studied as a new core network in order to provide various services. In addition, discussions of the support for URLLC (Ultra-Reliable and Low Latency communications) that requires high-reliability and/or low-latency communication in 5GS have also been started (refer to NPL 3).

PRIOR ART LITERATURE

Non-Patent Literature

NPL 1: 3GPP TS 23.501 V15.3.0 (2018-09); 3rd Generation Partnership Project; Technical Specification Group Services and System Aspects; System Architecture for the 5G System; Stage 2 (Release 15)

NPL 2: 3GPP TS 23.502 V15.3.0 (2018-09); 3rd Generation Partnership Project; Technical Specification Group Services and System Aspects; Procedures for the 5G System; Stage 2 (Release 15)

NPL 3: 3GPP TR 23.725 V1.1.0 (2018-10); 3rd Generation Partnership Project; Technical Specification Group Services and System Aspects; Study on enhancement of Ultra-Reliable Low-Latency Communication (URLLC) support in the 5G Core network (5GC) (Release 16)

SUMMARY

Technical Problem

However, how to implement URLLC in 5GS is still in a study stage and is not clear. Particularly, it is not clear what kind of procedures and information will be exchanged to realize a function for URLLC.

One embodiment of the present invention has been made in view of the above circumstance, and the objective of the present invention is to provide a method for realizing a function for URLLC in a 5GS.

Solution to Problem

A user apparatus according to an embodiment of the present invention is characterized in that the user apparatus comprises a control unit configured to perform a registration procedure, and a transmission/reception unit configured to receive a registration accept message including a DNN (Data Network Name) and an S-NSSAI (Single Network Slice Selection Assistance information) for URLLC in the registration procedure.

Invention Effect

According to an embodiment of the present invention, a function for URLLC in a 5GS can be used.

DETAILED DESCRIPTION OF THE PREFERRED EMBODIMENTS

Hereinafter, various embodiments for implementing the present invention will be described after describing many common parts in various embodiment, mobile communication systems, configurations of each apparatus, terms/identification information and procedures used in the various embodiments.

1. Mobile Communication System Overview

Here, a mobile communication system will be described.

Figure 1:
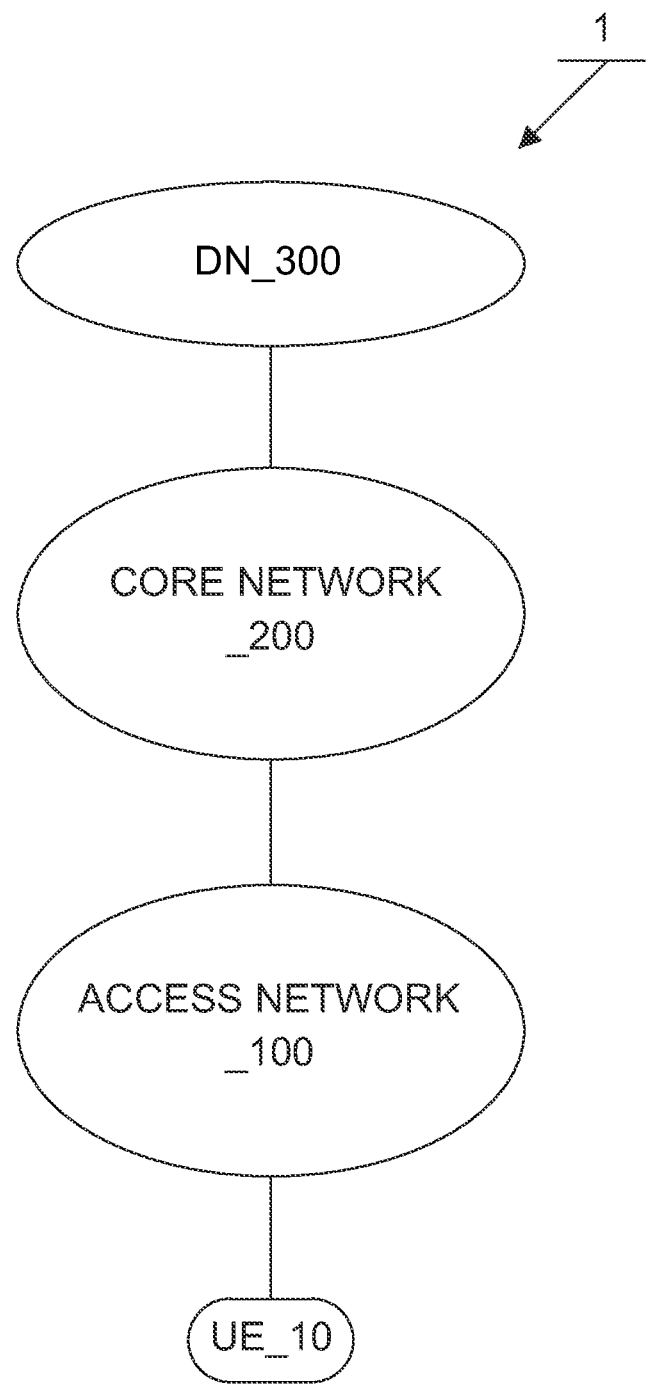
FIG. 1 is a schematic diagram illustrating a mobile communication system.
Figure 2:
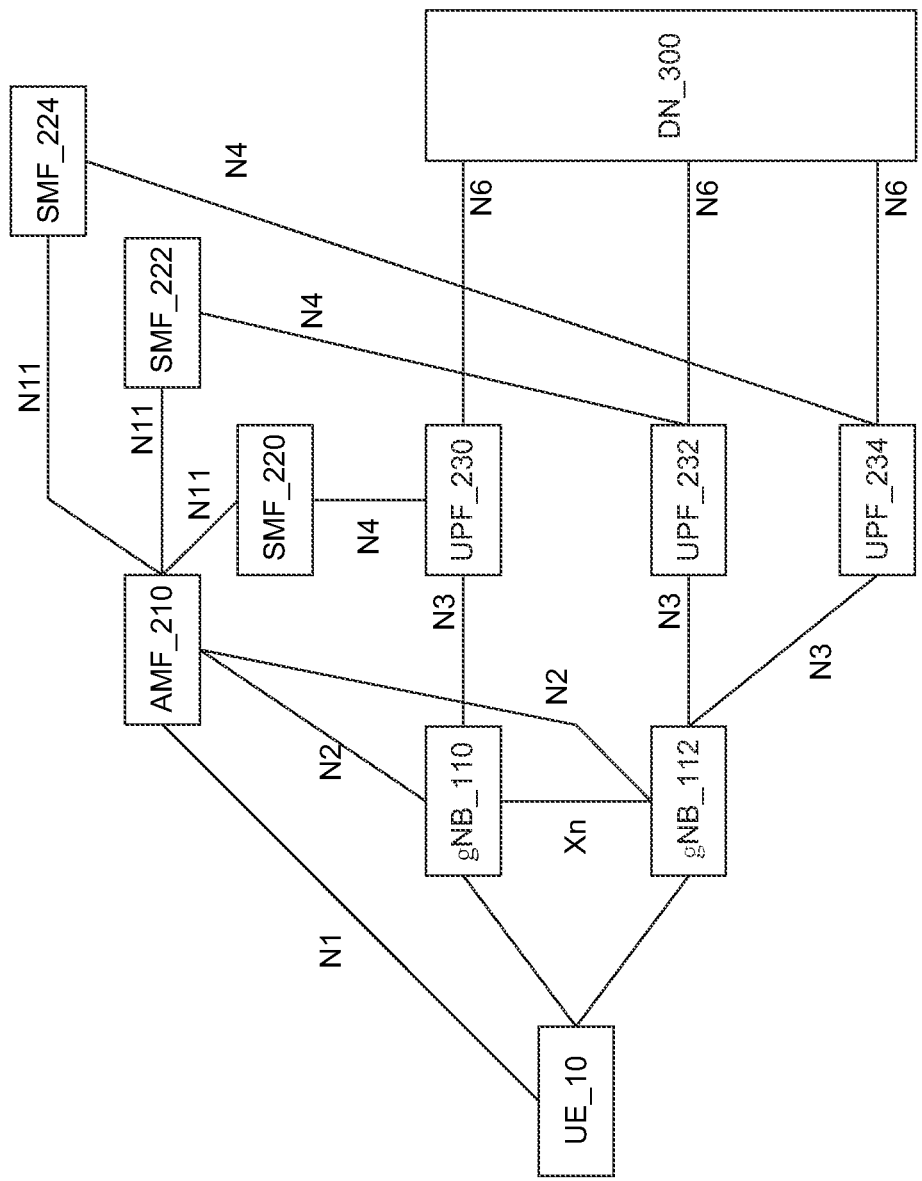
FIG. 2 is a diagram illustrating a detailed configuration of the mobile communication system.

First, FIG. 1 is a schematic diagram illustrating a mobile communication system 1, and FIG. 2 is a diagram illustrating a detailed configuration of the mobile communication system 1. Further, in the first to fourth embodiments described later, the mobile communication system 1 shown in FIG. 1 and FIG. 2 is used.

In FIG. 1, the communication system 1 includes a user apparatus (i.e., UE (User Equipment)_10), an access network_100, a core network_200, and a DN (Data Network)_300. Further, these apparatuses and networks may be described with symbols omitted, such as a UE, an access network, a core network, a DN, and the like.

Further, in FIG. 2, apparatuses and network functions such as a UE_10, a gNB (gNodeB)_110, a gNB_112, an AMF (Access and Mobility Management Function)_210, an SMF (Session Management Function)_220, an SMF_222, an SMF_224, a UPF (User Plane Function)_230, a UPF (User Plane Function)_232, a UPF_234, a DN_300, and interfaces for connecting these apparatuses and network functions to each other are described. Further, these apparatuses and network functions may be described with symbols omitted, such as a UE, a gNB, an AMF, an SMF, a UPF, a DN, and the like. In addition, the gNB_110 is sometimes referred to as a master gNB or a primary base station, and the gNB_112 is sometimes referred to as a secondary gNB or a secondary base station.

Figure 3:
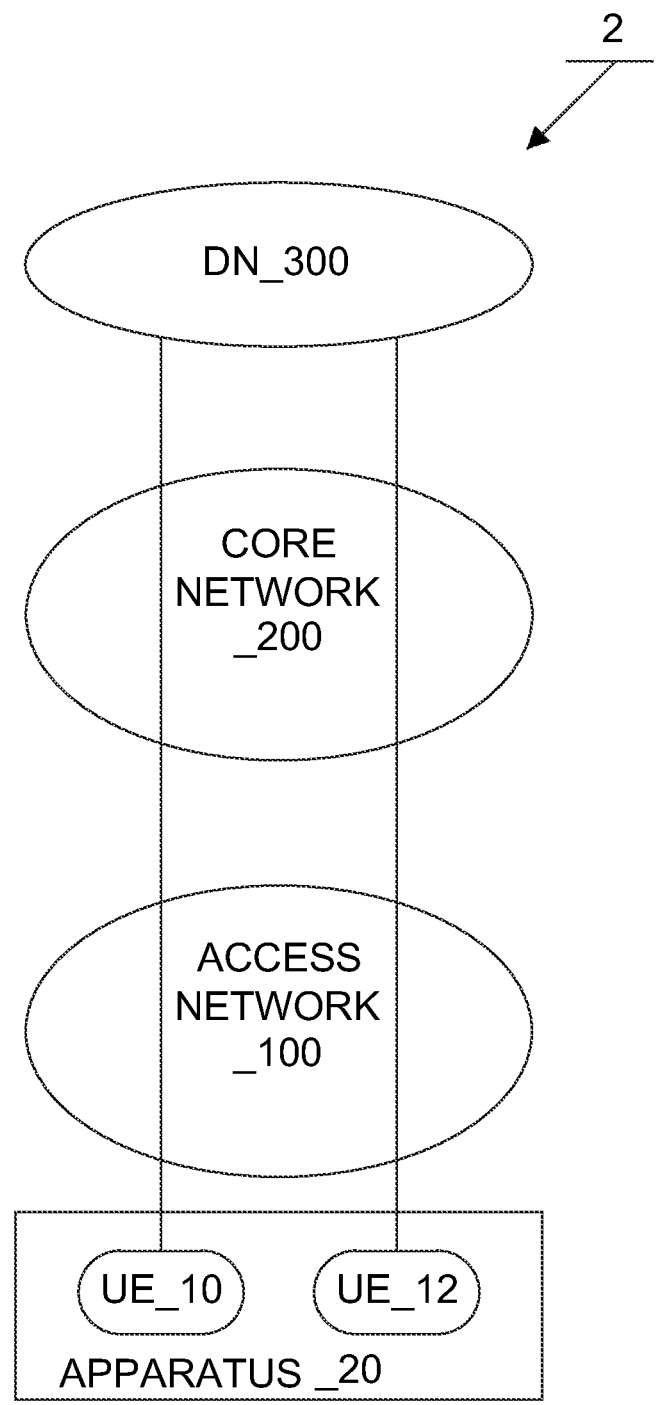
FIG. 3 is a schematic diagram illustrating a mobile communication system.
Figure 4:
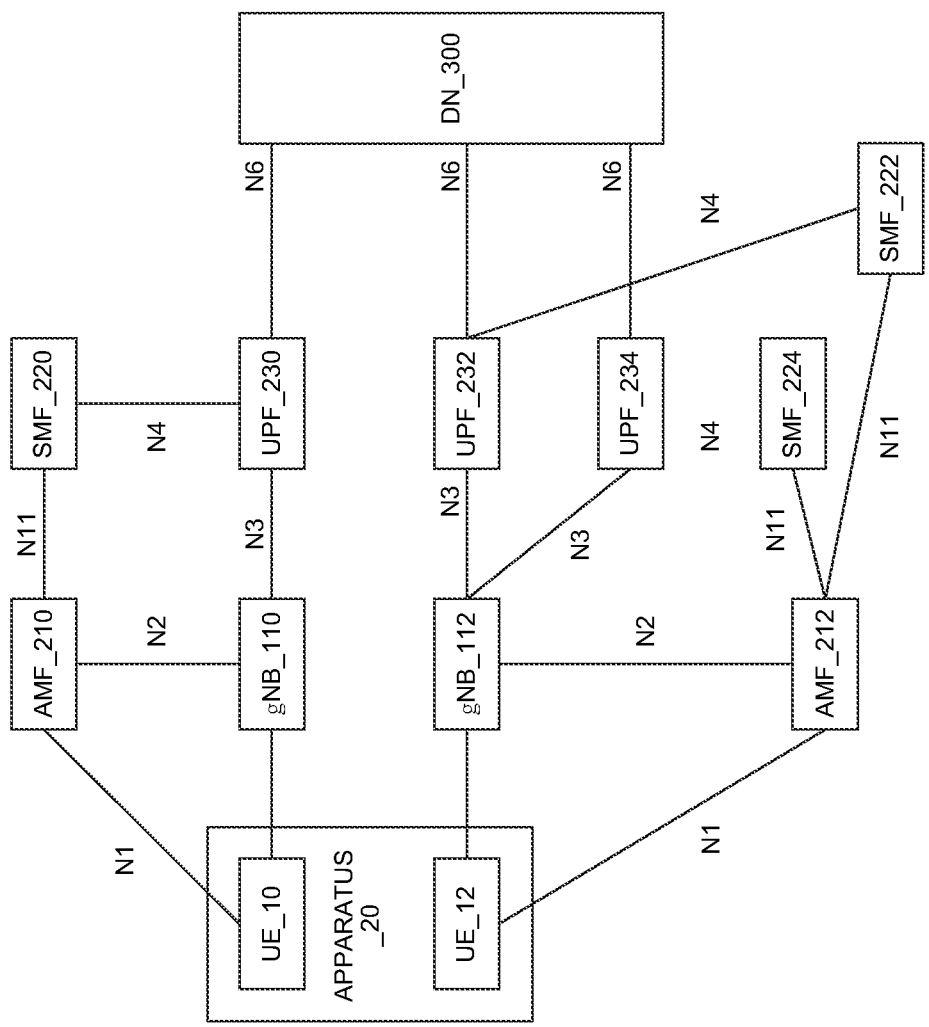
FIG. 4 is a diagram illustrating details of the mobile communication system illustrated in FIG. 3.

Furthermore, FIG. 3 is a schematic diagram illustrating a mobile communication system 2, and FIG. 4 is a diagram illustrating a detailed configuration of the mobile communication system 2. In addition, in the fifth to eighth embodiments described later, the mobile communication system 2 shown in FIG. 3 and FIG. 4 is used.

In FIG. 3, the communication system 2 includes a UE_10, a UE_12, an apparatus_20, an access network_100, a core network_200, and a DN_300. In addition, these apparatuses and networks may be described with symbols omitted, such as a UE, an apparatus, an access network, a core network, a DN, and the like.

Further, in FIG. 4, apparatuses and network functions such as a UE_10, a UE_12, an apparatus_20, a gNB_110, a gNB_112, an AMF_210, an AMF_212, an SMF_220, an SMF_222, an SMF_224, a UPF_230, a UPF_232, a UPF_232, a DN_300, and interfaces for connecting these apparatuses and network functions are described. In addition, these apparatuses and network functions may be described with symbols omitted, such as a UE, an apparatus, a gNB, an AMF, an SMF, a UPF, a DN, and the like.

In addition, a system serving as a 5G system (5GS) may include a UE, an access network, and a core network, and may further include a DN.

A UE is an apparatus capable of connecting to a network service via a 3GPP access (also referred to as a 3GPP access network or a 3GPP AN) and/or a non-3GPP access (also referred to as a non-3GPP access network or a non-3GPP AN). The UE may be a terminal apparatus, such as a mobile phone or a smart phone, capable of performing wireless communication, or may be a terminal apparatus capable of connecting to an EPS (Evolved Packet System) or connecting to a 5GS. The UE may also be provided with a UICC (Universal Integrated Circuit Card) or an eUICC (Embedded UICC). In addition, the UE may be expressed as a user apparatus or may also be expressed as a terminal apparatus.

Further, the access network may be referred to as a 5G access network (5G AN). The 5G AN includes an NG-RAN (NG Radio Access Network) and/or a non-3GPP access network. The NG-RAN is provided with one or more gNBs. The gNB is a node that provides a UE with an NR (New Radio) user plane and control plane, and is a node connected to a 5GC via an NG interface (including an N2 interface or an N3 interface). That is, the gNB is a base station apparatus newly designed for the 5GS and provides a function different from that of a base station apparatus (eNB) used for the EPS of the 4G system. Besides, in a case that there is a plurality of gNBs, the gNBs are connected to each other through, for example, an Xn interface.

Further, hereinafter, an NG-RAN is sometimes referred to as a 3GPP access. Furthermore, a wireless Local Area Network (LAN) access network or a non-3GPP AN is sometime referred to as a non-3GPPP access. In addition, a node provided in the access network may be collectively referred to as an NG-RAN node.

Further, hereinafter, the access network and/or an apparatus included in the access network apparatus may be referred to as an access network apparatus.

Besides, the core network corresponds to a 5GC (5G Core Network). In the 5GC, for example, an AMF, a UPF, an SMF, and the like are deployed. Here, the 5GC may be expressed as a 5GCN (5G Core Network).

Further, hereinafter, the core network and/or an apparatus included in the core network may be referred to as a core network apparatus.

The core network may be an Internet Protocol (IP) mobile communication network connected with an access network and a DN and operated by an MNO (Mobile Network Operator), may be a core network provided by a mobile communication operator for operating and managing the mobile communication system 1, or may be a core network provided by a virtual mobile communication operator or a virtual mobile communication service provider such as an MVNO (Mobile Virtual Network Operator) or an MVNE (Mobile Virtual Network Enabler).

Furthermore, the DN may also be a DN that provides a communication service to the UE. The DN may be configured as a packet data service network or may be configured separately for each service. Also, the DN may also include a connected communication terminal. Therefore, the connection to the DN may be a connection to a communication terminal or a server apparatus deployed in the DN. Furthermore, transmission/reception of user data to and/or from the DN may be transmission/reception of user data to and/or from a communication terminal or a server apparatus deployed in the DN.

Besides, hereinafter, at least one part of the access network, the core network, and the DN and/or one or more apparatuses included therein may be referred to as a network or a network apparatus. That is, the expression that the network and/or the network apparatus transmits and/or receives a message and/or performs a procedure means that at least one part of the access network, the core network, and the DN and/or one or more apparatuses included therein transmit and/or receive a message and/or perform a procedure.

Besides, the UE can connect to an access network. Besides, the UE can connect to a core network via an access network. Besides, the UE can connect to a DN via an access network and a core network. That is, the UE can transmit and/or receive (communicate) user data to and/or from (with) the DN. When user data is transmitted and/or received, not only an IP (Internet Protocol) communication but also a non-IP communication may be used.

Here, the IP communication means a data communication that uses IP, and data is transmitted and/or received by IP packets. An IP packet includes an IP header and a payload portion. The payload portion may include data transmitted and/or received by apparatuses and functions included in the EPS or by apparatuses and functions included in the 5GS. Besides, the non-IP communication means a data communication that does not use IP, and data is transmitted and/or received through a form different from the configuration of an IP packet. For example, the non-IP communication may also be data communication implemented by transmitting and/or receiving application data with no IP header given, or may be transmission/reception of user data transmitted and/or received by the UE with another header such as a MAC header, an Ethernet (registered trademark) frame header, or the like given.

2. Configuration of Each Apparatus

Next, the configuration of each apparatus (UE, and/or access network apparatus, and/or core network apparatus) used in each embodiment will be described with reference to drawings. In addition, each apparatus may be configured as physical hardware, logical (virtual) hardware implemented on general-purpose hardware, or software. Besides, at least one part (including all parts) of functions included by each apparatus may be configured as physical hardware, logical hardware, or software.

In addition, each storage unit (e.g., storage unit_430, storage unit_540, storage unit_640, or storage unit_730) in each of the apparatuses and functions described below may be, for example, a semiconductor memory, an SSD (Solid State Drive), an HDD (Hard Disk Drive), or the like. Besides, each storage unit can store not only information originally set from the shipment stage, but also various kinds of information transmitted and/or received to and/or from other apparatuses/functions (for example, UEs, and/or access network apparatuses, and/or core network apparatuses, and/or Packet Data Networks (PDNs), and/or DNs) other than its own apparatus/function. Further, each storage unit can store identification information, control information, flags, parameters, etc. included in control messages transmitted and/or received in various communication procedures described later. Further, each storage unit may store the information for each UE.

2.1. Apparatus Configuration of UE

Figure 5:
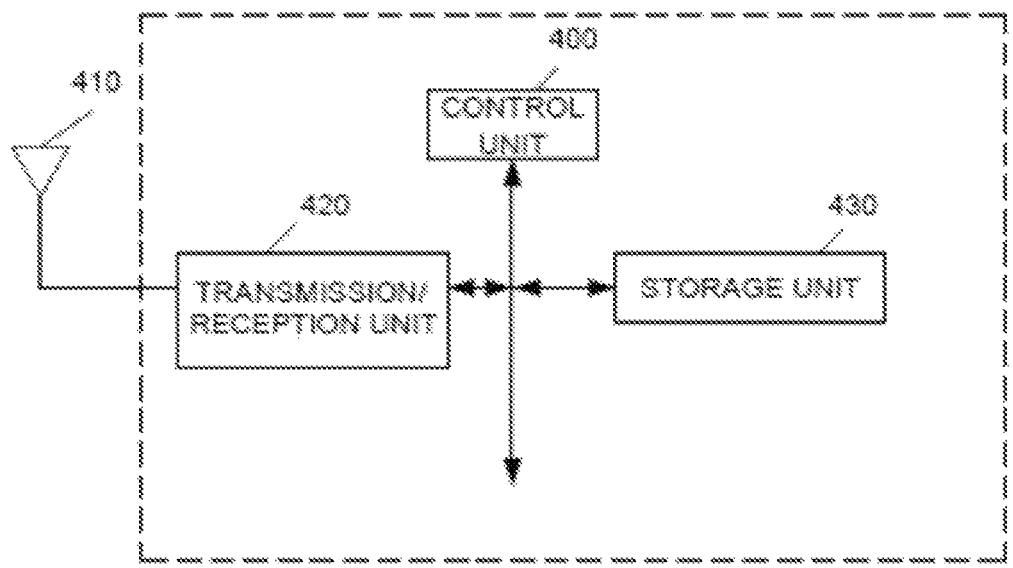
FIG. 5 is a diagram illustrating an apparatus configuration of a UE (User Equipment).

FIG. 5 is a diagram illustrating an apparatus configuration of a UE. First, an example of an apparatus configuration of a UE used in each embodiment will be described with reference to FIG. 5. The UE includes a control unit_400, an antenna_410, a transmission/reception unit_420, and a storage unit_430. The control unit_400, the transmission/reception unit_420, and the storage unit_430 are connected via a bus. The transmission/reception unit_420 is connected to the antenna 410.

The control unit_400 is a functional unit that controls operations and functions of the entire UE. In addition, the control unit_400 may process all functions that other functional units (e.g., the transmission/reception unit_420 and the storage unit_430) in the UE do not have. The control unit_400 can implement various processes of the UE by reading and executing various programs stored in the storage unit_430 as needed.

The transmission/reception unit_420 is a functional unit for performing a wireless communication, via the antenna_410, with a base station apparatus (e.g., gNB) located within the access network. That is, the UE can transmit and/or receive user data and/or control information to and/or from the access network apparatus and/or the core network apparatus and/or the DN by using the transmission/reception unit_420.

As illustrated in detail with reference to FIG. 2, the UE can communicate with the base station apparatus (gNB) located within the 5G AN by using the transmission/reception unit_420. Besides, the UE can transmit and/or receive AMF and NAS (Non-Access-Stratum) messages via the N1 interface by using the transmission/reception unit_420. However, since the N1 interface is a logical interface, the communication between the UE and the AMF is performed via the gNB located within the 5G AN.

The storage unit_430 is a functional unit for storing programs, user data, control information, and the like required for each operation of the UE.

2.2. Apparatus Configuration of gNB

Figure 6:
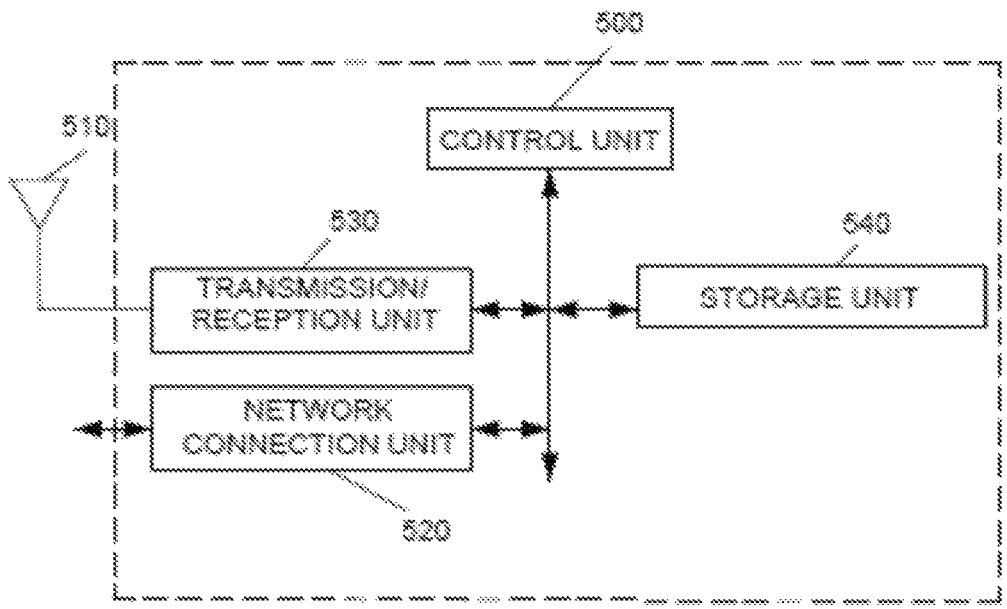
FIG. 6 is a diagram illustrating a configuration of an access network apparatus (gNB) in a 5GS.

FIG. 6 is a diagram illustrating a configuration of an access network apparatus (gNB) in a 5GS. Next, an example of an apparatus configuration of a gNB used in each embodiment will be described with reference to FIG. 6. The gNB includes a control unit_500, an antenna_510, a network connection unit_520, a transmission/reception unit_530, and a storage unit_540. The control unit_500, the network connection unit_520, the transmission/reception unit_530, and the storage unit_540 are connected via a bus. The transmission/reception unit_530 is connected to the antenna_510.

The control unit_500 is a functional unit that controls operations and functions of the entire gNB. In addition, the control unit_500 may process all functions that other functional units (e.g., the network connection unit_520, the transmission/reception unit_520 and the storage unit_540) in the gNB do not have. The control unit_500 can implement various processes of the gNB by reading and executing various programs stored in the storage unit_540 as needed.

The network connection unit_520 is a functional unit used for the gNB to communicate with the AMF and/or the UPF. That is, the gNB can transmit and/or receive user data and/or control information to and/or from the AMF and/or the UPF by using the network connection unit_520.

The transmission/reception unit_530 is a functional unit for performing a wireless communication, via the antenna_510, with the UE. That is, the gNB can transmit and/or receive user data and/or control information to and/or from the UE by using the transmission/reception unit_530.

As illustrated in detail with reference to FIG. 2, the gNB located within the 5G AN can communicate with the AMF via the N2 interface and can communicate with the UPF via the N3 interface by using the network connection unit_520. Besides, the gNB can communicate with the UE by using the transmission/reception unit_530.

The storage unit_540 is a functional unit for storing programs, user data, control information, and the like required for each operation of the gNB.

2.3. Apparatus Configuration of AMF

Figure 7:
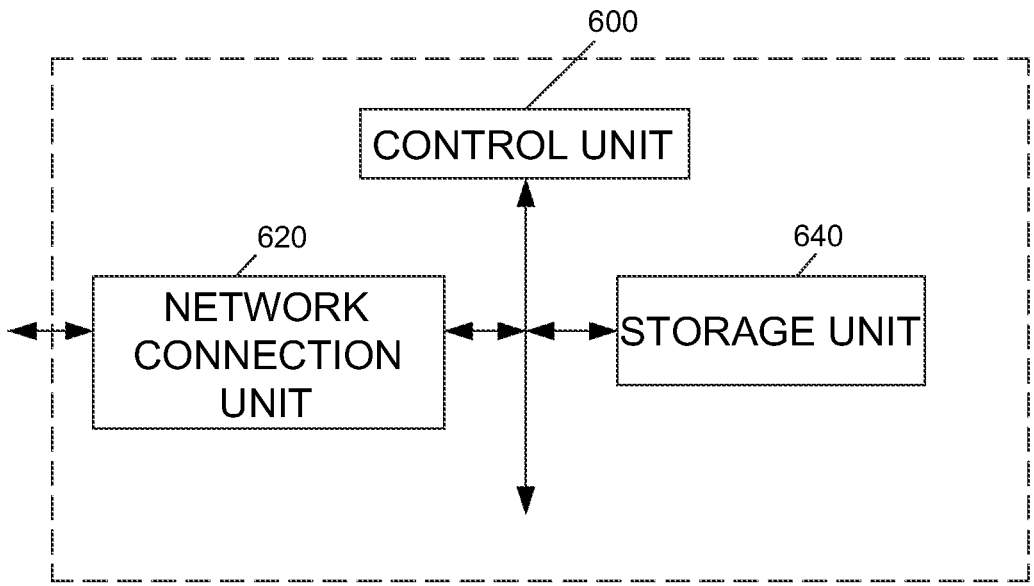
FIG. 7 is a diagram illustrating a configuration of a core network apparatus in a 5GS.

FIG. 7 is a diagram illustrating a configuration of a core network apparatus in a 5GS. Next, an example of an apparatus configuration of an AMF used in each embodiment will be described with reference to FIG. 7. The AMF includes a control unit_600, a network connection unit_620, and a storage unit_640. The control unit_600, the network connection unit_620, and the storage unit_640 are connected via a bus. The AMF can also be a node for dealing with a control plane.

The control unit_600 is a functional unit that controls operations and functions of the entire AMF. In addition, the control unit_600 may process all functions that other functional units (e.g., network connection unit_620 and the storage unit_640) in the AMF do not have. The control unit_600 can implement various processes of the AMF by reading and executing various programs stored in the storage unit_640 as needed.

The network connection unit_620 is a functional unit used for the AMF to connect with a base station apparatus (gNB) located within the 5G AN, and/or an SMF, and/or a Policy Control Function (PCF), and/or a UDM, and/or an SCEF. That is, the AMF can transmit and/or receive user data and/or control information to and/or from the base station apparatus (gNB) located within the 5G AN, and/or the SMF, and/or the PCF, and/or the UDM, and/or the SCEF by using the network connection unit_620.

As illustrated in detail with reference to FIG. 2, the AMF located within the 5GC, by using the network connection unit_620, can communicate with the gNB via an N2 interface, communicate with the UDM via an N8 interface, communicate with SMF via an N11 interface, and communicate with the PCF via an N15 interface. Besides, the AMF can transmit and/or receive a NAS message to and/or from the UE via the N1 interface by using the network connection unit_620. However, since the N1 interface is a logical interface, the communication between the UE and the AMF is performed via the 5G AN.

The storage unit_640 is a functional unit for storing programs, user data, control information, and the like required for each operation of the AMF.

Besides, the AMF includes a function for exchanging a control message with a RAN by using the N2 interface, a function for exchanging a NAS message with a UE by using the N1 interface, a function for performing encryption and integrity protection for a NAS message, a registration management (RM) function, a connection management (CM) function, a reachability management function, a mobility management function for UEs, a function for forwarding an SM (session management) message between a UE and an SMF, an access authentication function, security anchor functionality (SEA), a security context management (SCM) function, a function for supporting the N2 interface for N3IWF (non-3GPP interworking function), a function for supporting transmission and reception of NAS signals with a UE via the N3IWF, and a function for authenticating a UE connected via the N3IWF.

Further, in the registration management, a RM state of each UE is managed. The RM state may also be synchronized between the UE and the AMF. The RM state includes a deregistered state (RM-DEREGISTERED state) and a registered state (RM-REGISTERED state). In the RM-DEREGISTERED state, the UE is not registered with the network, and the UE context in the AMF does not have valid location information or routing information for the UE, so the AMF cannot reach the UE. In the RM-REGISTERED state, the UE is registered with the network, so the UE can receive services that require registration with the network. Besides, the RM state may also be expressed as a 5GMM state. In this case, the RM-DEREGISTERED state may be expressed as a 5GMM-DEREGISTERED state, and the RM-REGISTERED state may be expressed as a 5GMM-REGISTERED state.

In other words, the 5GMM-REGISTERED state may be a state in which each apparatus has established a 5GMM context or may also be a state in which a PDU session context has been established. In addition, in a case that each apparatus is 5GMM-REGISTERED, the UE_10 may start transmitting and/or receiving user data or control messages or may also respond to paging. Further, in a case that each apparatus is 5GMM-REGISTERED, the UE_10 may perform a registration procedure other than the registration procedure for initial registration and/or a service request procedure.

Furthermore, the 5GMM-DEREGISTERED state may be a state in which each apparatus has not established a 5GMM context, may also be a state in which the location information of the UE_10 is not known to the network, or may also be a state in which the network cannot reach the UE_10. In addition, in a case that each apparatus is 5GMM-DEREGISTERED, the UE_10 may also initiate a registration procedure or may also establish a 5GMM context by performing a registration procedure.

Besides, in the connection management, a CM state of each UE is managed. The CM state may also be synchronized between the UE and the AMF. The CM state includes a non-connected state (CM-IDLE state) and a connected state (CM-CONNECTED state). In the CM-IDLE state, the UE stays in the RM-REGISTERED state, but does not have a NAS signaling connection established with the AMF via the N1 interface. Further, in the CM-IDLE state, the UE does not have an N2 interface connection (N2 connection) or an N3 interface connection (N3 connection). On the other hand, in the CM-CONNECTED state, the UE has a NAS signaling connection established with the AMF via the N1 interface. Further, in the CM-CONNECTED state, the UE may have an N2 interface connection (N2 connection) and/or an N3 interface connection (N3 connection).

Furthermore, in the connection management, a CM state in 3GPP access and a CM state in non-3GPP access may be managed separately. In this case, the CM state in 3GPP access may include a non-connected state in 3GPP access (CM-IDLE state over 3GPP access) and a connected state in 3GPP access (CM-CONNECTED state over 3GPP access). Further, the CM state in non-3GPP access may include a non-connected state in non-3GPP access (CM-IDLE state over non-3GPP access) and a connected state in non-3GPP access (CM-CONNECTED state over non-3GPP access). In addition, the non-connected state may also be expressed as an idle mode, and the connected state may also be expressed as a connected mode.

In addition, the CM state may also be expressed as a 5GMM mode. In this case, the non-connected state may also be expressed as a 5GMM non-connected mode (5GMM-IDLE mode), and the connected state may also be expressed as a 5GMM connected mode (5GMM-CONNECTED mode). Furthermore, the non-connected state in 3GPP access may be expressed as a 5GMM non-connected mode in 3GPP access (5GMM-IDLE mode over 3GPP access), and the connected state in 3GPP access may be expressed as a 5GMM-connected mode in 3GPP access (5GMM-CONNECTED mode over 3GPP access). Furthermore, the non-connected state in non-3GPP access may be expressed as a 5GMM non-connected mode in non-3GPP access (5GMM-IDLE mode over non-3GPP access), and the connected state in non-3GPP access may be expressed as a 5GMM-connected mode in non-3GPP access (5GMM-CONNECTED mode over non-3GPP access). In addition, the 5GMM non-connected mode may also be expressed as an idle mode, and the 5GMM connected mode may also be expressed as a connected mode.

Further, one or more AMFs may be deployed within the core network. Further, the AMF may be an NF that manages one or more network slice instances (NSIs). In addition, the AMF may also be a common control plane network function (CCNF; Common CPNF) shared among a plurality of NSIs.

In addition, the N3IWF is an apparatus and/or a function deployed between a non-3GPP access and a 5GC in a case that the UE is connected to the 5GS via the non-3GPP access.

2.4. Apparatus Configuration of SMF

Next, an example of an apparatus configuration of an SMF used in each embodiment will be described with reference to FIG. 7. The SMF includes a control unit_600, a network connection unit_620, and a storage unit_640. The control unit_600, the network connection unit_620, and the storage unit_640 are connected via a bus. The SMF can also be a node for dealing with a control plane.

The control unit_600 is a functional unit that controls operations and functions of the entire SMF. In addition, the control unit_600 may process all functions that other functional units (e.g., network connection unit_620 and the storage unit_640) in the SMF do not have. The control unit_600 can implement various processes of the SMF by reading and executing various programs stored in the storage unit_640 as needed.

The network connection unit_620 is a functional unit used for the SMF to connect with an AMF, and/or a UPF, and/or a PCF, and/or a UDM. That is, the SMF can transmit and/or receive user data and/or control information to and/or from the AMF, and/or the UPF, and/or the PCF, and/or the UDM by using the network connection unit_620.

As illustrated in detail with reference to FIG. 2, the SMF located within the 5GC, by using the network connection unit_620, can communicate with the AMF via an N11 interface, communicate with the UPF via an N4 interface, communicate with PCF via an N7 interface, and communicate with the UDM via an N10 interface.

The storage unit_640 is a functional unit for storing programs, user data, control information, and the like required for each operation of the SMF.

The SMF includes a session management function such as establishment, modification, cancellation of a PDU session, IP address allocation for the UE and a management function thereof, a UPF selection and control function, a UPF configuration function for routing traffic to an appropriate destination (transmission destination), a function for transmitting and/or receiving an SM portion of a NAS message, a function for reporting arrival of downlink data (Downlink Data Notification), a function for providing SM information unique to an AN (for each AN) to be transmitted to the AN over the N2 interface via the AMF, a function for determining a session and service continuity mode (SSC mode) for a session, a roaming function, and the like.

2.5. Apparatus Configuration of UPF

Next, an example of an apparatus configuration of an UPF used in each embodiment will be described with reference to FIG. 7. The UPF includes a control unit_600, a network connection unit_620, and a storage unit_640. The control unit_600, the network connection unit_620, and the storage unit_640 are connected via a bus. The UPF can also be a node for dealing with a control plane.

The control unit_600 is a functional unit that controls operations and functions of the entire UPF. In addition, the control unit_600 may process all functions that other functional units (e.g., network connection unit_620 and the storage unit_640) in the UPF do not have. The control unit_600 can implement various processes of the UPF by reading and executing various programs stored in the storage unit_640 as needed.

The network connection unit_620 is a functional unit used for the UPF to connect with the base station apparatus (gNB) located within the 5G AN, and/or the SMF, and/or the DN. That is, the UPF can transmit and/or receive user data and/or control information to and/or from the base station apparatus (gNB) located within the 5G AN, and/or the SMF, and/or the DN by using the network connection unit_620.

As illustrated in detail with reference to FIG. 2, the UPF located within the 5GC, by using the network connection unit_620, can communicate with the gNB via an N3 interface, communicate with the SMF via an N4 interface, communicate with DN via an N6 interface, and communicate with other UPF via an N9 interface.

The storage unit_640 is a functional unit for storing programs, user data, control information, and the like required for each operation of the UPF.

The UPF includes a function for serving as an anchor point for intra-RAT mobility or for inter-RAT mobility, a function for serving as an external PDU session point for a mutual connection to the DN (i.e., a function for serving as a gateway to forward user data between the DN and the core network), a packet routing and forwarding function, a UL CL (Uplink Classifier) function for supporting routing of a plurality of traffic flows for one DN, a branching point function for supporting a multi-homed PDU session, a quality of service (QoS) processing function for a user plane, a function for verifying an uplink traffic, a function for buffering downlink packets, a function for triggering a downlink data notification, and the like.

Further, the UPF may serve as a gateway for IP communication and/or non-IP communication. Furthermore, the UPF may also have a function of forwarding the IP communication or may have a function of performing conversion between the non-IP communication and the IP communication. Moreover, a plurality of deployed gateways may serve as gateways for connecting the core network to a single DN. In addition, the UPF may have connectivity with other NFs or may be connected to each apparatus via other NFs.

In addition, the user plane is user data transmitted and/or received between the UE and the network. The user plane may also be transmitted and/or received by using a PDU session. Further, in the case of a 5GS, the user plane may be transmitted and/or received by using an interface between the UE and the NG RAN, and/or an N3 interface, and/or an N9 interface, and/or an N6 interface. Hereinafter, the user plane may also be expressed as a U-Plane.

Moreover, the control plane is a control message transmitted and/or received to control the communication of the UE, and the like. The control plane may also be transmitted and/or received by using a NAS (Non-Access-Stratum) signaling connection between the UE and the AMF. Furthermore, in the case of a 5GS, the control plane may be transmitted and/or received by using an interface between the UE and the NG RAN, and an N2 interface. Hereinafter, the control plane may also be expressed as a Control Plane or may also be expressed as a C-Plane.

Further, a U-Plane (User Plane; UP) may be a communication path for transmitting and/or receiving user data and may include a plurality of bearers. Further, C-Plane (Control Plane; CP) may be a communication path for transmitting and/or receiving a control message and may include a plurality of bearers.

2.6. Configuration of Apparatus

Figure 8:
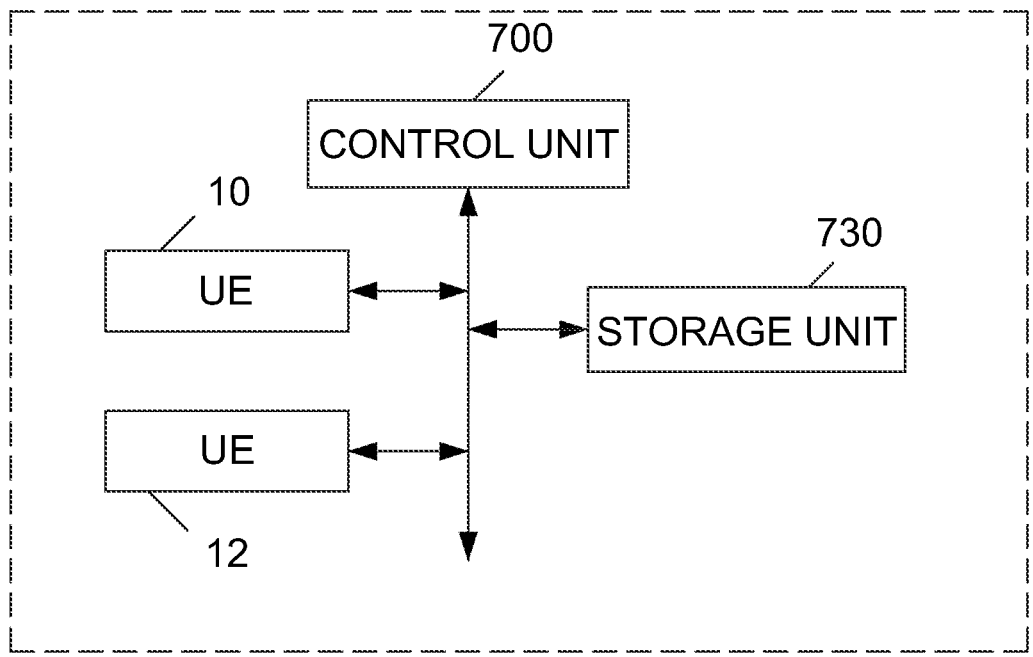
FIG. 8 is a diagram illustrating a configuration of an apparatus.

FIG. 8 is a diagram illustrating a configuration of an apparatus. Next, an example of a configuration of an apparatus in the second embodiment will be described with reference to FIG. 8. The apparatus includes at least two UEs (UE_10, UE_12), a control unit_700, and a storage unit_730. Each UE (UE_10, UE_12), the control unit_700, and the storage unit_730 may be connected via a bus.

The control unit_700 is a functional unit that controls operations and functions of the entire apparatus. In addition, the control unit_700 may process all functions that other functional units (e.g., the UE_10, UE_12 and the storage unit_730) in the apparatus do not have. The control unit_700 can implement various processes of the apparatus by reading and executing various programs stored in the storage unit_730 as needed.

Further, the control unit_700 can control communication based on the UE_10 and/or the UE_12. That is, the control unit_700 can control only the UE_10 to perform communication, control only the UE_12 to perform communication, or control both the UE_10 and the UE_12 to perform communication.

Further, the control unit_700 can control information to be exchanged between the UE_10 and the UE_12. At this time, the control unit_700 can control information to be exchanged between the UE_10 and the UE_12 via the storage unit_730. For example, the control unit_700 can control the UE_10 to store information acquired by performing various procedures in the storage unit_730 and control the UE_12 to use the information stored in the storage unit_730 when performing various procedures. Similarly, the control unit_700 can control the UE_12 to store information acquired by performing various procedures in the storage unit_730 and control the UE_10 to use the information stored in the storage unit_730 when performing various procedures. Further, the control unit_700 can also control information to be exchanged directly between the UE_10 and the UE_12 without going through the storage unit_730.

The storage unit_730 is a functional unit for storing programs, user data, control information, and the like required for each operation of the apparatus. Further, as described above, information of the UE_10 and information of the UE_12 may be stored in the storage unit_730.

3. Description of Highly Specialized Terms and Identification Information Used in Each Embodiment Next, highly specialized terms and identification information used in each embodiment will be described in advance.

3.1 Description of Highly Specialized Terms Used in Each Embodiment

First, highly specialized terms used in each embodiment will be described.

The network refers to at least one part of an access network, a core network, and a DN. Besides, one or more apparatuses included in at least one part of the access network, the core network, and the DN may also be referred to as a network or a network apparatus. That is, the expression that a network transmits and/or receives and/or processes a message may also mean that an apparatus (a network apparatus and/or a control apparatus) located within a network transmits and/or receives and/or processes a message. On the contrary, the expression that an apparatus located within a network transmits and/or receives and/or processes a message may also mean that a network transmits and/or receives and/or processes a message.

Besides, an SM (Session Management) message (also referred to as a NAS (Non-Access-Stratum) SM message) may be a NAS message used in a procedure for SM or may be a control message transmitted and/or received between a UE and an SMF via an AMF. Further, the SM message may include a PDU session establishment request message, a PDU session establishment accept message, a PDU session complete message, a PDU session reject message, a PDU session modification request message, a PDU session modification accept message, a PDU session modification response message, and the like. Further, the procedure for SM may also include a PDU session establishment procedure.

Further, a 5GS (5GS system) service may be a connection service provided by using the core network. Furthermore, the 5GS service may be a service different from an EPS service or may be a service that is the same with an EPS service.

Besides, a non-5GS service may be a service other than the 5GS service and may include an EPS service and/or a non-EPS service.

Moreover, an N1 mode is a mode in which the UE is allowed to access a 5GC via a 5G access network. In other words, the N1 mode may also be a mode in which a message can be transmitted and/or received by using the N1 interface.

Further, an APN (Access Point Name) may be identification information for identifying a core network and/or an external network such as a PDN. Further, the APN can also be used as information for selecting a gateway such as a PGW/UPF for connecting a core network.

In addition, a PDU (Protocol Data Unit or Packet Data Unit) session may be defined as the association between a DN, which provides a PDU connectivity service, and a UE, and may be the connectivity established between the UE and an external gateway. The UE can establish a PDU session via an access network and a core network in the 5GS and thus can transmit and/or receive user data to and/or from the DN by using the PDU session. Here, the external gateway may be a UPF, an SCEF, or the like. The UE can transmit and/or receive user data, by using a PDU session, to and/or from an apparatus such as an application server deployed in the DN.

In addition, each apparatus (UE, and/or access network apparatus, and/or core network apparatus) may manage one or more pieces of identification information associated with the PDU session. In addition, the identification information may include one or more of a DNN, a PDU session type, application identification information, NSI identification information, access network identification information, and an SSC mode, or may further include other information. Furthermore, in a case that a plurality of PDU sessions are established, the respective pieces of identification information associated with the PDU sessions may have the same content or different contents.

Besides, a DNN (Data Network Name) may be identification information for identifying a core network and/or an external network such as a DN. Further, the DNN can also be used as information for selecting a gateway such as a PGW/UPF for connecting a core network. Furthermore, the DNN may be equivalent to an APN (Access Point Name).

In addition, a PDU (Protocol Data Unit or Packet Data Unit) session type indicates the type of a PDU, and includes IPv4, IPv6, Ethernet (registered trademark), and Unstructured. In a case that IPv4 is specified, the IPv4 is used to transmit and/or receive data. In a case that IPv6 is specified, the IPv6 is used to transmit and/or receive data. In a case that Ethernet (registered trademark) is specified, an Ethernet (registered trademark) frame is transmitted and/or received. Besides, Ethernet (registered trademark) may indicate a communication in which IP is not used. In a case that Unstructured is specified, a point-to-point (P2P) tunneling technique is used to transmit and/or receive data to and/or from an application server or the like located in the DN. For the P2P tunneling technique, for example, a UDP/IP encapsulation technique may be used. In addition, the PDU session type may also include IP in addition to the above. IP can be specified in a case that the UE can use both IPv4 and IPv6. In addition, IP may be expressed as IPv4v6.

Besides, the network slice (NS) is a logical network that provides specific network capabilities and network characteristics. The UE and/or the network can support network slices (NW slices or NSs) in the 5GS.

Besides, a network slice instance (NSI) includes an instance (entity) of a network function (NF) and a set of required resources and forms a configured network slice. Here, NF refers to a processing function in the network, and is adopted or defined by the 3GPP. The NSI is an entity of one or more NFs included in a core network. In addition, the NSI may include a virtual NF (Network Function) generated by using an NST (Network Slice Template). Here, NST is a logical expression of one or more NFs and associated with a resource request for providing a required communication service or capability. In other words, the NSI may be an aggregation including a plurality of NFs in a core network. In addition, the NSI may be a logical network configured to classify user data delivered through a service or the like. The NS may also include one or more NFs. The NF included in the NS may or may not be an apparatus that is shared with other NS. The UE and/or an apparatus in the network can be allocated to one or more NSs based on NSSAI and/or S-NSSAI and/or UE usage type and/or registration information such as one or more NSI IDs and/or APNs. In addition, the UE usage type is a parameter value included in the registration information of the UE and used for identifying the NSI. The UE usage type may be stored in an HSS. The AMF may select the SMF and the UPF based on the UE usage type.

Besides, S-NSSAI (Single Network Slice Selection Assistance Information) is information for identifying an NS. The S-NSSAI may include only an SST (Slice/Service type) or may include both the SST and an SD (Slice Differentiator). Here, the SST is information indicating an operation of an NS expected in terms of function and service. Besides, the SD may be information interpolating the SST at the time when one NSI is selected from a plurality of NSIs indicated by the SST. The S-NSSAI may be information unique for each PLMN (Public Land Mobile Network) or may be standard information common among PLMNs. In addition, the network may store one or more S-NSSAI in registration information of the UE as default S-NSSAI. In addition, in a case that the S-NSSAI is default S-NSSAI, the network may provide an NS related to the UE when the UE does not transmit valid S-NSSAI to the network in a registration request message.

Further, NSSAI (Network Slice Selection Assistance Information) is a collection of S-NSSAI. Each piece of S-NSSAI included in the NSSAI is information assisting the access network or the core network to select an NSI. The UE may also store NSSAI allowed by the network for each PLMN. In addition, the NSSAI may be information for selecting an AMF.

Besides, an SSC (Session and Service Continuity) mode indicates a session and service continuity mode supported by a system and/or each apparatus in the 5G System (5GS). More specifically, the SSC mode may be a mode indicating a type of session and service continuity supported by a PDU session established between the UE and the UPF. Besides, the SSC mode may be a mode indicating a type of session and service continuity configured for each PDU session. Further, the SSC mode may include three modes, i.e., an SSC mode 1, an SSC mode 2, and an SSC mode 3. Besides, the SSC mode associated with the PDU session does not have to be changed while the PDU session continues.

In addition, the SSC mode 1 is a mode in which the network maintains a connectivity service provided to the UE. In addition, in a case that the PDU session type associated with the PDU session is IPv4 or IPv6, the IP address may be maintained when the session and service are continued.

Moreover, the SSC mode 1 may be a mode of the session and service continuity in which the same UPF is continuously maintained regardless of the access technology used by the UE when connecting to the network. More specifically, the SSC mode 1 may be a mode that implements the session and service continuity without changing the UPF used as a PDU session anchor of an established PDU session even when UE mobility occurs.

Here, the SSC mode 2 is a mode in which the network releases the connectivity service provided to the UE and the corresponding PDU session. Further, in the SSC mode 2, in a case that the PDU session type associated with the PDU session is IPv4, IPv6, or IPv4v6, the IP address assigned to the UE may be released when the PDU session anchor is changed.

Furthermore, the SSC mode 2 may be a mode of the session and service continuity in which the same UPF is continuously maintained only within a serving area of the UPF. More specifically, the SSC mode 2 may be a mode that implements session and service continuity without changing the UPF used by the established PDU session when the UE is within the serving area of the UPF. In addition, the SSC mode 2 may be a mode that implements the session and service continuity by changing the UPF used by the established PDU session in a case that UE mobility occurs, such as leaving the serving area of the UPF.

Here, the serving area of the UPF may be an area in which one UPF can provide a session and service continuity function, or may be a subset of access networks, such as a RAT and/or a cell, used when the UE connects to a network. Further, a subset of the access networks may be a network including one or more RATs and/or cells.

In addition, the change of SSC mode 2 PDU session anchor point (hereinafter, also referred to as a PDU session anchor) may be implemented by each apparatus performing a procedure for changing an SSC mode 2 PDU session anchor point. Alternatively, the anchor or the anchor point may be expressed as an end point.

In addition, the SSC mode 3 is a mode in which a change in the user plane is revealed to the UE while the network ensures that connectivity is not lost. In addition, in the case of the SSC mode 3, a connection through a new PDU session anchor point may be established before the previous connection is disconnected to implement a better connectivity service. Further, in the SSC mode 3, in a case that the PDU session type associated with the PDU session is IPv4, IPv6, or IPv4v6, the IP address assigned to the UE may not be maintained when the PDU session anchor is changed.

Moreover, the SSC mode 3 may be a mode of the session and service continuity mode that allows a new PDU session and/or communication path to be established via a new UPF for the same DN before disconnecting the PDU session and/or the communication path established between the UE and the UPF. In addition, the SSC mode 3 may be a mode of the session and service continuity that allows the UE to be multi-homed. Further, the SSC mode 3 may be a mode in which the session and service continuity using multiple PDU sessions and/or UPFs associated with the PDU sessions may be permitted. In other words, in the case of the SSC mode 3, each apparatus may implement the session and service continuity by using a plurality of PDU sessions or may implement the session and service continuity by using a plurality of UPFs.

Here, in a case that each apparatus establishes a new PDU session and/or communication path, a new UPF may be selected by a network or the new UPF may be an optimal UPF for a place at which the UE connects to the network. Further, in a case that a plurality of PDU sessions and/or UPFs used by the PDU sessions are effective, the UE may associate an application and/or flow communication to a newly established PDU session immediately or may implement the association based on completion of the communication.

In addition, the change of a PDU session anchor point of the SSC mode 3 may be implemented by each apparatus performing a PDU session anchor point change procedure of the SSC mode 3.

In addition, a default SSC mode is an SSC mode used by the UE and/or a network in a case that a specific SSC mode is not determined. Specifically, the default SSC mode may be an SSC mode used by the UE in a case that there is no request for an SSC mode from an application, and/or in a case that there is no UE policy for determining an SSC mode for the application. In addition, the default SSC mode may be an SSC mode used by the network in a case where there is no request for an SSC mode from the UE.

In addition, the default SSC mode may be configured for each DN, may be configured for each PDN, or may be configured for each UE and/or subscriber based on subscriber information, and/or an operator policy, and/or a UE policy. Further, the default SSC mode may be information indicating the SSC mode 1, the SSC mode 2, or the SSC mode 3.

Besides, the PDU session anchor point change procedure is a procedure for switching the PDU session used for transmitting and receiving user data from a first PDU session to a second PDU session. The PDU session anchor point change procedure may include a PDU session anchor point change procedure of the SSC mode 2 and a PDU session anchor point change procedure of the SSC mode 3.

Here, the first PDU session may be a PDU session used for user data communication before the PDU session anchor point is changed. The second PDU session may be a PDU session used for user data communication after the PDU session anchor point is changed.

Besides, the PDU session anchor point change procedure of the SSC mode 2 is a procedure for establishing the second PDU session after releasing the first PDU session. The PDU session anchor point change procedure of the SSC mode 2 may be a network-initiated procedure.

Specifically, the PDU session anchor point change procedure of the SSC mode 2 may be a procedure in which the AMF and/or SMF transmits a PDU session release command message to the UE while the first PDU session is established, and the UE that has received the PDU session release command message initiates a PDU session establishment procedure to establish the second PDU session.

In addition, the PDU session release command message may include information indicating a change of the PDU session anchor point. Further, the information indicating a change of the PDU session anchor point may be a reactivation request (reactivation requested) being the 39th 5GSM cause value (5GSM cause #39).

Further, a PDU session establishment request message that is transmitted from the UE to the AMF and/or the SMF in a PDU session establishment procedure for establishing the second PDU session, and/or a NAS message that is transmitted and/or received for forwarding the PDU session establishment request message may include a PDU session ID for identifying the first PDU session and a PDU session identity or identification (ID) for identifying the second PDU session. Further, the PDU session type, SSC mode, DNN, and S-NSSAI transmitted and received in the PDU session establishment procedure for establishing the second PDU session may be the same as the PDU session type, SSC mode, DNN, and S-NSSI transmitted and received in the PDU session establishment procedure for establishing the first PDU session.

Besides, the PDU session anchor point change procedure of the SSC mode 3 is a procedure for establishing the second PDU session before releasing the first PDU session. The PDU session anchor point change procedure of the SSC mode 3 may also be a network-initiated procedure.

More specifically, the PDU session anchor point change procedure of the SSC mode 3 may be a procedure in which the AMF and/or SMF transmits a PDU session modification command message to the UE while the first PDU session is established, and the UE that has received the PDU session modification command message initiates a PDU session establishment procedure to establish the second PDU session.

In addition, the PDU session modification command message may include information indicating a change of the PDU session anchor point. Further, the information indicating a change of the PDU session anchor point may be a reactivation request (reactivation requested) being the 39th 5GSM cause value (5GSM cause #39).

Further, a PDU session establishment request message that is transmitted from the UE to the AMF and/or the SMF in a PDU session establishment procedure for establishing the second PDU session, and/or a NAS message that is transmitted and/or received for forwarding the PDU session establishment request message may include a PDU session ID for identifying the first PDU session and a PDU session ID for identifying the second PDU session. Further, the PDU session type, SSC mode, DNN, and S-NSSAI transmitted and received in the PDU session establishment procedure for establishing the second PDU session may be the same as the PDU session type, SSC mode, DNN, and S-NSSI transmitted and received in the PDU session establishment procedure for establishing the first PDU session.

A tracking area is a single or multiple ranges that is managed by the core network and that can be indicated by location information of the UE. The tracking area may include a plurality of cells. In addition, the tracking area may be a range in which a control message such as a paging message is broadcasted or a range in which the UE can move without performing a handover procedure. Further, the tracking area may be a routing area, a location area, or those similar to them. Hereinafter, the tracking area may be a TA (Tracking Area).

Further, the TA list is a list including one or more TAs assigned by the network to the UE. In addition, the UE can move without performing a tracking area update procedure while moving within one or more TAs included in the TA list. In other words, for the UE, the TA list may also be a group of information indicating areas in which the UE can move without performing the tracking area update procedure. In addition, the TA list may be expressed as a TAI (tracking area identity) list including one or more TAIs (tracking area identities), and hereinafter, the TAI list may also be referred to as a TA list.

An LADN (Local Area Data Network) is a DN to which the UE can connect only at a specific location, and provides connectivity to a specific DNN (i.e., LADN DNN).

Besides, the LADN information is information related to the LADN. The LADN information may be information indicating a specific LADN available to the UE. The LADN information may also include a LADN DNN and LADN service area information. The LADN DNN may be a type of DNN and may be a DNN used in a case that a PDU session is established for the LADN. Further, the LADN DNN may be information indicating a LADN or may be information indicating a DN that is dealt with as a LADN. Further, the LADN service area information may be information indicating a LADN service area. Furthermore, the LADN service area information may be provided as a set of tracking areas or provided as a tracking area identity (TAI) list. The LADN service area may be an area where a PDU session can be established for the LADN or may be an area where the LADN can be connected.

Besides, a PDU session for the LADN is a PDU session corresponding a DNN associated with the LADN. A PDU session for the LADN may also be a PDU session established for the LADN. In other words, the PDU session for the LADN may be a PDU session established between the UE and the LADN or may also be a PDU session used for user data communication between the UE and the LADN. In addition, the PDU session for the LADN may be a PDU session that can be established only in an LADN service area.

In addition, NB-IoT (Narrowband IoT) is a RAT (Radio Access Technology) with its bandwidth being limited. The NB-IoT may be a RAT for providing a communication service for an IoT terminal or may be a RAT in which a part of functions is limited. Further, the NB-IoT may be a RAT constituting an Evolved Universal Terrestrial Access Network (E-UTRAN). In addition, a RAT for constituting an E-UTRAN other than the NB-IoT may be a WB-E-UTRAN. Further, a mode of the UE for connecting to the core network and/or the DN by using the NB-IoT may be expressed as an NB-N1 mode. On the contrary, a mode of the UE for connecting to the core network and/or the DN by using a RAT other than the NB-IoT may be expressed as a WB-N1 mode.

A multi-homed PDU session is a PDU session established by using a plurality of UPFs connected to the DN. The multi-homed PDU session may be a PDU session established for a single DN or may be a PDU session established for different DNs. Further, the multi-homed PDU session may be expressed as a Multi-homed IPv6 PDU Session.

Besides, URLLC (Ultra-Reliable and Low Latency Communications) are communications in which high reliability and/or low latency is achieved. The URLLC may be one of major communication services provided in the 5GS. The function constituting the URLLC may be redundant communication or may be IP address preservation. In addition, the expression that the URLLC is supported may mean that the redundant communication is supported or may mean that the IP address preservation is supported. Further, the expression that the URLLC is supported may mean that communication of the user data using the same IP address can be preserved even in a case that the PDU session anchor point is changed. Further, the expression that the URLLC is supported may mean that a QoS flow corresponding to a 5QI (5G QoS Identifier) for the URLLC is supported, may mean that a QoS rule corresponding to the QoS flow is supported, or may mean that establishment of a PDU session corresponding to the QoS rule is supported.

Besides, the redundant communication (Redundant Transmission) is communication in which transmission/reception of the user data is made to be redundant. The redundant communication may be one of the technologies for implementing the URLLC. Further, the redundant communication may be communication with higher reliability than communication using a single user plane tunnel. In addition, the user plane tunnel may be a transfer path used for transmission/reception of the user data between the apparatuses and may be a transfer path established on the interface in which the transmission/reception of the user data is performed.

Here, the redundant communication may include a first type of redundant communication, a second type of redundant communication, and a third type of redundant communication.

Further, the first type of redundant communication refers to communication in which transmission/reception of the user data is made to be redundant between the UE and the network by using multiple communication paths via different access networks. The UE may implement the first type of redundant communication by using a plurality of IP addresses.

Here, the first type of redundant communication may be implemented with a plurality of PDU sessions. In this case, the UE may implement the first type of redundant communication by using a plurality of PDU sessions established via different access networks. In other words, the UE may implement the first type of redundant communication by using a plurality of PDU session IDs.

Further, the first type of redundant communication may also be implemented with a single PDU session. More specifically, the first type of redundant communication may be implemented with a multi-access PDU session. In this case, the UE may implement the first type of redundant communication by using a single PDU session. In other words, the UE may implement the first type of redundant communication by using a single PDU session ID.

Further, the second type of redundant communication refers to communication in which transmission/reception of the user data is made to be redundant between the UE and the network by using a plurality of communication paths via a single access network. The UE may implement the second type of redundant communication by using a plurality of IP addresses.

Here, the second type of redundant communication may be implemented with a plurality of PDU sessions. In this case, the UE may implement the second type of redundant communication by using a plurality of PDU sessions established via a single access network. In other words, the UE may implement the second type of redundant communication by using a plurality of PDU session IDs.

Further, the second type of redundant communication may also be implemented with a single PDU session. More specifically, the second type of redundant communication may be implemented with a multi-homed PDU session. In this case, the UE may implement the second type of redundant communication by using a single PDU session. In other words, the UE may implement the second type of redundant communication by using a single PDU session ID.

Besides, the third type of redundant communication refers to communication in which transmission/reception of the user data is made to be redundant between the access network or the core network and the network. The UE may implement the third type of redundant communication by using a single IP address.

Here, the third type of redundant communication may be implemented with a single PDU session. In this case, the UE may implement the third type of redundant communication by using a single PDU session. In other words, the UE may implement the third type of the redundant communication by using a single PDU session ID.

Besides, the IP address preservation is a technology in which the same IP address can be continuously used. In a case that the IP address preservation is supported, the UE can continuously use the same IP address for communication of the user data even in a case that the UE moves out of the TA. In other words, in a case that the IP address preservation is supported, each apparatus can continuously use the same IP address for communication of the user data even in a case that the PDU session anchor point is changed.

Further, the first PDU session may also be a PDU session established to implement redundant communication. The first PDU session may also be the first PDU session established to implement redundant communication. In other words, the first PDU session may also be a PDU session that is established before the second PDU session is established to implement redundant communication.

Further, the second PDU session may also be a PDU session established to implement redundant communication. The second PDU session may also be the second PDU session established to implement redundant communication. In other words, the second PDU session may also be a PDU session that is established after the first PDU session is established to implement redundant communication.

3.2 Description of Identification Information Used in Each Embodiment

Next, identification information used in each embodiment will be described.

First, the 1st identification information is information indicating whether the UE supports URLLC. The 1st identification information may be used for indicating capability of the UE in 5G and may be information represented by bits that includes a 5GMM capability information element. Further, the 1st identification information may be information indicating that the UE requests for the use of URLLC.

Further, the 1st identification information may be information indicating whether the UE supports redundant communication. The 1st identification information may be used for indicating capability of the UE in 5G and may be information represented by bits that includes a 5GMM capability information element. Further, the 1st identification information may be information indicating that the UE requests for the use of redundant communication.

Here, the information indicating the request for the use of redundant communication may be information indicating the request for the use of URLLC. Further, the information indicating the request for the use of redundant communication may be information that is a combination of one or more pieces of identification information out of the 2nd to 3rd identification information. In other words, the UE may indicate the request for the use of redundant communication by transmitting, to the network, information that is a combination of one or more pieces of identification information out of the 1st to 3rd identification information. In addition, the 1st to 3rd identification information may be transmitted and received as separate identification information or may be transmitted and received as one piece of identification information.

Further, the 1st identification information may be information that is selected and determined based on a configuration of the UE, and/or a state of the UE, and/or a user policy, and/or a request for an application. Further, the 1st identification information may be information selected and determined based on information held by another UE and/or information corresponding to another UE.

Besides, the 2nd identification information is information indicating the type of a group to which the UE belongs. The 2nd identification information may also be a UE Reliability Group (UE RG). More specifically, the 2nd identification information may be information indicating which redundant group the UE belongs to while the redundant communication is performed.

For example, in a case that the first UE cooperates with the second UE to implement redundant communication, the redundant group to which the first UE belongs may also be a redundant group different from the redundant group to which the second UE belongs.

Further, the 2nd identification information may be information that is selected and determined based on a configuration of the UE, and/or a state of the UE, and/or a user policy, and/or a request for an application. Further, the 2nd identification information may be information selected and determined based on information held by another UE and/or information corresponding to another UE.

Besides, the 3rd identification information is information that identifies another UE. The 3rd identification information may be information that identifies another UE to cooperate to implement redundant communication. For example, in the case where the first UE cooperates with the second UE to implement redundant communication, the 3rd identification information may also be information that identifies the second UE. Here, the information that identifies another UE may be a 5G-GUTI corresponding to another UE.

Further, the 3rd identification information may be information that is selected and determined based on a configuration of the UE, and/or a state of the UE, and/or a user policy, and/or a request for an application. Further, the 3rd identification information may be information selected and determined based on information held by another UE and/or information corresponding to another UE.

Further, the 11th identification information is information indicating whether the network supports URLLC. Furthermore, the 11th identification information may be information represented by bits constituting a 5GS network feature support information element that indicates capability of the network in 5G. Further, the 11th identification information may be information indicating that the use of the URLLC by the UE is allowed.

Further, the 11th identification information may be information indicating whether the network supports redundant communication. Further, the 11th identification information may be information represented by bits that constitute a 5GS network feature support information element that indicates capability of the network in 5G. Further, the 11th identification information may be information indicating that the use of the redundant communication by the UE is allowed.

Here, the information indicating that the use of redundant communication is allowed may also be information indicating that the use of URLLC is allowed. Further, the information indicating that the use of redundant communication is allowed may be information that is a combination of one or more pieces of identification information out of the 12th to 15th identification information. In other words, the network may indicate that the use of redundant communication is allowed by transmitting, to the UE, information that is a combination of one or more pieces of identification information out of the 11th to 15th identification information. In addition, the 11th to 15th identification information may be transmitted and received as separate identification information or may be transmitted and received as one piece of identification information.

Further, the 11th identification information may be information selected or determined based on the 1st identification information received by the network, and/or capability information of the network, and/or an operator policy, and/or a state of the network, and/or user registration information, and/or the like. Further, the 11th identification information may be information selected and determined based on other identification information selected by the network in the present procedure in each embodiment.

Besides, the 12th identification information is information indicating the type of a group to which the UE belongs. The 12th identification information may also be a UE Reliability Group (UE RG). More specifically, the 12th identification information may be information indicating which redundant group the UE belongs to while the redundant communication is performed.

For example, in a case that the first UE cooperates with the second UE to implement redundant communication, the redundant group to which the first UE belongs may also be a redundant group different from the redundant group to which the second UE belongs.

Further, the 12th identification information may be information selected or determined based on the 2nd identification information received by the network, and/or capability information of the network, and/or an operator policy, and/or a state of the network, and/or user registration information, and/or the like. Further, the 12th identification information may be information selected and determined based on other identification information selected by the network in the present procedure in each embodiment. Further, the 12th identification information may be information selected and determined based on information corresponding to another UE.

Besides, the 13th identification information is information that identifies another UE. The 13th identification information may be information that identifies another UE to cooperate to implement redundant communication. For example, in the case where the first UE cooperates with the second UE to implement the redundant communication, the 13th identification information may also be information that identifies the second UE. Here, the information that identifies another UE may be a 5G NR Global Unique Temporary Identifier (5G-GUTI) corresponding to another UE.

Further, the 13th identification information may be information selected or determined based on the 3rd identification information received by the network, and/or capability information of the network, and/or an operator policy, and/or a state of the network, and/or user registration information, and/or the like. Further, the 13th identification information may be information selected and determined based on other identification information selected by the network in the present procedure in each embodiment. Further, the 13th identification information may be information selected and determined based on information corresponding to another UE.

Besides, the 14th identification information is information indicating a DNN list. The 14th identification information may be information indicating a DNN list that can be used for redundant communication. More specifically, the 14th identification information may be information indicating the DNN list that can be used to establish a PDU session for implementing the redundant communication. In other words, the UE can establish a PDU session for implementing the redundant communication by using the DNN included in the DNN list indicated by the 14th identification information.

Further, the 14th identification information may be information selected or determined based on the 1st identification information received by the network, and/or capability information of the network, and/or an operator policy, and/or a state of the network, and/or user registration information, and/or the like. Further, the 14th identification information may be information selected and determined based on other identification information selected by the network in the present procedure in each embodiment.

Besides, the 15th identification information is information indicating an S-NSSAI list. The 15th identification information may be information indicating an S-NSSAI list that can be used for redundant communication. More specifically, the 15th identification information may be information indicating the S-NSSAI list that can be used to establish a PDU session for implementing the redundant communication. In other words, the UE can establish a PDU session for implementing the redundant communication by using the S-NSSAI included in the S-NSSAI list indicated by the 15th identification information.

Further, the 15th identification information may be information selected or determined based on the 1st identification information received by the network, and/or capability information of the network, and/or an operator policy, and/or a state of the network, and/or user registration information, and/or the like. Further, the 15th identification information may be information selected and determined based on other identification information selected by the network in the present procedure in each embodiment.

Besides, the 21st identification information is information indicating whether the UE supports URLLC in the PDU session established in the present procedure in each embodiment. The 21st identification information may be information indicating a request for the establishment of a PDU session that supports URLLC.

The 21st identification information is information indicating whether the UE supports redundant communication in the PDU session established in the present procedure in each embodiment. The 21st identification information may be information indicating a request for the establishment of a PDU session that supports the redundant communication.

Further, the 21st identification information is information indicating that the PDU session established in the present procedure in each embodiment is a PDU session for implementing redundant communication. Here, the information indicating the PDU session for implementing redundant communication may be information indicating the PDU session for implementing URLLC communication. Further, the information indicating the PDU session for implementing redundant communication may be information that is a combination of one or more pieces of identification information out of the 22nd to 27th identification information. In other words, the UE may indicate that the PDU session established in the present procedure in each embodiment is a PDU session for implementing redundant communication by transmitting, to the network, information that is a combination of one or more identification information out of the 21st to 27th identification information. In addition, the 21st to 27th identification information may be transmitted and received as separate identification information or may be transmitted and received as one piece of identification information.

Further, the 21st identification information may be information that is selected and determined based on one or more pieces of identification information out of the transmitted or received 11th to 15th identification information, and/or a configuration of the UE, and/or a state of the UE, and/or a user policy, and/or a request for an application.

Besides, the 22nd identification information is information indicating the type of the PDU session established in the present procedure in each embodiment. The 22nd identification information may be a redundant sequence number (RSN). More specifically, the 22nd identification information is information indicating whether the PDU session established in the present procedure in each embodiment is a first PDU session or a second PDU session.

Further, the 22nd identification information is information transmitted or received in a case that the PDU session established in the present procedure in each embodiment is a PDU session for implementing redundant communication. In other words, the 22nd identification information is information transmitted or received in a case that the PDU session established in the present procedure in each embodiment is a PDU session for implementing URLLC.

Further, the 22nd identification information may be information that is selected and determined based on one or more pieces of identification information out of the transmitted or received 11th to 15th identification information, and/or a configuration of the UE, and/or a state of the UE, and/or a user policy, and/or a request for an application.

Besides, the 23rd identification information is information indicating an SSC mode. The 23rd identification information may be information indicating an SSC mode requested by the UE. More specifically, the 23rd identification information may be information indicating an SSC mode that is requested by the UE and corresponding to the PDU session established in the present procedure of each embodiment. In addition, the 23rd identification information may also be information indicating the SSC mode 1, information indicating the SSC mode 2, or information indicating the SSC mode 3.

Further, the 23rd identification information may be information that is selected and determined based on one or more pieces of identification information out of the transmitted or received 11th to 15th identification information, and/or a configuration of the UE, and/or a state of the UE, and/or a user policy, and/or a request for an application.

Further, the 24th identification information is information indicating a PDU session type. The 24th identification information may be information indicating a PDU session type requested by the UE. More specifically, the 24th identification information may be information indicating a PDU session type that is requested by the UE and corresponding to the PDU session established in the present procedure of each embodiment. In addition, the 24th identification information may be information indicating IPv4, information indicating IPv6, or information indicating IPv4v6. Further, the 24th identification information may be information indicating Unstructured or information indicating Ethernet (registered trademark).

Further, the 24th identification information may be information that is selected and determined based on one or more pieces of identification information out of the transmitted or received 11th to 15th identification information, and/or a configuration of the UE, and/or a state of the UE, and/or a user policy, and/or a request for an application.

Besides, the 25th identification information is information indicating a DNN. The 25th identification information may be information indicating a DNN requested by the UE. More specifically, the 25th identification information may be information indicating a DNN that is requested by the UE and corresponding to the PDU session established in the present procedure of each embodiment.

Further, the 25th identification information may be information that is selected and determined based on one or more pieces of identification information out of the transmitted or received 11th to 15th identification information, and/or a configuration of the UE, and/or a state of the UE, and/or a user policy, and/or a request for an application.

Besides, the 26th identification information is information indicating an S-NSSAI. The 26th identification information may be information indicating an S-NSSAI requested by the UE. More specifically, the 26th identification information may be information indicating an S-NSSAI that is requested by the UE and corresponding to the PDU session established in the present procedure of each embodiment.

Further, the 26th identification information may be information that is selected and determined based on one or more pieces of identification information out of the transmitted or received 11th to 15th identification information, and/or a configuration of the UE, and/or a state of the UE, and/or a user policy, and/or a request for an application.

Further, the 27th identification information is information indicating a PDU session ID. The 27th identification information may be information indicating a PDU session ID for identifying an established PDU session. In other words, the 27th identification information may be information indicating a PDU session ID different from the PDU session ID for identifying the PDU session established in the present procedure in each embodiment. Further, the 27th identification information may be information indicating a PDU session ID that is different from the PDU session ID indicated by the 28th identification information.

Further, the 27th identification information may be information indicating a PDU session ID for identifying the PDU session established as the first PDU session. In addition, the 27th identification information may be identification information transmitted or received in a case that the present procedure in each embodiment is a procedure for establishing a second PDU session (hereinafter, also referred to as a PDU session establishment procedure for establishing a second PDU session).

Further, the 27th identification information may be identification information transmitted or received in a case that the present procedure in each embodiment is a procedure performed within a PDU session anchor point change procedure of the SSC mode 3. Here, the procedure for changing an SSC mode 3 PDU session anchor point may be a procedure for changing the second PDU session anchor point (hereinafter, also referred to as a procedure for changing the PDU session anchor that provides an SSC mode 3 second PDU session).

Further, the 27th identification information may be information that is selected and determined based on one or more pieces of identification information out of the transmitted or received 11th to 15th identification information, and/or a configuration of the UE, and/or a state of the UE, and/or a user policy, and/or a request for an application.

Further, the 28th identification information is information indicating a PDU session ID. The 28th identification information may be information indicating a PDU session ID requested by the UE. More specifically, the 28th identification information may be information indicating a PDU session ID that is requested by the UE and used for identifying the PDU session established in the present procedure of each embodiment. In other words, the 28th identification information may be information indicating a PDU session ID that is different from the PDU session ID for identifying the PDU session that has been already established. Further, the 28th identification information may be information indicating a PDU session ID that is different from the PDU session ID indicated by the 27th identification information.

Further, the 28th identification information may be information indicating a PDU session ID for identifying the PDU session established as the second PDU session. More specifically, the 28th identification information may be information indicating a PDU session ID for identifying the second PDU session in a case that the present procedure in each embodiment is a procedure for establishing the second PDU session.

Further, the 28th identification information may be information indicating a PDU session ID for identifying the second PDU session in the PDU session anchor point change procedure of the SSC mode 3. Further, the 28th identification information may be information indicating a PDU session ID that is different from the PDU session ID for identifying the first PDU session in the PDU session anchor point change procedure of the SSC mode 3.

Further, the 28th identification information may be information that is selected and determined based on one or more pieces of identification information out of the transmitted or received 11th to 15th identification information, and/or the 27th identification information, and/or a configuration of the UE, and/or a state of the UE, and/or a user policy, and/or a request for an application.

Further, the 29th identification information is information indicating a PDU session ID. The 29th identification information may be information indicating an old PDU session ID. The 29th identification information may be information indicating a PDU session ID for identifying an established PDU session. In other words, the 29th identification information may be information indicating a PDU session ID different from the PDU session ID for identifying the PDU session established in the present procedure in each embodiment. Further, the 29th identification information may be information indicating a PDU session ID that is different from the PDU session ID indicated by the 28th identification information.

Further, the 29th identification information may be information indicating a PDU session ID for identifying the first PDU session in the PDU session anchor point change procedure of the SSC mode 3. In addition, the 29th identification information may be identification information transmitted or received in a case that the present procedure in each embodiment is a procedure performed within a PDU session anchor point change procedure of the SSC mode 3.

Further, the 29th identification information may be information that is selected and determined based on one or more pieces of identification information out of the transmitted or received 11th to 15th identification information, and/or a configuration of the UE, and/or a state of the UE, and/or a user policy, and/or a request for an application.

Besides, the 31st identification information is information indicating whether the network supports URLLC in the PDU session established in the present procedure in each embodiment. The 31st identification information may be information indicating that a PDU session supporting URLLC is established. Further, the 31st identification information may be information indicating that a request for the establishment of a PDU session supporting URLLC has been accepted.

Further, the 31st identification information is information indicating whether the network supports redundant communication in the PDU session established in the present procedure in each embodiment. Further, the 31st identification information may be information indicating that a PDU session supporting redundant communication is established. Further, the 31st identification information may be information indicating that a request for the establishment of a PDU session supporting redundant communication has been accepted.

Further, the 31st identification information is information indicating that the PDU session established in the present procedure in each embodiment is a PDU session for implementing redundant communication. Here, the information indicating the PDU session for implementing redundant communication may be information indicating the PDU session for implementing URLLC communication. Further, the information indicating the PDU session for implementing redundant communication may be information that is a combination of one or more pieces of identification information out of the 32nd to 37th identification information. In other words, the network may indicate that the PDU session established in the present procedure in each embodiment is a PDU session for implementing redundant communication by transmitting, to the UE, information that is a combination of one or more identification information out of the 31st to 37th identification information. In addition, the 31st to 37th identification information may be transmitted and received as separate identification information or may be transmitted and received as one piece of identification information.

Further, the 31st identification information may be information selected or determined based on the 21st identification information received by the network, and/or capability information of the network, and/or an operator policy, and/or a state of the network, and/or user registration information, and/or the like. Further, the 31st identification information may be information selected and determined based on other identification information selected by the network in the present procedure in each embodiment.

Besides, the 32nd identification information is information indicating the type of the PDU session established in the present procedure in each embodiment. The 32nd identification information may be a redundant sequence number (RSN). More specifically, the 32nd identification information is information indicating whether the PDU session established in the present procedure in each embodiment is a first PDU session or a second PDU session.

Further, the 32nd identification information is information transmitted or received in a case that the PDU session established in the present procedure in each embodiment is a PDU session for implementing redundant communication. In other words, the 32nd identification information is information transmitted or received in a case that the PDU session established in the present procedure in each embodiment is a PDU session for implementing URLLC.

Further, the 32nd identification information may be information selected or determined based on the 22nd identification information received by the network, and/or capability information of the network, and/or an operator policy, and/or a state of the network, and/or user registration information, and/or the like. Further, the 32nd identification information may be information selected and determined based on other identification information selected by the network in the present procedure in each embodiment.

Besides, the 33rd identification information is information indicating an SSC mode. The 33rd identification information may be information indicating an SSC mode selected by the network. More specifically, the 33rd identification information may be information indicating an SSC mode that is selected by the network and corresponding to the PDU session established in the present procedure of each embodiment. In addition, the selected SSC mode may be the SSC mode 1, the SSC mode 2, or the SSC mode 3.

Further, the 33rd identification information may be information selected or determined based on the 23rd identification information received by the network, and/or capability information of the network, and/or an operator policy, and/or a state of the network, and/or user registration information, and/or the like. Further, the 33rd identification information may be information selected and determined based on other identification information selected by the network in the present procedure in each embodiment.

Further, the 34th identification information is information indicating a PDU session type. The 34th identification information may be information indicating a PDU session type selected by the network. More specifically, the 34th identification information may be information indicating a PDU session type that is selected by the network and corresponding to the PDU session established in the present procedure of each embodiment. In addition, the selected PDU session type may be IPv4, IPv6, or IPv4v6. Further, the selected PDU session type may be Unstructured, or may be Ethernet (registered trademark).

Further, the 34th identification information may be information selected or determined based on the 24th identification information received by the network, and/or capability information of the network, and/or an operator policy, and/or a state of the network, and/or user registration information, and/or the like. Further, the 34th identification information may be information selected and determined based on other identification information selected by the network in the present procedure in each embodiment.

Besides, the 35th identification information is information indicating a DNN. The 35th identification information may be information indicating a DNN selected by the network. More specifically, the 35th identification information may be information indicating a DNN that is selected by the network and corresponding to the PDU session established in the present procedure of each embodiment.

Further, the 35th identification information may be information selected or determined based on the 25th identification information received by the network, and/or capability information of the network, and/or an operator policy, and/or a state of the network, and/or user registration information, and/or the like. Further, the 35th identification information may be information selected and determined based on other identification information selected by the network in the present procedure in each embodiment.

Besides, the 36th identification information is information indicating an S-NSSAI. The 36th identification information may be information indicating an S-NSSAI selected by the network. More specifically, the 36th identification information may be information indicating an S-NSSAI that is selected by the network and corresponding to the PDU session established in the present procedure of each embodiment.

Further, the 36th identification information may be information selected or determined based on the 26th identification information received by the network, and/or capability information of the network, and/or an operator policy, and/or a state of the network, and/or user registration information, and/or the like. Further, the 36th identification information may be information selected and determined based on other identification information selected by the network in the present procedure in each embodiment.

Further, the 37th identification information is information indicating a PDU session ID. The 37th identification information may be information indicating a PDU session ID for identifying an established PDU session. In other words, the 37th identification information may be information indicating a PDU session ID different from the PDU session ID for identifying the PDU session established in the present procedure in each embodiment. Further, the 37th identification information may be information indicating a PDU session ID that is different from the PDU session ID indicated by the 38th identification information.

Further, the 37th identification information may be information indicating a PDU session ID for identifying the PDU session established as the first PDU session. In addition, the 37th identification information may be identification information transmitted or received in a case that the present procedure in each embodiment is a procedure for establishing the second PDU session.

Further, the 37th identification information may be information selected or determined based on the 27th identification information received by the network, and/or capability information of the network, and/or an operator policy, and/or a state of the network, and/or user registration information, and/or the like. Further, the 37th identification information may be information selected and determined based on other identification information selected by the network in the present procedure in each embodiment.

Further, the 38th identification information is information indicating a PDU session ID. The 38th identification information may be information indicating a PDU session ID determined by the network. More specifically, the 38th identification information may be information indicating a PDU session ID that is determined by the network and corresponding to the PDU session established in the present procedure of each embodiment. In other words, the 38th identification information may be information indicating a PDU session ID that is different from the PDU session ID for identifying the PDU session that has been already established. Further, the 38th identification information may be information indicating a PDU session ID that is different from the PDU session ID indicated by the 37th identification information.

Further, the 38th identification information may be information indicating a PDU session ID for identifying the PDU session established as the second PDU session. More specifically, the 38th identification information may be information indicating a PDU session ID for identifying the second PDU session in a case that the present procedure in each embodiment is a procedure for establishing the second PDU session.

Further, the 38th identification information may be information selected or determined based on the 27th identification information, and/or 28th identification information, and/or the 29th identification information received by the network, and/or capability information of the network, and/or an operator policy, and/or a state of the network, and/or user registration information, and/or the like. Further, the 38th identification information may be information selected and determined based on other identification information selected by the network in the present procedure in each embodiment.

Further, the 40th identification information is a cause value indicating a reason why a part of the UE request(s) is not allowed. The 40th identification information may also be a 5GSM cause value (5GSM cause).

For example, the 40th identification information may be information indicating that the establishment of the second PDU session is not currently allowed. More specifically, the 40th identification information may be information indicating that the establishment of the second PDU session is not currently allowed after the completion of the present procedure in each embodiment.

Further, the 40th identification information may be information indicating that communication using the PDU session established in the present procedure in each embodiment is not currently allowed. More specifically, the 40th identification information may be information indicating that communication using the PDU session corresponding to a PDU session ID requested by the UE is not currently allowed. In other words, the 40th identification information may be information indicating that communication using the second PDU session is not currently allowed.

Further, the 40th identification information may be information indicating that the establishment of the second PDU session is not allowed in the current PLMN or may be information indicating that the communication using the second PDU session is not allowed.

Further, the 40th identification information may be information indicating that the establishment of the second PDU session is not allowed in an area to which the UE currently belongs or may be information indicating that the communication using the second PDU session is not allowed. In addition, the area to which the UE currently belongs may also be an area including one or more tracking areas.

Further, the 40th identification information may be information selected or determined based on one or more pieces of identification information out of the 21st to 29th identification information received by the network, and/or capability information of the network, and/or an operator policy, and/or a state of the network, and/or user registration information, and/or the like. Further, the 40th identification information may be information selected and determined based on other identification information selected by the network in the present procedure in each embodiment.

Besides, the 41st identification information is information indicating the value of a back-off timer (hereinafter, also simply referred to as a timer). The 41st identification information may be information indicating the time when the establishment of the second PDU session is not allowed. Further, the 41st identification information may be information indicating the time when communication using the PDU session established in the present procedure in each embodiment is not allowed. Here, the PDU session established in the present procedure in each embodiment may be the second PDU session. Further, the information indicating the time may be information indicating a period or may be information indicating a time.

Each apparatus may set the 41st identification information as the value of a back-off timer based on the transmission/reception of the 41st identification information or may start the back-off timer that is set with the 41st identification information. Further, the UE may initiate a PDU session establishment procedure to establish the second PDU session based on the expiration of the backoff timer that is set with the 41st identification information. Further, each apparatus may authenticate that the communication using the PDU session established in the present procedure in each embodiment is allowed based on the expiration of the backoff timer that is set with the 41st identification information or may transition to a state in which the communication using the PDU session established in the present procedure in each embodiment can be performed.

Further, the 51st identification information is a cause value indicating a reason why the UE request is not allowed. The 51st identification information may also be a 5GSM cause value (5GSM cause).

For example, the 51st identification information may be information indicating that the establishment of a requested PDU session is not currently allowed.

More specifically, the 51st identification information may be information indicating that the establishment of the PDU session corresponding to a PDU session ID requested by the UE is not currently allowed. In other words, the 51st identification information may be information indicating that the establishment of the second PDU session is not currently allowed.

Further, the 51st identification information may be information indicating that the establishment of the second PDU session is not allowed in the current PLMN. Further, the 51st identification information may be information indicating that the establishment of the second PDU session is not allowed in an area to which the UE currently belongs. In addition, the area to which the UE currently belongs may also be an area including one or more tracking areas.

Further, the 51st identification information may be information selected or determined based on one or more pieces of identification information out of the 21st to 29th identification information received by the network, and/or capability information of the network, and/or an operator policy, and/or a state of the network, and/or user registration information, and/or the like. Further, the 51st identification information may be information selected and determined based on other identification information selected by the network in the present procedure in each embodiment.

The 52nd identification information is information indicating a value of the back-off timer. The 52nd identification information may be information indicating the time when the establishment of the second PDU session is not allowed. Further, the information indicating the time may be information indicating a period or may be information indicating a time.

Each apparatus may set the 52nd identification information as the value of a back-off timer based on the transmission/reception of the 52nd identification information or may start the back-off timer that is set with the 52nd identification information. Further, the UE may initiate a PDU session establishment procedure to establish the second PDU session based on the expiration of the backoff timer that is set with the 52nd identification information.

Further, the 61st identification information is information indicating a PDU session ID. The 61st identification information may be information indicating a PDU session ID that identifies a PDU session related to the present procedure in each embodiment.

For example, the 61st identification information may be information indicating a PDU session ID for identifying the PDU session established as the first PDU session. Further, the 61st identification information may be information indicating a PDU session ID for identifying the PDU session established as the second PDU session.

In addition, the network may include, in the 61st identification information, information other than the PDU session ID for identifying a PDU session established as the first PDU session, or may include, in the 61st identification information, information other than information indicating the PDU session ID for identifying a PDU session established as the second PDU session in the 61st identification information. More specifically, the network may include empty information or dummy information in the 61st identification information.

Further, the 61st identification information may be information selected or determined based on information previously transmitted and/or received by the network, and/or capability information of the network, and/or an operator policy, and/or a state of the network, and/or user registration information, and/or the like. Further, the 61st identification information may be information selected and determined based on other identification information selected by the network in the present procedure in each embodiment.

Further, the 62nd identification information is a cause value indicating a reason why the PDU session needs to be changed. The 62nd identification information may also be a 5GSM cause value (5GSM cause).

For example, the 62nd identification information may be information indicating a request for reactivation of a PDU session. Here, the information indicating the request for reactivation of the PDU session may be information indicating the 39th 5GSM cause value (5GSM cause), that is, a reactivation request.

Further, the 62nd identification information may be information indicating that the establishment of the second PDU session is allowed. In other words, the 62nd identification information may be information indicating that the second PDU session can be established.

Further, the 62nd identification information may be information indicating that communication using the second PDU session is allowed. In other words, the 62nd identification information may be information indicating that communication using the second PDU session can be performed.

Further, the 62nd identification information may be information selected or determined based on information previously transmitted and/or received by the network, and/or capability information of the network, and/or an operator policy, and/or a state of the network, and/or user registration information, and/or the like. Further, the 62nd identification information may be information selected and determined based on other identification information selected by the network in the present procedure in each embodiment.

4. First Embodiment

Next, the first embodiment will be described. Hereinafter, the first embodiment will be referred to as the present embodiment.

The present embodiment is described in the order of Embodiment 4.1 "Registration Procedure", Embodiment 4.2 "PDU Session Establishment Procedure for Establishing a First PDU Session", Embodiment 4.3 "PDU Session Establishment Procedure for Establishing a Second PDU Session", and Embodiment 4.4 "Cases where a PDU session establishment procedure for establishing a second PDU session is restricted from being performed immediately after a PDU session establishment procedure for establishing a first PDU session is performed".

First, each apparatus transitions to a state in which a UE is registered with the network by performing a registration procedure described in Embodiment 4.1.

Next, each apparatus establishes a first PDU session by performing the PDU session establishment procedure described in Embodiment 4.2, and transitions to a state in which communication using the first PDU session can be performed between the UE and a DN.

Next, each apparatus establishes a second PDU session by performing the PDU session establishment procedure described in Embodiment 4.3, and transitions to a state in which communication using the second PDU session can be performed between the UE and a DN. In this case, since the UE can transmit and/or receive user data by using the first PDU session and the second PDU session, it can be said that each apparatus is in a state where redundant communication can be performed.

Finally, cases where each apparatus is restricted from immediately performing the PDU session establishment procedure for establishing the second PDU session after performing the PDU session establishment procedure described in Embodiment 4.2 will be described in Embodiment 4.4.

In addition, in the procedure of the present embodiment, each apparatus may exchange URLLC support information, redundant communication support information, and/or IP address preservation support information between the UE and the network in the registration procedure.

Further, in the PDU session establishment procedure, each apparatus may establish a PDU session supporting URLLC, a PDU session supporting redundant communication, or a PDU session supporting IP address preservation between the UE and the network based on the information exchanged in the registration procedure. In addition, the PDU session supporting URLLC, the PDU session supporting redundant communication, and the PDU session supporting IP address preservation may be PDU sessions that can be established only for a specific DN. Here, the specific DN may be, for example, an LADN.

Further, each apparatus may perform, by using an established PDU session, user data communication supporting URLLC, redundant communication, or user data communication supporting IP address preservation.

Besides, the contents described in the present embodiment can also be applied to a case where the above-mentioned apparatuses are configured as different apparatuses (i.e., different physical hardware, different logical hardware, or different software).

4.1. Registration Procedure

Figure 9:
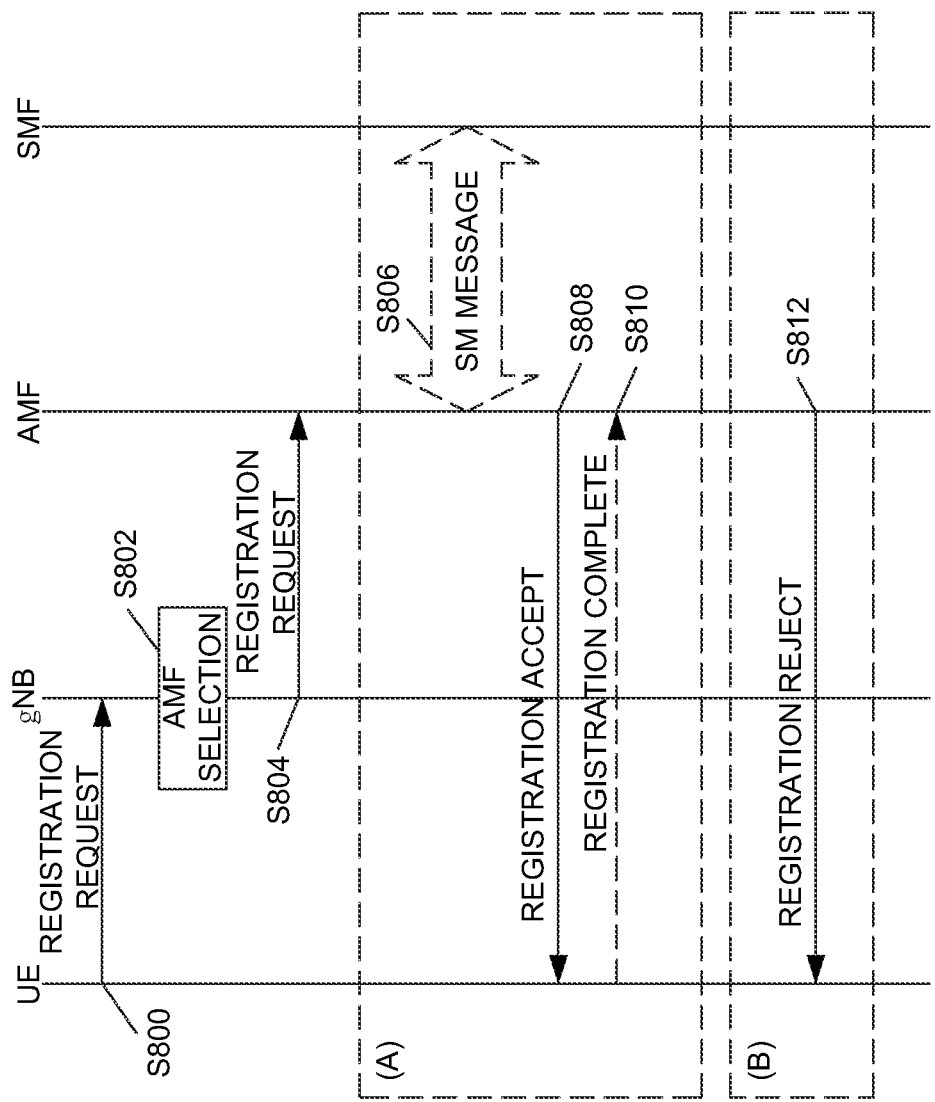
FIG. 9 is a diagram illustrating a registration procedure.

FIG. 9 is a diagram illustrating a registration procedure. First, a registration procedure will be described with reference to FIG. 9. Here, the registration procedure is also referred to as the present procedure. The registration procedure is a procedure in the 5GS. The registration procedure is a procedure initiated by the UE to register to an access network, and/or a core network, and/or a DN. If the UE is not registered in the network, the UE can perform the present procedure at any time, for example, when power is turned on. In other words, if the UE is in a deregistered state (RM-DEREGISTERED state), the UE can initiate the present procedure at any time. In addition, each apparatus (particularly, the UE and the AMF) can transition to a registered state (RM-REGISTERED state) based on completion of the registration procedure.

Further, the registration procedure may be a procedure for updating location registration information of the UE in the network, and/or for regularly notifying, by the UE, the network of a state of the UE, and/or for updating specific parameters related to the UE in the network.

The UE may initiate the registration procedure at the time when the UE performs mobility across TAs. In other words, the UE may initiate the registration procedure when the UE moves to a TA different from the TA shown in a TA list held thereby. Further, the UE may initiate the present procedure when a running timer expires. Further, the UE may initiate the registration procedure when a context of each apparatus needs to be updated due to disconnection or deactivation of a PDU session. Further, the UE may initiate the registration procedure in a case that a change occurs in capability information and/or preference pertaining to the PDU session establishment of the UE. Further, the UE may initiate the registration procedure regularly. Furthermore, the UE may also initiate the registration procedure based on the completion of a UE configuration update procedure. In addition, the UE can perform the registration procedure at any timing without being limited to the above.

First, the UE initiates the registration procedure by transmitting a registration request message to the AMF via a 5G AN (S800), (S802), and (S804). More specifically, the UE transmits an RRC message including the registration request message to the gNB_110 located within the 5G AN (S800). In addition, the registration request message is a NAS message. In addition, the RRC message may also be a control message that is transmitted and/or received between the UE and the 5G AN or between the UE and the gNB located within the 5G AN. In addition, the NAS message is processed at the NAS layer, and the RRC message is processed at the RRC layer. Besides, the NAS layer is a layer higher than the RRC layer.

Here, the UE can transmit a registration request message and/or an RRC message including the 1st identification information, but the 1st identification information may also be included in a control message different from the above messages, e.g., a control message of a layer lower than the RRC layer (e.g., an MAC layer, an RLC layer, and a PDCP layer) to be transmitted. Here, the content indicated by the 1st identification information may be as described above. The UE can notify the network of the content of the identification information by transmitting the identification information. This identification information may be included in these messages to indicate a request of the UE.

In addition, the UE may transmit the registration request message including an SM message (e.g., a PDU session establishment request message), or transmit the SM message (e.g., the PDU session establishment request message) together with the registration request message, to initiate a PDU session establishment procedure during the registration procedure.

If the gNB_110 located within the 5G AN receives the RRC message including the registration request message, it selects the AMF to which the registration request message is transferred (S802). In addition, the gNB_110 located within the 5G AN can select the AMF based on information included in the registration request message and/or the RRC message. Here, it is assumed that the AMF_210 is selected. The gNB_110 located within the 5G AN retrieves the registration request message from the received RRC messages and forwards the registration request message to the selected AMF_210 (S804).

When the AMF_210 receives the registration request message, the AMF_210 can recognize what the UE requests and/or the content of various identification information included in the registration request message.

When the AMF_210 receives the registration request message, it can perform determining of the first condition. The first condition is to determine whether the network (or the AMF) accepts the request of the UE. The AMF initiates the procedure (A) of FIG. 9 when the first condition is determined to be true and initiates the procedure (B) of FIG. 9 when the first condition is determined to be false.

In addition, determination of the first condition can be performed based on the reception of the registration request message and/or each piece of identification information included in the registration request message, and/or subscriber information and/or capability information of the network and/or an operator policy and/or a state of the network and/or user registration information, and/or the context held by the AMF. For example, when the network allows the request of the UE, the first condition is determined to be true; and when the network does not allow the request of the UE, the first condition is determined to be false. Besides, when the network to which the UE is registered and/or an apparatus within the network supports a function requested by the UE, the first condition may be determined to be true; and when the network and/or the apparatus does not support the function requested by the UE, the first condition may be determined to be false. Further, when the identification information transmitted and/or received is allowed, the first condition may be determined to be true, and when the identification information transmitted and/or received is not allowed, the first condition may be determined to be false. In addition, conditions for determining whether the first condition is determined to be true or false may not be limited to the above conditions.

First, a case in which the first condition is determined to be true will be described. The AMF_210 can first perform determination of the fourth condition in the procedure (A) of FIG. 9. The fourth condition is to determine whether the AMF_210 transmits and/or receives an SM message to and/or from an SMF.

In addition, determination of the fourth condition may be performed based on whether the AMF_210 has received the SM message. Besides, determination of the fourth condition may also be performed based on whether the SM message is included in the registration request message. For example, when the AMF_210 has received the SM message and/or the SM message is included in the registration request message, the fourth condition may be determined to be true; and when the AMF_210 has not received the SM message and/or the SM message is not included in the registration request message, the fourth condition may be determined to be false. In addition, conditions for determining whether the fourth condition is determined to be true or false may not be limited to the above conditions.

When the fourth condition is determined to be true, the AMF_210 selects an SMF and transmits and/or receives the SM message to and/or from the selected SMF. When the fourth condition is determined to be false, the AMF does not select the SMF nor perform the transmission/reception of the SM message (S806). Here, it is assumed that the SMF_220 is selected. In addition, even in a case that the fourth condition is determined to be true, the AMF_210 may cease the procedure (A) of FIG. 9 when it receives an SM message indicating rejection from the SMF. At this time, the AMF_210 can initiate the procedure (B) of FIG. 9.

In addition, the AMF_210 can notify the SMF_220 of the identification information received in the registration request message when the AMF_210 transmits and/or receives the SM message to and/or from the SMF_220 in S806. The SMF_220 can obtain the identification information received from the AMF_210 by transmitting and/or receiving the SM message to and/or from the AMF.

Next, the AMF_210 transmits a registration accept message to the UE via the gNB_110 as a response message to the registration request message based on the reception of the registration request message and/or the completion of the transmission/reception of the SM message to and/or from the SMF_220 (S808). For example, when the fourth condition is determined to be true, the AMF_210 may transmit the registration accept message based on the reception of the registration request message from the UE. Besides, when the fourth condition is determined to be false, the AMF_210 may transmit the registration accept message based on the completion of the transmission/reception of the SM message to and/or from the SMF_220. In addition, the registration accept message is a NAS message transmitted and/or received on the N1 interface, but it is included in the RRC message to be transmitted and/or received between the UE and the gNB_110.

The AMF_210 may transmit the registration accept message including at least one piece of the 11th, 14th, and 15th identification information. Here, the contents indicated by the 11th, 14th, and 15th identification information may be as described above. The AMF_210 can notify the UE of the contents of the identification information by transmitting at least one piece of the identification information. Besides, the AMF_210 may indicate, by transmitting the identification information, that the network supports each function or that the request of the UE has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

Besides, the AMF_210 may select and determine which identification information is to be included in the registration accept message based on each piece of received identification information, and/or subscriber information and/or capability information of the network and/or an operator policy and/or a state of the network and/or user registration information, and/or the context held by the AMF_210, and the like.

In addition, the AMF_210 can transmit the registration accept message including the SM message (e.g., a PDU session establishment accept message), or can transmit the SM message (e.g., the PDU session establishment accept message) together with the registration accept message. However, this transmission method may be performed in a case that an SM message (e.g., the PDU session establishment request message) is included in the registration request message, and the fourth condition is determined to be true. Besides, this transmission method may be performed in a case that an SM message (e.g., the PDU session establishment request message) is included along with the registration request message, and the fourth condition is determined to be true. The AMF can indicate that a procedure for SM has been accepted in the registration procedure by performing such a transmission method.

Besides, the AMF_210 may indicate that the request of the UE has been accepted by transmitting a registration accept message based on each piece of received identification information, and/or subscriber information and/or capability information of the network and/or an operator policy and/or a state of the network and/or user registration information, and/or the context held by the AMF, and the like.

Further, the AMF_210 may indicate the reason why a part of the request(s) of the UE is rejected by transmitting a registration accept message that includes information indicating that a part of the request(s) of the UE has been rejected, or by transmitting information indicating that a part of the request(s) of the UE has been rejected. Furthermore, the UE may recognize the reason why a part of the request(s) of the UE is rejected by receiving information indicating that a part of the request(s) of the UE has been rejected. In addition, the reason for the rejection may be information indicating that the content indicated by the identification information received by the AMF_210 is not allowed.

The UE receives the registration accept message via the gNB_110 (S808). The UE can recognize, by receiving the registration accept message, that the request of the UE based on the registration request message has been accepted and/or the contents of various identification information included in the registration accept message.

The UE can also transmit a registration complete message to the AMF_210 via the gNB_110 as a response message to the registration accept message (S810). Besides, when the UE receives an SM message such as a PDU session establishment accept message, the UE may transmit the registration complete message that includes an SM message such as a PDU session establishment complete message or may indicate that the procedure for SM has been completed by including the SM message. Here, the registration complete message is a NAS message transmitted and/or received on the N1 interface, but it is included in the RRC message to be transmitted and/or received between the UE and the gNB.

The AMF_210 receives the registration complete message via the gNB_110 (S810). Besides, each apparatus completes the procedure (A) of FIG. 9 based on the transmission and/or the reception of the registration accept message and/or the registration complete message.

Next, a case in which the first condition is determined to be false will be described. In the procedure (B) of FIG. 9, the AMF_210 transmits a registration reject message to the UE via the gNB_110 as a response message to the registration request message (S812). Besides, the registration reject message is a NAS message transmitted and/or received on the N1 interface, but it is included in the RRC message to be transmitted and/or received between the UE and the gNB_110.

In addition, the AMF_210 may indicate, by transmitting a registration reject message, that the request of the UE based on the registration request message has been rejected. Further, the AMF_210 may transmit the registration reject message that includes information indicating a reason for the rejection or may indicate a reason for the rejection by transmitting the reason for the rejection. Furthermore, the UE may recognize the reason why the request of the UE is rejected by receiving information indicating the reason why the request of the UE is rejected. In addition, the reason for the rejection may be information indicating that the content indicated by the identification information received by the AMF is not allowed.

The UE receives the registration reject message via the gNB_110 (S812). The UE can recognize, by receiving a registration reject message, that the request of the UE based on the registration request message has been rejected and the contents of various identification information included in the registration reject message. Besides, after transmitting the registration request message, the UE may recognize that the request of the UE has been rejected if the UE does not receive the registration reject message even after a predetermined period of time has elapsed. Each apparatus completes the procedure (B) in the present procedure based on the transmission/reception of the registration reject message.

In addition, the procedure (B) of FIG. 9 may be initiated when the procedure (A) of FIG. 9 is ceased. In the procedure (A) of FIG. 9, when the fourth condition is determined to be true, the AMF_210 may transmit the registration reject message that includes an SM message indicating a rejection such as a PDU session establishment reject message, or may indicate that the procedure for SM is rejected by including the SM message indicating the rejection. In that case, the UE may further receive the SM message indicating the rejection such as the PDU session establishment reject message or may recognize that the procedure for SM has been rejected.

Each apparatus completes the registration procedure based on the completion of the procedures (A) and (B) of FIG. 9. In addition, each apparatus may transition to a state in which the UE is registered in the network (RM_REGISTERED state) based on the completion of the procedure (A) of FIG. 9, or may maintain a state in which the UE is not registered in the network (RM_DEREGISTERED state) based on the completion of the procedure (B) of FIG. 9, or may transition to a state in which the UE is not registered in the network. Besides, a transition to each state of each apparatus may be performed based on the completion of the registration procedure or may be performed based on the establishment of a PDU session.

Further, each apparatus may perform processing based on information transmitted and/or received in the registration procedure according to the completion of the registration procedure. For example, each apparatus may recognize the reason why the request of the UE is rejected when it transmits and/or receives the information indicating that a part of the request(s) of the UE has been rejected. Further, based on the reason why the request of the UE is rejected, each apparatus may perform the present procedure again, or may perform a registration procedure for the core network or another cell.

Furthermore, based on the completion of the registration procedure, the UE may store the identification information received together with the registration accept message and/or the registration reject message, or may recognize the determination of the network.

Figure 10:
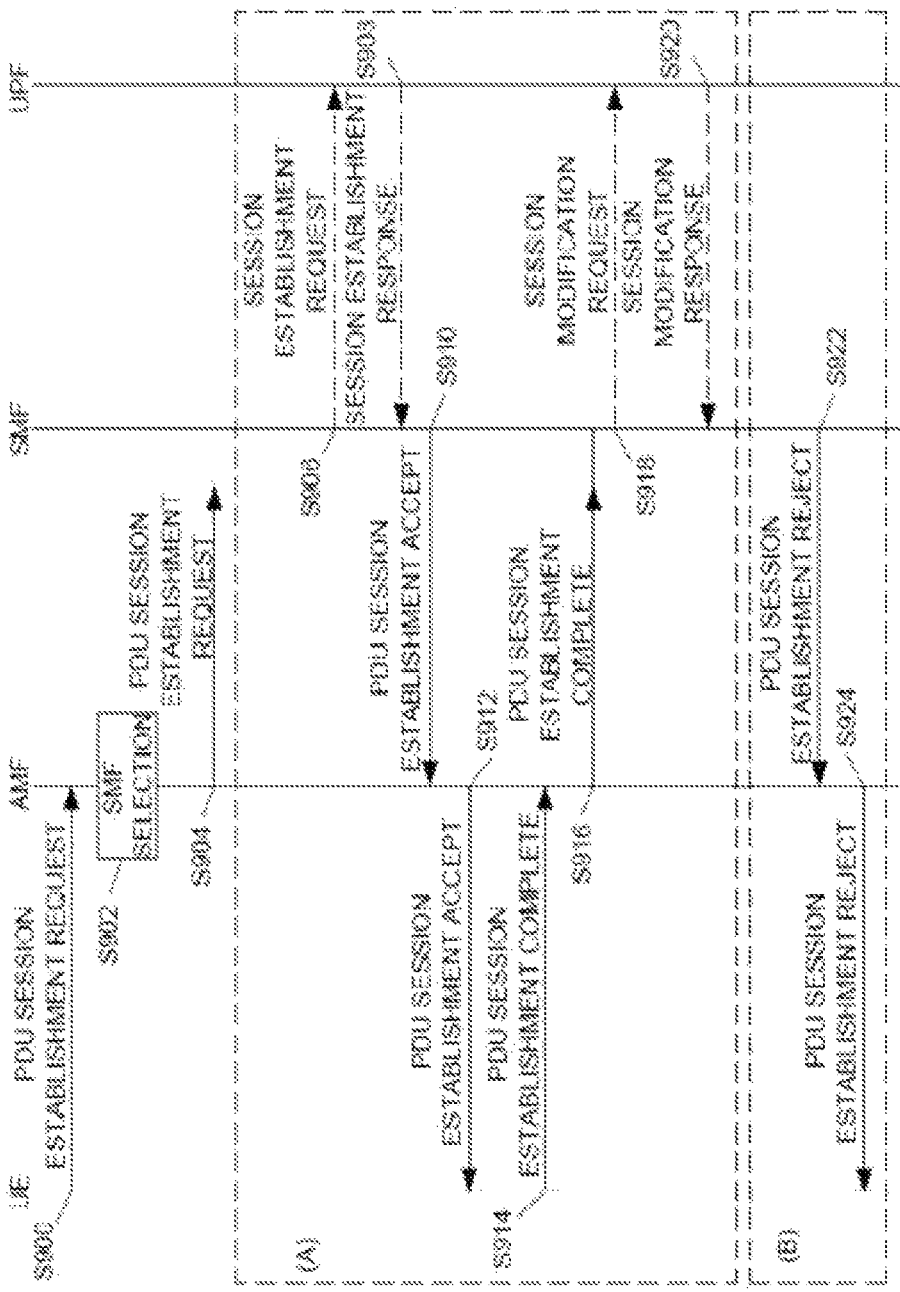
FIG. 10 is a diagram illustrating a PDU (Protocol Data Unit or Packet Data Unit) session establishment procedure.

4.2. PDU Session Establishment Procedure for Establishing a First PDU Session FIG. 10 is a diagram illustrating a PDU session establishment procedure. Next, an outline of a PDU session establishment procedure performed to establish a PDU session for a certain DN will be described with reference to FIG. 10. Here, the PDU session establishment procedure is also referred to as the present procedure. The PDU session establishment procedure is a procedure in 5GS. The PDU session establishment procedure is a procedure for each apparatus to establish a PDU session. In addition, each apparatus may initiate a PDU session establishment procedure at any time when the registration procedure is completed and the apparatus transitions to a registered state. Besides, each apparatus may also be able to perform the PDU session establishment procedure within a registration procedure. In addition, each apparatus may establish a PDU session based on the completion of a PDU session establishment procedure. In addition, the PDU session establishment procedure may be a procedure initiated by the UE or may also be a procedure requested and initiated by the UE. Each apparatus may establish a plurality of PDU sessions by performing the PDU session establishment procedure multiple times.

Further, the UE may initiate the PDU session establishment procedure based on the identification information received in the registration procedure. For example, in a case that URLLC is supported, the UE may initiate a PDU session establishment procedure to establish a PDU session that supports URLLC. Further, in a case that redundant communication is supported, the UE may initiate a PDU session establishment procedure to establish a PDU session that supports redundant communication. Further, in a case that IP address preservation is supported, the UE may initiate a PDU session establishment procedure to establish a PDU session that supports IP address preservation.

First, the UE initiates a PDU session establishment procedure by transmitting a NAS message including a PDU session establishment request message to the SMF_220 via the 5G AN and the AMF_210 (S900) (S902) (S904).

More specifically, the UE transmits the NAS message including the PDU session establishment request message to the AMF_210 via the gNB_110 located within the 5G AN via the N1 interface (S900).

Here, the UE can transmit the PDU session establishment request message and/or the NAS message including at least one piece of the 21st to 23rd, and 28th identification information, but the at least one piece of the 21st to 23rd, and 28th identification information may also be included in a control message different from the above messages, e.g., a control message of a layer lower than the NAS layer (e.g., an RRC layer, an MAC layer, an RLC layer, and a PDCP layer) to be transmitted. Here, the NAS message may also be an uplink NAS transport (UL NAS TRANSPORT) message. Further, the contents indicated by the 21st to 23rd, and 28th identification information may be as described above, but an RSN (Redundant Sequence Number) indicated by the 22nd identification information preferably indicates that a PDU session to be established is the first PDU session, and an SSC mode indicated by the 23rd identification information is preferably the SSC mode 1. In addition, it is not excluded that the SSC mode indicated by the 23rd identification information is the SSC mode 2 or the SSC mode 3. The UE can notify the network of the contents of the identification information by transmitting the identification information. In addition, the identification information may be included in the messages to indicate the request of the UE. Besides, two or more pieces of identification information of the identification information may be configured as one or more pieces of identification information.

When the AMF_210 receives a NAS message including a PDU session establishment request message (S900), the AMF_210 extracts the PDU session establishment request message from the NAS message and selects an SMF as the forwarding destination of the PDU session establishment request message (S902). In addition, the AMF_210 may select the SMF of the forwarding destination based on each piece of identification information included in the PDU session establishment request message and/or included in the NAS message, and/or subscriber information and/or capability information of the network and/or an operator policy and/or a state of the network and/or user registration information, and/or the context held by the AMF, and the like. Here, it is assumed that the SMF_220 is selected.

The AMF_210 forwards the PDU session establishment request message to the selected SMF_220 via the N11 interface (S904).

When the SMF_220 receives the PDU session establishment request message, SMF_220 can recognize what the UE requests and/or various identification information included in the PDU session establishment request message. Further, the SMF_220 performs determination of the third condition. The third condition is to determine whether the SMF_220 accepts the request of the UE. In the third condition, the SMF_220 determines whether the third condition is determined to be true or false. The SMF_220 initiates the procedure (A) of FIG. 10 when the third condition is determined to be true and initiates the procedure (B) of FIG. 10 when the third condition is determined to be false.

In addition, determination of the third condition can be performed based on the PDU session establishment request message and/or each piece of identification information included in the PDU session establishment request message, and/or subscriber information and/or capability information of the network and/or an operator policy and/or a state of the network and/or user registration information, and/or the context held by the SMF_220. For example, in a case that the network allows the request of the UE, the third condition may be determined to be true. Further, in a case that the network does not allow the request of the UE, the third condition may be determined to be false. Further, in a case that the network to which the UE is connected and/or an apparatus located within the network supports a function requested by the UE, the third condition may be determined to be true; and in a case that the above-mentioned network and/or apparatus does not support the function requested by the UE, the third condition may be determined to be false. Further, in a case that the identification information transmitted and/or received is allowed, the third condition may be determined to be true, and in a case that the identification information transmitted and/or received is not allowed, the third condition may be determined to be false. In addition, conditions for determining whether the third condition is determined to be true or false may not be limited to the above conditions.

Next, steps performed when the third condition is determined to be true, that is, each step of the procedure (A) of FIG. 10, will be described. The SMF_220 selects a UPF to which the PDU session is to be established, transmits the session establishment request message to the selected UPF via the N4 interface (S906), and initiates the procedure (A) of FIG. 10. Here, it is assumed that the UPF_230 is selected.

Here, the SMF_220 may select one or more UPFs based on each piece of identification information obtained according to the reception of the PDU session establishment request message, and/or subscriber information and/or capability information of the network and/or an operator policy and/or a state of the network and/or user registration information, and/or the context held by the SMF_220, and the like. In addition, in a case that a plurality of UPFs are selected, the SMF_220 may transmit a session establishment request message to each UPF.

The UPF_230 receives the session establishment request message from the SMF_220 via the N4 interface (S906) and creates a context for the PDU session. Further, the UPF_230 transmits a session establishment response message to the SMF_220 via the interface N4 based on the reception of the session establishment request message and/or the creation of the context for the PDU session (S908).

The SMF_220 receives the session establishment response message from the UPF_230 via the N4 interface as a response message to the session establishment request message (S908). The SMF_220 may perform address assignment to assign an address to the UE based on the reception of the PDU session establishment request message and/or the selection of the UPF and/or the reception of the session establishment response message.

The SMF_220 transmits the PDU session establishment accept message to the UE via the AMF_210 based on the reception of the PDU session establishment request message, and/or the selection of the UPF, and/or the reception of the session establishment response message, and/or the completion of the address assignment for the address assigned to the UE (S910) (S912).

More specifically, the SMF_220 transmits the PDU session establishment accept message to the AMF_210 via the N11 interface (S910), and then the AMF_210 that receives the PDU session establishment accept message transmits a NAS message including the PDU session establishment accept message to the UE via the gNB_110 via the N1 interface (S912). In addition, the PDU session establishment accept message may be a NAS message, and may be a response message to the PDU session establishment request. Besides, the PDU session establishment accept message can indicate that establishment of the PDU session has been accepted. Further, the NAS message may also be a downlink NAS transport (DL NAS transport) message.

Here, the SMF_220 and/or the AMF_210 may indicate that the request of the UE based on the PDU session establishment request has been accepted by transmitting the PDU session establishment accept message.

The SMF_220 and/or the AMF_210 may transmit the PDU session establishment accept message including at least one piece of the 31st to 33rd, and 38th identification information. Here, the contents indicated by the 31st to 33rd, and 38th identification information may be as described above, but an RSN (Redundant Sequence Number) indicated by the 32nd identification information preferably indicates that a PDU session to be established is the first PDU session, and an SSC mode indicated by the 33rd identification information is preferably the SSC mode 1. Besides, the PDU session ID indicated by the 38th identification information may be the same as or different from the PDU session ID indicated by the 28th identification information included in the PDU session establishment request message of the present embodiment. The SMF_220 and/or the AMF_210 can notify the UE of the contents of the identification information by transmitting at least one piece of the identification information.

In addition, the SMF_220 and/or the AMF_210 may indicate, by transmitting the identification information, that the network supports each function or that the request of the UE has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

In addition, the SMF_220 and/or the AMF_210 may select and determine which identification information is to be included in the PDU session establishment accept message based on each piece of received identification information, and/or subscriber information and/or capability information of the network and/or an operator policy and/or a state of the network and/or user registration information, and/or the context held by the AMF, and the like.

Besides, the SMF_220 and/or the AMF_210 can include the selected and/or allowed PDU session ID in the PDU session establishment accept message. Further, the SMF_220 and/or the AMF_210 can specify a PDU session type that indicate the type of the selected and/or allowed PDU session. Any one of IPv4, IPv6, IP, Ethernet (registered trademark), and Unstructured can be specified as the PDU session type as described above. Besides, the SMF_220 and/or the AMF_210 can include the SSC mode of the selected and/or allowed PDU session in the PDU session establishment accept message.

Besides, the SMF_220 and the AMF_210 can include an approved QoS rule group in the PDU session establishment accept message. In addition, the approved QoS rule group may include one or more QoS rules. Further, when a plurality of QoS flows and/or user plane radio bearers are established in the present procedure, the approved QoS rule group may include a plurality of QoS rules. On the contrary, when only one QoS flow and/or user plane radio bearer is established in the present procedure, the approved QoS rule group includes one QoS rule.

Further, the SMF_220 may indicate the reason why a part of the request(s) of the UE is rejected by transmitting a PDU session establishment accept message that includes information indicating that a part of the request(s) of the UE has been rejected, or by transmitting information indicating that a part of the request(s) of the UE has been rejected. Furthermore, the UE may recognize the reason why a part of the request(s) of the UE is rejected by receiving information indicating that a part(s) of the request of the UE has been rejected. In addition, the reason for the rejection may be information indicating that the content indicated by the identification information received by the SMF_220 is not allowed.

The UE receives the NAS message including the PDU session establishment accept message from the AMF_210 via the N1 interface (S912). The UE can recognize, by receiving a PDU session establishment accept message, that the request of the UE based on the PDU session establishment request has been accepted and/or the contents of various identification information included in the PDU session establishment accept message.

Next, the UE transmits a PDU session establishment complete message to the SMF_220 via the AMF_210 (S914) (S916). More specifically, the UE transmits the PDU session establishment complete message to the AMF_210 via the N1 interface (S914). When the AMF_210 receives the PDU session establishment complete message from the UE, it transmits the PDU session establishment complete message to the SMF_220 via the N11 interface (S916).

In addition, the PDU session establishment complete message transmitted by the AMF_210 to the SMF_220 may be a response message to the PDU session establishment accept message transmitted from the SMF_220 to the AMF_210 in S910. Besides, the PDU session establishment complete message may be a NAS message. Besides, the PDU session establishment complete message may be any message indicating that the PDU session establishment procedure has been completed.

When the SMF_220 receives the PDU session establishment complete message from the AMF_210 via the N11 interface (S916), it can perform determination of the second condition. The second condition is to determine a type of the message to be transmitted and/or received on the N4 interface. In a case that the second condition is determined to be true, the SMF_220 transmits a session modification request message to the UPF_230 via the N4 interface (S918), and then receives a session modification accept message transmitted from the UPF_230 as a response message (S920). In a case that the second condition is determined to be false, the SMF_220 transmits a session establishment request message to the UPF_230 via the N4 interface (S918), and then receives a session modification accept message transmitted from the UPF_230 as a response message (S920).

In addition, determination of the second condition may be performed based on whether a session on the N4 interface for the PDU session is established. For example, the second condition may be determined to be true when the session on the N4 interface for the PDU session is established, and the second condition may be determined to be false when the session on the N4 interface for the PDU session is not established. In addition, conditions for determining whether the second condition is determined to be true or false may not be limited to the above conditions.

Each apparatus completes the procedure (A) of FIG. 10 based on the transmission/reception of the PDU session establishment complete message, and/or the transmission/reception of the session modification response message, and/or the transmission/reception of the session establishment response message. When the procedure (A) of FIG. 10 is completed, the UE is in a state where a PDU session for the DN is established.

Next, each step of the procedure (B) of FIG. 10 will be described. The SMF_220 transmits a PDU session establishment reject message to the UE via the AMF_210 (S922) (S924). More specifically, the SMF_220 transmits the PDU session establishment reject message to the AMF_210 via the N11 interface (S922). The AMF_210 receives the PDU session establishment request message from the SMF_220 via the N11 interface (S922), and then the AMF_210 transmits the PDU session establishment reject message to the UE via the N1 interface (S924).

In addition, the PDU session establishment reject message may be a NAS message. Besides, the PDU session establishment reject message may be any message indicating that the establishment of the PDU session has been rejected.

Here, the SMF_220 may indicate that the request of the UE based on the PDU session establishment request has been rejected by transmitting the PDU session establishment reject message. Further, the SMF_220 may transmit the PDU session establishment reject message that includes information indicating a reason for the rejection or may indicate a reason for the rejection by transmitting the reason for the rejection. Furthermore, the UE may recognize the reason why the request of the UE is rejected by receiving information indicating the reason why the request of the UE is rejected. In addition, the reason for the rejection may be information indicating that the content indicated by the identification information received by the SMF is not allowed.

The UE can recognize, by receiving a PDU session establishment reject message, that the request of the UE based on the PDU session establishment request has been rejected and the contents of various identification information included in the PDU session establishment reject message.

Each apparatus completes the PDU session establishment procedure based on the completion of the procedures (A) and (B) of FIG. 10. In addition, each apparatus may transition to a state in which the PDU session is established based on the completion of the procedure (A) of FIG. 10, or each apparatus may recognize that the PDU session establishment procedure has been rejected or may transition to a state in which the PDU session is not established based on the completion of the procedure (B) of FIG. 10. Further, the UE can communicate with the DN by using the established PDU session through the completion of the procedure (A) of FIG. 10.

Furthermore, each apparatus may perform processing based on the information transmitted and/or received in the PDU session establishment procedure based on the completion of the PDU session establishment procedure. For example, each apparatus may recognize the reason why the request of the UE is rejected when it transmits and/or receives the information indicating that a part of the request(s) of the UE has been rejected. Further, based on the reason why the request of the UE is rejected, each apparatus may perform the present procedure again, or may perform a PDU session establishment procedure for another cell.

Furthermore, based on the completion of the PDU session establishment procedure, the UE may store the identification information received together with the PDU session establishment accept message and/or the PDU session establishment reject message, or may recognize the determination of the network.

4.3. PDU Session Establishment Procedure for Establishing a Second PDU Session Next, each apparatus performs a PDU session establishment procedure to establish a second PDU session for the same DN for which the first PDU session is established. Here, the PDU session establishment procedure is also referred to as the present procedure. The present procedure is basically the same as the PDU session establishment procedure of Embodiment 4.2, but the gNB_110 needs to be replaced with gNB_112, the SMF_220 needs to be replaced with SMF_222, and the UPF_230 needs to be replaced with UPF_232. Further, the identification information included in the PDU session establishment request message and/or the NAS message and the identification information included in the PDU session establishment accept message are different from the identification information in Embodiment 4.2. However, since there are many parts in common with the description of Embodiment 4.2, the description of the common parts will be omitted, and the description will focus on the different parts. The UE, the AMF and the DN are the same as those in Embodiment 4.2.

First, the UE initiates a PDU session establishment procedure by transmitting a NAS message including a PDU session establishment request message to the SMF_222 via the 5G AN and the AMF_210 (S900) (S902) (S904), but the UE transmits the NAS message including the PDU session establishment request message to the gNB_112 instead of the gNB_110 (S900).

Here, the UE can transmit the PDU session establishment request message and/or the NAS message including at least one piece of the 21st to 23rd, and 28th identification information, but the at least one piece of the 21st to 23rd, and 28th identification information may also be included in a control message different from the above messages, e.g., a control message of a layer lower than the NAS layer (e.g., an RRC layer, an MAC layer, an RLC layer, and a PDCP layer) to be transmitted. Here, the NAS message may also be an uplink NAS transport (UL NAS TRANSPORT) message. Further, the contents indicated by the 21st to 23rd, and 28th identification information may be as described above, but an RSN (Redundant Sequence Number) indicated by the 22nd identification information preferably indicates that a PDU session to be established is the second PDU session, and an SSC mode indicated by the 23rd identification information is preferably the SSC mode 1.

Besides, the PDU session ID indicated by the 28th identification information is preferably different from the PDU session ID indicated by the 28th identification information included in the PDU session establishment request message of Embodiment 4.2, and preferably different from the PDU session ID indicated by the 38th identification information included in the PDU session establishment accept message of Embodiment 4.2.

The UE can notify the network of the contents of the identification information by transmitting the identification information. The identification information may be included in these messages to indicate a request of the UE. Besides, two or more pieces of identification information of the identification information may be configured as one or more pieces of identification information.

In addition, when the gNB_112 receives the PDU session establishment request message from the UE, the gNB_112 may forward the PDU session establishment request message directly to the AMF_210 via the N2 interface or may forward the PDU session establishment request message to the gNB_110 via the Xn interface, and the gNB_110 forwards the PDU session establishment request message to AMF_210 via the N2 interface. In addition, the gNB_112 may forward the PDU session establishment request message to the gNB_110 via the Xn interface, and the gNB_110 may forward the PDU session establishment request message to the AMF_210 via the N2 interface in a case that the N2 interface between the gNB_112 and the AMF_210 is not configured for the UE. In addition, the gNB_112 may forward the PDU session establishment request message directly to the AMF_210 via the N2 interface in a case that the N2 interface between the gNB_112 and the AMF_210 is configured for the UE.

Besides, when the AMF_210 receives the PDU session establishment request message, it selects the SMF_222 as its forwarding destination (S902) and forwards the PDU session establishment request message to the SMF_222 via the N11 interface (S904).

Besides, when the SMF_222 receives the PDU session establishment request message from the AMF_210 (S904), SMF_222 can recognize what the UE requests and recognize various identification information included in the PDU session establishment request message.

Further, the SMF_222 selects the UPF_232 as the UPF to which the PDU session is to be established and transmits the session establishment request message to the UPF_232 via the N4 interface (S906).

When the UPF_232 receives the session establishment request message from the SMF_222, the UPF_232 creates a context for the PDU session and transmits a session establishment response message to the SMF_222 via the N4 interface (S908).

When the SMF_222 receives the session establishment response message from UPF_232, it may perform address assignment to assign an address to the UE. The SMF_222 transmits a PDU session establishment accept message to the UE via the AMF_210 (S910) (S912). More specifically, the SMF_222 transmits the PDU session establishment accept message to the AMF_210 via the N11 interface (S910), and then the AMF_210 that receives the PDU session establishment accept message transmits a NAS message including the PDU session establishment accept message to the UE via the N1 interface (S912). At this time, when the gNB_112 transmits the PDU session establishment request message directly to the AMF_210, the AMF_210 may transmit the PDU session establishment accept message directly to the gNB_112. Further, when the gNB_112 transmits the PDU session establishment request message to the AMF_210 via the gNB_110, the AMF_210 may transmit the PDU session establishment accept message to the gNB_112 via the gNB_110. The gNB_112 transmits a NAS message including the PDU session establishment accept message to the UE.

Here, the NAS message may also be a downlink NAS transport (DL NAS transport) message. Further, the SMF_222 and/or the AMF_210 may transmit the PDU session establishment accept message including at least one piece of the 31st to 33rd, and 38th identification information. Here, the contents indicated by the 31st to 33rd, and 38th identification information may be as described above, but an RSN (Redundant Sequence Number) indicated by the 32nd identification information preferably indicates that a PDU session to be established is the second PDU session, and an SSC mode indicated by the 33rd identification information is preferably the SSC mode 1. Besides, the PDU session ID indicated by the 38th identification information is preferably different from the PDU session ID indicated by the 28th identification information included in the PDU session establishment request message of Embodiment 4.2, preferably different from the PDU session ID indicated by the 38th identification information included in the PDU session establishment accept message of Embodiment 4.2, and preferably the same as but may be different from the PDU session ID indicated by the 28th identification information included in the PDU session establishment request message of the present embodiment. The SMF_222 and/or the AMF_210 can notify the UE of the contents of the identification information by transmitting the identification information. In addition, the SMF_222 and/or the AMF_210 may indicate, by transmitting the identification information, that the network supports each function or that the request of the UE has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

Besides, the UE can recognize, by receiving a PDU session establishment accept message, that the request of the UE based on the PDU session establishment request has been accepted and/or the contents of various identification information included in the PDU session establishment accept message.

The differences between the present procedure and the procedure in Embodiment 4.2 are described as above. In addition, the description in Embodiment 4.2 can be applied to the parts not described in the present embodiment.

When the present procedure is completed, each apparatus may be in a state where the second PDU session is established for a DN that is the same as the DN for which the first PDU session has been already established.

The UE can perform redundant communication by using the second PDU session established as described above together with the first PDU session.

4.4. Cases where a PDU Session Establishment Procedure for Establishing a Second PDU Session is Restricted from being Performed Immediately after a PDU Session Establishment Procedure for Establishing a First PDU Session is Performed Each apparatus can establish a first PDU session by performing the procedure of Embodiment 4.2 and then immediately establish a second PDU session by performing the procedure of Embodiment 4.3, to perform redundant communication. However, depending on some situations, for example, in the case of congestion, each apparatus may not be able to establish the second PDU session immediately after establishing the first PDU session. In the present embodiment, those situations are described in four cases.

4.4.1. Case 1

Case 1 is a case where the establishment of the second PDU session is restricted in the PDU session establishment procedure of Embodiment 4.2 performed to establish the first PDU session.

More specifically, this is a case where when the UE transmits a PDU session establishment request message to the SMF_220 in the PDU session establishment procedure of Embodiment 4.2, the UE may receive a PDU session establishment accept message including at least one piece of the 40th to 41st identification information from the SMF_220, thereby restricting the establishment of the second PDU session.

Here, the contents indicated by the 40th identification information and the 41st identification information may also be as described above.

In other words, when the UE receives the PDU session establishment accept message including at least one piece of the 40th to 41st identification information in the PDU session establishment procedure of Embodiment 4.2, the UE cannot perform the PDU session establishment procedure of Embodiment 4.3 until a time period indicated by the 41st identification information elapses (for example, a timer expires). Further, the UE can perform the PDU session establishment procedure of Embodiment 4.3 after the time period indicated by the 41st identification information has elapsed (for example, a timer has expired). In other words, the UE that has received a timer value included in the PDU session establishment accept message of Embodiment 4.2 sets a timer with the timer value that restricts the execution of the PDU session establishment procedure of Embodiment 4.3, and the UE can initiate the procedure (i.e., the PDU session establishment procedure of Embodiment 4.3) for establishing the second PDU session after the set timer expires.

4.4.2. Case 2

Case 2 is the same as Case 1 and is a case where the establishment of the second PDU session is restricted in the PDU session establishment procedure of Embodiment 4.2 performed to establish the first PDU session.

More specifically, this is a case where when the UE transmits a PDU session establishment request message to the SMF_220 in the PDU session establishment procedure of Embodiment 4.2, the UE may receive a PDU session establishment accept message including at least one piece of the 40th to 41st identification information from the SMF_220, thereby restricting the establishment of the second PDU session.

Here, the contents indicated by the 40th identification information and the 41st identification information may also be as described above.

In other words, when the UE receives the PDU session establishment accept message including at least one piece of the 40th to 41st identification information in the PDU session establishment procedure of Embodiment 4.2, the UE cannot perform the PDU session establishment procedure of Embodiment 4.3 until a time period indicated by the 41st identification information elapses (for example, a timer expires). Up to this point, it is the same as Case 1.

However, the UE may be configured to perform the PDU session establishment procedure of Embodiment 4.3 before the time period indicated by the 41st identification information elapses (for example, the timer expires) by a PDU session modification command message transmitted from the core network side after the PDU session establishment procedure of Embodiment 4.2 is completed but before the time period indicated by the 41st identification information elapses (for example, the timer expires), or the time period indicated by the 41st identification information (i.e., the time period in which the PDU session establishment procedure of Embodiment 4.3 cannot be performed) may be configured to be set to be extended or shortened.

Further, after the PDU session establishment procedure of Embodiment 4.2 is completed, if the UE does not perform the PDU session establishment procedure of Embodiment 4.3 even after the period indicated by the 41st identification information has elapsed (for example, the timer has expired), the time period indicated by the 41st identification information (i.e., the period in which the PDU session establishment procedure of Embodiment 4.3 cannot be performed) can be reset by a PDU session modification command message transmitted from the core network side.

In addition, when the UE receives a PDU session establishment accept message including at least the 40th identification information in the PDU session establishment procedure of Embodiment 4.2, the UE may be configured to be able to perform the PDU session establishment procedure of Embodiment 4.3 and to initiate the PDU session establishment procedure of Embodiment 4.3 by a PDU session modification command message transmitting from the core network side. In this case, the PDU session establishment accept message may not include the 41st identification information.

More specifically, after the PDU session establishment procedure of Embodiment 4.2 is completed, the UE can change, by the PDU session modification command message including at least one piece of the 61st to 62nd identification information received from the SMF_220, the timing at which the procedure for establishing the second PDU session is initiated.

Here, the contents indicated by the 61st identification information and the 62nd identification information may also be as described above.

In addition, preferably, the 61st identification information is information indicating a PDU session ID for identifying a PDU session established as the first PDU session, or information indicating a PDU session ID for identifying a PDU session established as the second PDU session, or information indicating empty (null).

Further, when the 61st identification information is information indicating a PDU session ID for identifying a PDU session established as the first PDU session, the 62nd identification information may be information indicating that the establishment of the second PDU session is allowed and/or information indicating that the second PDU session can be established and/or information indicating that communication using the second PDU session is allowed and/or information indicating that communication using the second PDU session can be performed.

Further, when the 61st identification information is information indicating a PDU session ID for identifying a PDU session established as the second PDU session, the 62nd identification information may be information indicating that the establishment of the second PDU session is allowed and/or information indicating that the second PDU session can be established and/or information indicating that communication using the second PDU session is allowed and/or information indicating that communication using the second PDU session can be performed.

Further, when the 61st identification information is information indicating a PDU session ID for identifying a PDU session established as the second PDU session, the 62nd identification information may be information indicating a request for reactivation of the PDU session, more specifically, may be the 39th 5GSM cause value (5GSM cause), or may be information indicating a reactivation request.

Further, when the 61st identification information is information indicating empty (null), the 62nd identification information may be information indicating that the establishment of the second PDU session is allowed and/or information indicating that the second PDU session can be established and/or information indicating that communication using the second PDU session is allowed and/or information indicating that communication using the second PDU session can be performed.

Further, when the 61st identification information is information indicating empty (null), the 62nd identification information may be information indicating a request for reactivation of the PDU session, more specifically, may be the 39th 5GSM cause value (5GSM cause), or may be information indicating a reactivation request.

In addition, the PDU session modification command message may not include the 61st identification information and may indicate empty (null). In other words, when the PDU session modification command message does not include the 61st identification information, the 62nd identification information may be information indicating that the establishment of the second PDU session is allowed and/or information indicating that the second PDU session can be established and/or information indicating that communication using the second PDU session is allowed and/or information indicating that communication using the second PDU session can be performed.

Further, when the PDU session modification command message does not include the 61st identification information, the 62nd identification information may be information indicating a request for reactivation of the PDU session, more specifically, may be the 39th 5GSM cause value (5GSM cause), or may be information indicating a reactivation request.

Further, the PDU session modification command message may include the 41st identification information. When the PDU session modification command message includes the 41st identification information, it may include the 62nd identification information but may not include the 62nd identification information. In addition, when the PDU session modification command message includes the 41st identification information and the 62nd identification information, the information indicated by the 62nd identification information may be interpreted preferentially with the information indicated by the 41st identification information ignored, or the information indicated by the 62nd identification information may be ignored with the information indicated by the 41st identification information interpreted preferentially.

Here, the content indicated by the 41st identification information may be as described above, but may indicate, for example, a time period (timer value) during which the second PDU session is not allowed to be established.

For example, when the timer value indicated by the 41st identification information is zero, the UE can set a timer with the timer value that restricts the execution of the PDU session establishment procedure of Embodiment 4.3 and can perform the PDU session establishment procedure of Embodiment 4.3 after the set timer expires.

Besides, when the timer value indicated by the 41st identification information is a non-zero value, the UE sets a timer with the timer value that restricts the execution of the PDU session establishment procedure of Embodiment 4.3 and waits until the set timer expires, and then can perform the PDU session establishment procedure of Embodiment 4.3 after the set timer expires.

In addition, the expression "performing the PDU session establishment procedure of Embodiment 4.3 after the timer expires" may also mean "performing the PDU session establishment procedure of Embodiment 4.3 by the UE immediately after the timer expires," or may mean "performing the PDU session establishment procedure of Embodiment 4.3 by the UE at any time after the timer expires."

4.4.3. Case 3

Next, Case 3 is different from Case 1 and Case 2 and is a case where the establishment of the second PDU session is restricted in the PDU session establishment procedure of Embodiment 4.3 performed to establish the second PDU session.

More specifically, this is a case where the UE performs the PDU session establishment procedure of Embodiment 4.3 after completing the PDU session establishment procedure of Embodiment 4.2, but the establishment of the second PDU session is restricted in the PDU session establishment procedure of Embodiment 4.3. More specifically, this is a case where when the UE transmits a PDU session establishment request message to the SMF_222 in the PDU session establishment procedure of Embodiment 4.3, the UE may receive a PDU session establishment reject message including at least one piece of the 51st to 52nd identification information from the SMF_222, thereby restricting the establishment of the second PDU session.

Here, the contents indicated by the 51st identification information and the 52nd identification information may also be as described above.

In other words, when the UE completes the PDU session establishment procedure of Embodiment 4.2, establishes the first PDU session, and then receives the PDU session establishment reject message including at least one piece of the 51st to 52nd identification information at any time in the PDU session establishment procedure of Embodiment 4.3, the UE cannot perform the PDU session establishment procedure of Embodiment 4.3 again until a time period indicated by the 52nd identification information elapses (for example, a timer expires). Further, the UE can perform the PDU session establishment procedure of Embodiment 4.3 again after the time period indicated by the 52nd identification information has elapsed (for example, a timer has expired). In other words, the UE that has received a timer value included in the PDU session establishment reject message of Embodiment 4.3 from the SMF_222 sets a timer again with the timer value that restricts the execution of the PDU session establishment procedure of Embodiment 4.3, and the UE can initiate the procedure (i.e., the PDU session establishment procedure of Embodiment 4.3) for establishing the second PDU session after the set timer expires. In other words, the UE can transmit the PDU session establishment request message to the SMF_222 again after the timer expires.

4.4.4. Case 4

Case 4 is the same as Case 3 and is a case where the establishment of the second PDU session is restricted in the PDU session establishment procedure of Embodiment 4.3 performed to establish the second PDU session.

However, the difference between Case 4 and Case 3 is that the establishment of the second PDU session is restricted by the PDU session establishment grant message in Case 4 while the establishment of the second PDU session is restricted by the PDU session establishment reject message in Case 3.

More specifically, this is a case where the UE performs the PDU session establishment procedure of Embodiment 4.3 after completing the PDU session establishment procedure of Embodiment 4.2, but the establishment of the second PDU session is restricted in the PDU session establishment procedure of Embodiment 4.3. More specifically, this is a case where when the UE transmits a PDU session establishment request message to the SMF_222 in the PDU session establishment procedure of Embodiment 4.3, the UE may receive a PDU session establishment grant message including at least one piece of the 40th to 41st identification information from the SMF_222, thereby restricting the establishment of the second PDU session.

Here, the contents indicated by the 40th identification information and the 41st identification information may also be as described above.

In addition, since the UE receives the PDU session establishment grant message in the PDU session establishment procedure of Embodiment 4.3 performed for establishing the second PDU session, the procedure itself may be successful (normally completed), but the UE may be in a state where the second PDU session cannot be established. Here, the expression that "the second PDU session cannot be established" may mean that "the second PDU session is established but cannot be used".

In other words, when the UE completes the PDU session establishment procedure of Embodiment 4.2, establishes the first PDU session, and then receives the PDU session establishment accept message including at least one piece of the 40th to 41st identification information at any time in the PDU session establishment procedure of Embodiment 4.3, the UE cannot establish the second PDU session until a time period indicated by the 41st identification information elapses (for example, a timer expires). Further, the UE can establish the second PDU session after the time period indicated by the 41st identification information has elapsed (for example, a timer has expired). Here, the expression that "the second PDU session can be established" may mean that "the second PDU session is established and can be used".

In other words, the UE that has received a timer value included in the PDU session establishment accept message of Embodiment 4.3 sets a timer with the timer value that restricts the establishment of the second PDU session, and the UE can establish the second PDU session after the set timer expires.

However, the UE may be configured to establish the second PDU session before the time period indicated by the 41st identification information elapses (for example, the timer expires) by a PDU session modification command message transmitted from the core network side after the PDU session establishment accept message is received but before the time period indicated by the 41st identification information elapses (for example, the timer expires), or the time period indicated by the 41st identification information (i.e., the time period in which the second PDU session cannot be established) may be configured to be set to be extended or shortened.

Further, after the PDU session establishment accept message is received, if the second PDU session is not established even after the period indicated by the 41st identification information has elapsed (for example, the timer has expired), the time period indicated by the 41st identification information (i.e., the period in which the second PDU session cannot be established) can be reset by a PDU session modification command message transmitted from the core network side.

In addition, when the UE receives a PDU session establishment accept message including at least the 40th identification information in the PDU session establishment procedure of Embodiment 4.3, the UE may be configured to be able to establish the second PDU session and to perform communication using the second PDU session by a PDU session modification command message transmitting from the core network side. In this case, the PDU session establishment accept message may not include the 41st identification information.

More specifically, after the PDU session establishment procedure of Embodiment 4.3 is completed, the UE can change, by the PDU session modification command message including at least one piece of the 61st to 62nd identification information received from the SMF_222, the timing at which the second PDU session is established.

Here, the contents indicated by the 61st identification information and the 62nd identification information may also be as described above.

In addition, the 61st identification information is preferably information indicating a PDU session ID for identifying the PDU session established as the second PDU session.

Besides, the 62nd identification information may be information indicating that the establishment of the second PDU session is allowed and/or information indicating that the second PDU session can be established and/or information indicating that communication using the second PDU session is allowed and/or information indicating that communication using the second PDU session can be performed.

Further, the 62nd identification information may be information indicating a request for reactivation of the PDU session, more specifically, may be the 39th 5GSM cause value (5GSM cause), or may be information indicating a reactivation request.

Further, the PDU session modification command message may include the 41st identification information. When the PDU session modification command message includes the 41st identification information, it may include the 62nd identification information but may not include the 62nd identification information. In addition, when the PDU session modification command message includes the 41st identification information and the 62nd identification information, the information indicated by the 62nd identification information may be interpreted preferentially with the information indicated by the 41st identification information ignored, or the information indicated by the 62nd identification information may be ignored with the information indicated by the 41st identification information interpreted preferentially.

Here, the content indicated by the 41st identification information may be as described above, but may indicate, for example, a time period (timer value) during which the second PDU session is not allowed to be established.

For example, when the timer value indicated by the 41st identification information is zero, the UE can set a timer with the timer value that restricts the establishment of the second PDU session and can establish the second PDU session after the set timer expires.

Besides, when the timer value indicated by the 41st identification information is a non-zero value, the UE sets a timer with the timer value that restricts the establishment of the second PDU session and waits until the set timer expires, and then can establish the second PDU session after the set timer expires.

In addition, the expression "establishing the second PDU session after the timer expires" may also mean "establishing the second PDU session by the UE immediately after the timer expires," or may mean "establishing the second PDU session by the UE at any time after the timer expires".

5. Second Embodiment

Next, the second embodiment will be described. Hereinafter, the second embodiment will be referred to as the present embodiment.

The present embodiment is described in the order of Embodiment 5.1 "Registration Procedure", Embodiment 5.2 "PDU Session Establishment Procedure for Establishing a First PDU Session", Embodiment 5.3 "PDU Session Establishment Procedure for Establishing a Second PDU Session", Embodiment 5.4 "Cases where a PDU session establishment procedure for establishing a second PDU session is restricted from being performed immediately after a PDU session establishment procedure for establishing a first PDU session is performed", and Embodiment 5.5 "Procedure for Changing a PDU Session Anchor that provides SSC Mode 3 Second PDU Session".

First, each apparatus transitions to a state in which a UE is registered with the network by performing a registration procedure described in Embodiment 5.1.

Next, each apparatus establishes a first PDU session by performing the PDU session establishment procedure described in Embodiment 5.2, and transitions to a state in which communication using the first PDU session can be performed between the UE and a DN.

Next, each apparatus establishes a second PDU session by performing the PDU session establishment procedure described in Embodiment 5.3, and transitions to a state in which communication using the second PDU session can be performed between the UE and a DN. In this case, since the UE can transmit and/or receive user data by using the first PDU session and the second PDU session, it can be said that each apparatus is in a state where redundant communication can be performed.

Next, cases where each apparatus is restricted from immediately performing the PDU session establishment procedure for establishing the second PDU session after performing the PDU session establishment procedure described in Embodiment 5.2 will be described in Embodiment 5.4.

Finally, the procedure for changing the PDU session anchor (i.e., UPF) while continuing the session, by releasing the second (existing) PDU session after establishing a third (new) PDU session by performing a procedure for changing the PDU session anchor that provides the SSC mode 3 PDU session in a case that each apparatus performs the procedure described in Embodiment 5.5 so that the SSC mode of the second PDU session is SSC mode 3, will be described.

In addition, in the procedure of the present embodiment, each apparatus may exchange URLLC support information, redundant communication support information, and/or IP address preservation support information between the UE and the network in the registration procedure.

Further, in the PDU session establishment procedure, each apparatus may establish a PDU session supporting URLLC, a PDU session supporting redundant communication, or a PDU session supporting IP address preservation between the UE and the network based on the information exchanged in the registration procedure. In addition, the PDU session supporting URLLC, the PDU session supporting redundant communication, and the PDU session supporting IP address preservation may be PDU sessions that can be established only for a specific DN. Here, the specific DN may be, for example, an LADN.

Further, each apparatus may perform, by using an established PDU session, user data communication supporting URLLC, redundant communication, or user data communication supporting IP address preservation.

Besides, the contents described in the present embodiment can also be applied to a case where the above-mentioned apparatuses are configured as different apparatuses (i.e., different physical hardware, different logical hardware, or different software).

5.1. Registration Procedure

The registration procedure of the present embodiment may be the same as the registration procedure of the first embodiment (i.e., the registration procedure of Embodiment 4.1), and thus the description thereof will be omitted. Each apparatus (particularly, the UE_10 and the AMF_210) can transition to a registered state (RM-REGISTERED state) based on completion of the registration procedure.

5.2. PDU Session Establishment Procedure for Establishing a First PDU Session Next, an outline of a PDU session establishment procedure performed to establish a PDU session for a certain DN will be described with reference to FIG. 10. Here, the PDU session establishment procedure is also referred to as the present procedure. The present procedure is basically the same as the PDU session establishment procedure of Embodiment 4.2, but the identification information included in the PDU session establishment request message and/or the NAS message and the identification information included in the PDU session establishment accept message are different from the identification information in Embodiment 4.2. However, since there are many parts in common with the description of Embodiment 4.2, the description of the common parts will be omitted, and the description will focus on the different parts. In addition, the UE, gNB_110, AMF_210, SMF_220, and UPF_230 are the same as those in Embodiment 4.2.

First, the UE can transmit a PDU session establishment request message and/or a NAS message including at least one piece of the 21st to 26th, and 28th identification information. Here, the NAS message may also be an uplink NAS transport (UL NAS TRANSPORT) message. Further, the contents indicated by the 21st to 26th, and 28th identification information may be as described above, but an RSN (Redundant Sequence Number) indicated by the 22nd identification information preferably indicates that a PDU session to be established is the first PDU session, and an SSC mode indicated by the 23rd identification information may be the SSC mode 1, may be the SSC mode 2, or may be the SSC mode 3. Further, a DNN indicated by the 25th identification information is preferably the DNN indicated by the 14th identification information included in the registration accept message of Embodiment 5.1. Further, S-NSSAI indicated by the 26th identification information is preferably the S-NSSAI indicated by the 15th identification information included in the registration accept message of Embodiment 5.1.

The UE_10 can notify the network of the contents of the identification information by transmitting the identification information. Besides, the identification information may be included in these messages to indicate a request of the UE_10. Besides, two or more pieces of identification information of the identification information may be configured as one or more pieces of identification information.

When the SMF_220 receives the PDU session establishment request message, SMF_220 can recognize what the UE requests and/or various identification information included in the PDU session establishment request message.

Besides, the SMF_222 and/or the AMF_210 may transmit the PDU session establishment accept message including at least one piece of the 31st to 36th, and 38th identification information. Here, the contents indicated by the 31st to 36th, and 38th identification information may be as described above, but an RSN (Redundant Sequence Number) indicated by the 32nd identification information preferably indicates that a PDU session to be established is the first PDU session, and an SSC mode indicated by the 33rd identification information may be the SSC mode 1, may be the SSC mode 2, or may be the SSC mode 3.

Further, the content indicated by the 35th identification information may be the same as or different from the content indicated by the 25th identification information included in the PDU session establishment request message of the present embodiment. Further, a DNN indicated by the 35th identification information is preferably the DNN indicated by the 14th identification information included in the registration accept message of Embodiment 5.1. Further, the content indicated by the 36th identification information may be the same as or different from the content indicated by the 26th identification information included in the PDU session establishment request message of the present embodiment. Further, S-NSSAI indicated by the 36th identification information is preferably the S-NSSAI indicated by the 15th identification information included in the registration accept message of Embodiment 5.1.

Besides, the PDU session ID indicated by the 38th identification information may be the same as or different from the PDU session ID indicated by the 28th identification information included in the PDU session establishment request message of the present embodiment. The SMF_220 and/or the AMF_210 can notify the UE_10 of the contents of the identification information by transmitting at least one piece of the identification information. In addition, the SMF_220 and/or the AMF_210 may indicate, by transmitting the identification information, that the network supports each function or that the request of the UE_10 has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

The UE_10 can recognize, by receiving a PDU session establishment accept message, that the request of the UE_10 based on the PDU session establishment request has been accepted and/or the contents of various identification information included in the PDU session establishment accept message.

The differences between the present procedure and the procedure in Embodiment 4.2 are described as above. In addition, the description in Embodiment 4.2 can be applied to the parts not described in the present embodiment.

When the present procedure is completed, each apparatus is in a state where the first PDU session for the DN is established.

5.3. PDU Session Establishment Procedure for Establishing a Second PDU Session

Next, each apparatus performs a PDU session establishment procedure in order to establish a second PDU session for the same DN for which the first PDU session is established. Here, the PDU session establishment procedure is also referred to as the present procedure. The present procedure is basically the same as the PDU session establishment procedure of Embodiment 4.3, but the identification information included in the PDU session establishment request message and/or the NAS message and the identification information included in the PDU session establishment accept message are different from the identification information in Embodiment 4.3. However, since there are many parts in common with the description of Embodiment 4.3, the description of the common parts will be omitted, and the description will focus on the different parts. In addition, the apparatuses related to the present procedure are UE, gNB_110, gNB_112, AMF_210, SMF_222, UPF_232, and DN_300, which are the same as those in Embodiment 4.3.

First, the UE can transmit a PDU session establishment request message and/or a NAS message including at least one piece of the 21st to 28th identification information. Here, the NAS message may also be an uplink NAS transport (UL NAS TRANSPORT) message. Further, the contents indicated by the 21st to 28th identification information may be as described above, but an RSN (Redundant Sequence Number) indicated by the 22nd identification information preferably indicates that a PDU session to be established is the second PDU session. Besides, the content indicated by the 23rd identification information is preferably the same as the content indicated by the 33rd identification information included in the PDU session establishment accept message of Embodiment 5.2. Besides, the content indicated by the 24th identification information is preferably the same as the content indicated by the 34th identification information included in the PDU session establishment accept message of Embodiment 5.2.

Besides, the content indicated by the 25th identification information is preferably the same as the content indicated by the 35th identification information included in the PDU session establishment accept message of Embodiment 5.2. Further, a DNN indicated by the 25th identification information is preferably the DNN indicated by the 14th identification information included in the registration accept message of Embodiment 5.1. Besides, the content indicated by the 26th identification information is preferably the same as the content indicated by the 36th identification information included in the PDU session establishment accept message of Embodiment 5.2. Further, S-NSSAI indicated by the 26th identification information is preferably the S-NSSAI indicated by the 15th identification information included in the registration accept message of Embodiment 5.1.

Besides, the content indicated by the 27th identification information is preferably the same as the content indicated by the 28th identification information included in the PDU session establishment request message of Embodiment 5.2, and preferably the same as the content indicated by the 38th identification information included in the PDU session establishment accept message of Embodiment 5.2. Besides, the content indicated by the 28th identification information is preferably different from the content indicated by the 28th identification information included in the PDU session establishment request message of Embodiment 5.2, and preferably different from the content indicated by the 38th identification information included in the PDU session establishment accept message of Embodiment 5.2.

The UE can notify the network of the contents of the identification information by transmitting the identification information. The identification information may be included in these messages to indicate a request of the UE. Besides, two or more pieces of identification information of the identification information may be configured as one or more pieces of identification information.

Besides, when the SMF_222 receives the PDU session establishment request message from the AMF_210 (S904), SMF_222 can recognize what the UE requests and recognize various identification information included in the PDU session establishment request message.

Besides, the SMF_222 and/or the AMF_210 may transmit the PDU session establishment accept message including at least one piece of the 31st to 38th identification information. Here, the contents indicated by the 31st to 38th identification information may be as described above, but an RSN (Redundant Sequence Number) indicated by the 32nd identification information preferably indicates that a PDU session to be established is the second PDU session. Besides, the content indicated by the 33rd identification information may be the same as or different from the content indicated by the 23rd identification information included in the PDU session establishment request message of the present embodiment. Besides, the content indicated by the 34th identification information may be the same as or different from the content indicated by the 24th identification information included in the PDU session establishment request message of the present embodiment.

Besides, the content indicated by the 35th identification information may be the same as or different from the content indicated by the 25th identification information included in the PDU session establishment request message of the present embodiment. Further, a DNN indicated by the 35th identification information is preferably the DNN indicated by the 14th identification information included in the registration accept message of Embodiment 5.1. Besides, the content indicated by the 36th identification information may be the same as or different from the content indicated by the 26th identification information included in the PDU session establishment request message of the present embodiment. Further, S-NSSAI indicated by the 36th identification information is preferably the S-NSSAI indicated by the 15th identification information included in the registration accept message of Embodiment 5.1.

Besides, the content indicated by the 37th identification information may be the same as or different from the content indicated by the 27th identification information included in the PDU session establishment request message of the present embodiment. Besides, the content indicated by the 38th identification information may be the same as or different from the content indicated by the 28th identification information included in the PDU session establishment request message of the present embodiment. Besides, the PDU session ID indicated by the 38th identification information is preferably different from the PDU session ID indicated by the 28th identification information included in the PDU session establishment request message of Embodiment 5.2, preferably different from the PDU session ID indicated by the 38th identification information included in the PDU session establishment accept message of Embodiment 5.2, and preferably the same as but may be different from the PDU session ID indicated by the 28th identification information included in the PDU session establishment request message of the present embodiment. The SMF_222 and/or the AMF_210 can notify the UE of the contents of the identification information by transmitting the identification information. In addition, the SMF_222 and/or the AMF_210 may indicate, by transmitting the identification information, that the network supports each function or that the request of the UE has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

Besides, the UE can recognize, by receiving a PDU session establishment accept message, that the request of the UE based on the PDU session establishment request has been accepted and/or the contents of various identification information included in the PDU session establishment accept message.

The differences between the present procedure and the procedure in Embodiment 4.3 are described as above. In addition, the description in Embodiment 4.3 can be applied to the parts not described in the present embodiment.

When the present procedure is completed, each apparatus may be in a state where the second PDU session is established for a DN that is the same as the DN for which the first PDU session has been already established.

The UE can perform redundant communication by using the second PDU session established as described above together with the first PDU session.

5.4. Cases where a PDU Session Establishment Procedure for Establishing a Second PDU Session is Restricted from being Performed Immediately after a PDU Session Establishment Procedure for Establishing a First PDU Session is Performed The cases of the present embodiment may be the same as the descriptions in Embodiment 4.4 of the first embodiment, and thus the descriptions thereof will be omitted.

Figure 11:
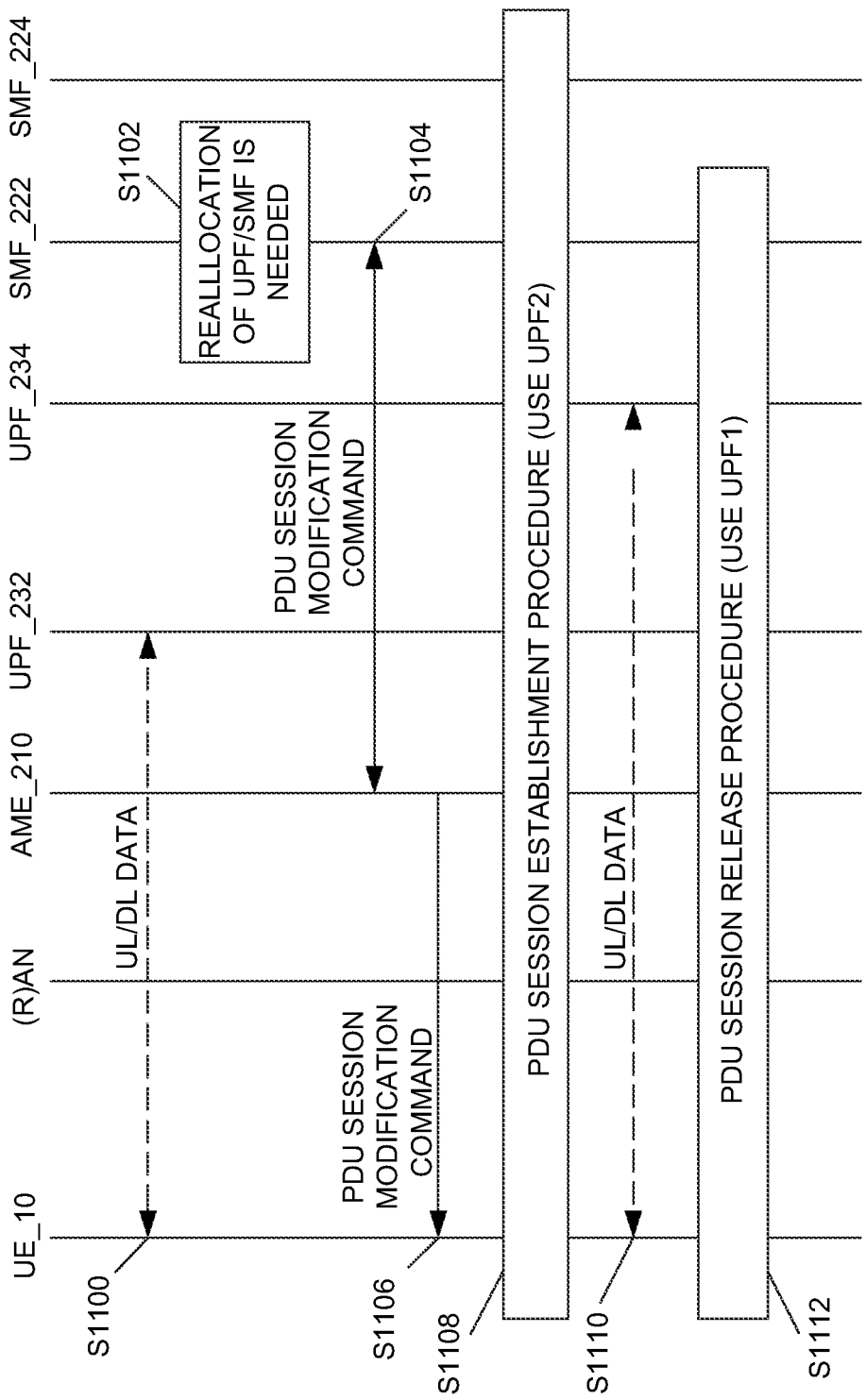
FIG. 11 is a diagram illustrating a procedure for changing a PDU session anchor that provides a service continuity (SSC) mode 3 PDU session.

5.5. Procedure for Changing a PDU Session Anchor that Provides SSC Mode 3 Second PDU Session FIG. 11 is a diagram illustrating a procedure for changing a PDU session anchor that provides an SSC mode 3 PDU session. Next, a procedure for changing the PDU session anchor (PSA) that provides a PDU session, in a case that the second PDU session is established by performing the PDU session establishment procedure in Embodiment 5.3 and that the SSC mode of the PDU session is the SSC mode 3, will be described with reference to FIG. 11. This procedure is a procedure triggered by a network (SMF) and is a procedure for releasing an existing (old) PDU session associated with an old PDU session anchor after a new PDU session for the same DN is established with a new PDU session anchor. In addition, in this procedure, an AMF is not changed, but an SMF may be changed.

The UE transmits and/or receives user data by using the second PDU session. Specifically, the UE transmits and/or receives uplink data and/or downlink data to and/or from the DN_300 via the UPF_232 (S1100).

When the SMF_222 determines that the UPF and/or the SMF need to be changed (S1102), the SMF_222 transmits to the AMF_210 an N1 SM (Session Management) container including a PDU session modification command message including at least one piece of the 61st to 62nd identification information (S1104). In addition, the N1 SM container can also be a NAS message. Further, the NAS message may also be a downlink NAS transport (DL NAS transport) message. Here, the contents indicated by the 61st to 62nd identification information may be as described above, but the 61st identification information may be information indicating a PDU session ID for identifying a PDU session established as the second PDU session, and the 62nd identification information may be information indicating that a PDU session needs to be re-established for the same DN.

Besides, as a method for transmitting the 61st identification information, the SMF_222 may transmit an N1 SM (Session Management) container including a PDU session modification command message including the 62nd identification information and the 61st identification information, separately. These may also be transmitted as a NAS message.

The AMF_210 forwards the NAS message received from the SMF_222 to the UE (S1106).

In addition, the SMF_222 and/or AMF_210 may indicate, by transmitting the identification information, a request for establishing a new PDU session and releasing the old PDU session. Further, two or more pieces of identification information of the identification information may be configured as one or more pieces of identification information.

When the UE receive the NAS message, it may determine to initiate a PDU session establishment procedure for the same DN (S1108). The UE can, by receiving the PDU session modification command message, request for establishing a new PDU session, release an old PDU session, and/or recognize the content of each piece of identification information included in the PDU session modification command message. The PDU session establishment procedure is basically the same as the PDU session establishment procedure of Embodiment 5.3, but the SMF_222 needs to be replaced with SMF_224, and the UPF_232 needs to be replaced with UPF_234. Further, the identification information included in the PDU session establishment request message and/or the NAS message and the identification information included in the PDU session establishment accept message are different from the identification information in Embodiment 5.3. However, since there are many parts in common with the description of Embodiment 5.3, the description of the common parts will be omitted, and the description will focus on the different parts. In addition, the UE, gNB_110, gNB_112, AMF_210, and DN are the same as those in Embodiment 5.3.

First, the UE initiates a PDU session establishment procedure by transmitting a NAS message including a PDU session establishment request message to the SMF_224 via the 5G AN and the AMF_210 (S900) (S902) (S904), but the UE transmits the NAS message including the PDU session establishment request message to the gNB_112 instead of the gNB_110 (S900).

Here, the UE can transmit the PDU session establishment request message and/or the NAS message including at least one piece of the 21st to 29th identification information, but the at least one piece of the 21st to 29th identification information may also be included in a control message different from the above messages, e.g., a control message of a layer lower than the NAS layer (e.g., an RRC layer, an MAC layer, an RLC layer, and a PDCP layer) to be transmitted. Here, the NAS message may also be an uplink NAS transport (UL NAS TRANSPORT) message. Further, the contents indicated by the 21st to 29th identification information may be as described above, but an RSN (Redundant Sequence Number) indicated by the 22nd identification information preferably indicates that a PDU session to be established is the second PDU session. Besides, the content indicated by the 23rd identification information is preferably the same as the content indicated by the 33rd identification information included in the PDU session establishment accept message of Embodiment 5.3, and/or preferably the same as the content indicated by the 23rd identification information included in the PDU session establishment request message of Embodiment 5.3. Besides, the content indicated by the 24th identification information is preferably the same as the content indicated by the 34th identification information included in the PDU session establishment accept message of Embodiment 5.3, and/or preferably the same as the content indicated by the 24th identification information included in the PDU session establishment request message of Embodiment 5.3. Besides, the content indicated by the 25th identification information is preferably the same as the content indicated by the 35th identification information included in the PDU session establishment accept message of Embodiment 5.3, and/or preferably the same as the content indicated by the 25th identification information included in the PDU session establishment request message of Embodiment 5.3. Besides, the content indicated by the 26th identification information is preferably the same as the content indicated by the 36th identification information included in the PDU session establishment accept message of Embodiment 5.3, and/or preferably the same as the content indicated by the 26th identification information included in the PDU session establishment request message of Embodiment 5.3.

Besides, the PDU session ID indicated by the 27th identification information preferably indicates the PDU session ID established in the PDU session establishment procedure of Embodiment 5.2. Besides, the PDU session ID indicated by the 28th identification information is preferably different from the PDU session ID indicated by the 27th identification information of the present embodiment, and is also preferably different from the PDU session ID indicated by the 29th identification information of the present embodiment. Besides, the PDU session ID indicated by the 28th identification information may preferably indicate a newly established PDU session ID. Besides, the PDU session ID indicated by the 29th identification information preferably indicates the PDU session ID established in the PDU session establishment procedure of Embodiment 5.3. The UE can notify the network of the contents of the identification information by transmitting the identification information. The identification information may be included in these messages to indicate a request of the UE. Besides, two or more pieces of identification information of the identification information may be configured as one or more pieces of identification information.

In addition, when the gNB_112 receives the PDU session establishment request message from the UE, the gNB_112 may forward the PDU session establishment request message directly to the AMF_210 via the N2 interface or may forward the PDU session establishment request message to the gNB_110 via the Xn interface, and the gNB_110 forwards the PDU session establishment request message to AMF_210 via the N2 interface. In addition, the gNB_112 may forward the PDU session establishment request message to the gNB_110 via the Xn interface, and the gNB_110 may forward the PDU session establishment request message to the AMF_210 via the N2 interface in a case that the N2 interface between the gNB_112 and the AMF_210 is not configured for the UE. In addition, the gNB_112 may forward the PDU session establishment request message directly to the AMF_210 via the N2 interface in a case that the N2 interface between the gNB_112 and the AMF_210 is configured for the UE.

Besides, when the AMF_210 receives the PDU session establishment request message, it selects the SMF_224 as its forwarding destination (S902) and forwards the PDU session establishment request message to the SMF_224 via the N11 interface (S904).

Besides, when the SMF_224 receives the PDU session establishment request message from the AMF_210 (S904), SMF_224 can recognize what the UE requests and recognize various identification information included in the PDU session establishment request message.

Further, the SMF_224 selects the UPF_234 as the UPF to which the PDU session is to be established and transmits the session establishment request message to the UPF_234 via the N4 interface (S906).

When the UPF_234 receives the session establishment request message from the SMF_224, the UPF_234 creates a context for the PDU session and transmits a session establishment response message to the SMF_224 via the N4 interface (S908).

When the SMF_224 receives the session establishment response message from UPF_234, it may perform address assignment to assign an address to the UE. The SMF_224 transmits a PDU session establishment accept message to the UE via the AMF_210 (S910) (S912). More specifically, the SMF_224 transmits the PDU session establishment accept message to the AMF_210 via the N11 interface (S910), and then the AMF_210 that receives the PDU session establishment accept message transmits a NAS message including the PDU session establishment accept message to the UE via the N1 interface (S912). At this time, when the gNB_112 transmits the PDU session establishment request message directly to the AMF_210, the AMF_210 may transmit the PDU session establishment accept message directly to the gNB_112. Further, when the gNB_112 transmits the PDU session establishment request message to the AMF_210 via the gNB_110, the AMF_210 may transmit the PDU session establishment accept message to the gNB_112 via the gNB_110. The gNB_112 transmits a NAS message including the PDU session establishment accept message to the UE.

Besides, the SMF_224 and/or the AMF_210 may transmit the PDU session establishment accept message including at least one piece of the 31st to 39th identification information. Here, the contents indicated by the 31st to 39th identification information may be as described above, but an RSN (Redundant Sequence Number) indicated by the 32nd identification information preferably indicates that a PDU session to be established is the second PDU session. Besides, the content indicated by the 33rd identification information may be the same as the content indicated by the 23rd identification information included in the PDU session establishment request message of the present embodiment. Besides, the content indicated by the 34th identification information may be the same as the content indicated by the 24th identification information included in the PDU session establishment request message of the present embodiment. Besides, the content indicated by the 35th identification information may be the same as the content indicated by the 25th identification information included in the PDU session establishment request message of the present embodiment. Besides, the content indicated by the 36th identification information may be the same as the content indicated by the 26th identification information included in the PDU session establishment request message of the present embodiment. Besides, the content indicated by the 37th identification information may be the same as the content indicated by the 27th identification information included in the PDU session establishment request message of the present embodiment. Besides, the content indicated by the 38th identification information may be the same as the content indicated by the 28th identification information included in the PDU session establishment request message of the present embodiment. Besides, the content indicated by the 39th identification information may be the same as the content indicated by the 29th identification information included in the PDU session establishment request message of the present embodiment. The SMF_224 and/or the AMF_210 can notify the UE of the contents of the identification information by transmitting the identification information. In addition, the SMF_224 and/or the AMF_210 may indicate, by transmitting the identification information, that the network supports each function or that the request of the UE has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

Besides, the UE can recognize, by receiving a PDU session establishment accept message, that the request of the UE based on the PDU session establishment request has been accepted and/or the contents of various identification information included in the PDU session establishment accept message.

The differences between the present procedure and the procedure in Embodiment 5.3 are described as above. In addition, the description in Embodiment 5.3 can be applied to the parts not described in the present embodiment.

As described above, a new PDU session for redundant communication can be established. In other words, when the present procedure is completed, the UE can transmit and/or receive uplink data and/or downlink data via the UPF_234 as a new UPF (S1110). In other words, the UE can perform redundant communication by using the PDU session established by the PDU session establishment procedure in Embodiment 5.2, the PDU session established by the PDU session establishment procedure in Embodiment 5.3, and the PDU session established by the procedure in the present embodiment.

Then, after the new PDU session is established, each apparatus performs a PDU session release procedure (S1112) so as to release the old PDU session (i.e., the PDU session established by the PDU session establishment procedure in Embodiment 5.3). In addition, the PDU session release procedure may also be initiated by expiration of a timer of the UE or expiration of a timer of the SMF.

According to the above, the PDU session anchor for the redundant communication can be changed from the UPF_232 to the UPF_234. That is, the UE can perform the redundant communication by using the PDU session established by the PDU session establishment procedure in Embodiment 5.2 and the PDU session established by the procedure in the present embodiment.

6. Third Embodiment

Next, the third embodiment will be described. Hereinafter, the third embodiment will be referred to as the present embodiment.

The present embodiment is described in the order of Embodiment 6.1 "Registration Procedure", Embodiment 6.2 "PDU Session Establishment Procedure for Establishing a First PDU Session", Embodiment 6.3 "PDU Session Establishment Procedure for Establishing a Second PDU Session", Embodiment 6.4 "Cases where a PDU session establishment procedure for establishing a second PDU session is restricted from being performed immediately after a PDU session establishment procedure for establishing a first PDU session is performed", and Embodiment 6.5 "Procedure for Changing a PDU Session Anchor that provides SSC Mode 3 Second PDU Session".

First, each apparatus transitions to a state in which a UE is registered with the network by performing a registration procedure described in Embodiment 6.1.

Next, each apparatus establishes a first PDU session by performing the PDU session establishment procedure described in Embodiment 6.2, and transitions to a state in which communication using the first PDU session can be performed between the UE and a DN.

Next, each apparatus establishes a second PDU session by performing the PDU session establishment procedure described in Embodiment 6.3, and transitions to a state in which communication using the second PDU session can be performed between the UE and a DN. In this case, since the UE can transmit and/or receive user data by using the first PDU session and the second PDU session, it can be said that each apparatus is in a state where redundant communication can be performed.

Next, cases where each apparatus is restricted from immediately performing the PDU session establishment procedure for establishing the second PDU session after performing the PDU session establishment procedure described in Embodiment 6.2 will be described in Embodiment 6.4.

Finally, the procedure for changing the PDU session anchor (i.e., UPF) while continuing the session, by releasing the second (existing) PDU session after establishing a third (new) PDU session by performing a procedure for changing the PDU session anchor that provides the SSC mode 3 PDU session in a case that each apparatus performs the procedure described in Embodiment 6.5 so that the SSC mode of the second PDU session is SSC mode 3, will be described.

In addition, in the procedure of the present embodiment, each apparatus may exchange URLLC support information, redundant communication support information, and/or IP address preservation support information between the UE and the network in the registration procedure.

Further, in the PDU session establishment procedure, each apparatus may establish a PDU session supporting URLLC, a PDU session supporting redundant communication, or a PDU session supporting IP address preservation between the UE and the network based on the information exchanged in the registration procedure. In addition, the PDU session supporting URLLC, the PDU session supporting redundant communication, and the PDU session supporting IP address preservation may be PDU sessions that can be established only for a specific DN. Here, the specific DN may be, for example, an LADN.

Further, each apparatus may perform, by using an established PDU session, user data communication supporting URLLC, redundant communication, or user data communication supporting IP address preservation.

Besides, the contents described in the present embodiment can also be applied to a case where the above-mentioned apparatuses are configured as different apparatuses (i.e., different physical hardware, different logical hardware, or different software).

6.1. Registration Procedure

The registration procedure of the present embodiment may be the same as the registration procedure of the second embodiment (i.e., the registration procedure of Embodiment 5.1), and thus the description thereof will be omitted. Each apparatus (particularly, the UE_10 and the AMF_210) can transition to a registered state (RM-REGISTERED state) based on completion of the registration procedure.

6.2. PDU Session Establishment Procedure for Establishing a First PDU Session The PDU session establishment procedure for establishing the first PDU session according to the present embodiment may be the same as the PDU session establishment procedure for establishing the first PDU session according to the second embodiment (i.e., the PDU session establishment procedure in Embodiment 5.2), and thus the description thereof will be omitted. When the present procedure is completed, each apparatus is in a state where the first PDU session for the DN is established.

6.3. PDU Session Establishment Procedure for Establishing a Second PDU Session Next, each apparatus performs a PDU session establishment procedure in order to establish a second PDU session for the same DN for which the first PDU session is established. Here, the PDU session establishment procedure is also referred to as the present procedure. The present procedure is basically the same as the PDU session establishment procedure of Embodiment 5.3, but the identification information included in the PDU session establishment request message and/or the NAS message and the identification information included in the PDU session establishment accept message are different from the identification information in Embodiment 5.3. However, since there are many parts in common with the description of Embodiment 5.3, the description of the common parts will be omitted, and the description will focus on the different parts. In addition, the apparatuses related to the present procedure are UE, gNB_110, gNB_112, AMF_210, SMF_222, UPF_232, and DN_300, which are the same as those in Embodiment 5.3.

First, the UE can transmit a PDU session establishment request message and/or a NAS message including at least one piece of the 21st to 26th, and 28th identification information. Here, the NAS message may also be an uplink NAS transport (UL NAS TRANSPORT) message. Further, the contents indicated by the 21st to 26th, and 28th identification information may be as described above, but an RSN (Redundant Sequence Number) indicated by the 22nd identification information preferably indicates that a PDU session to be established is the second PDU session. Besides, the content indicated by the 23rd identification information is preferably different from the content indicated by the 33rd identification information included in the PDU session establishment accept message of Embodiment 6.2. Besides, the content indicated by the 24th identification information is preferably different from the content indicated by the 34th identification information included in the PDU session establishment accept message of Embodiment 6.2.

Besides, the content indicated by the 25th identification information is preferably different from the content indicated by the 35th identification information included in the PDU session establishment accept message of Embodiment 6.2. Further, a DNN indicated by the 25th identification information is preferably the DNN indicated by the 14th identification information included in the registration accept message of Embodiment 6.1. Besides, the content indicated by the 26th identification information is preferably different from the content indicated by the 36th identification information included in the PDU session establishment accept message of Embodiment 6.2. Further, S-NSSAI indicated by the 26th identification information is preferably the S-NSSAI indicated by the 15th identification information included in the registration accept message of Embodiment 6.1.

Besides, the content indicated by the 28th identification information is preferably different from the content indicated by the 28th identification information included in the PDU session establishment request message of Embodiment 6.2, and preferably different from the content indicated by the 38th identification information included in the PDU session establishment accept message of Embodiment 6.2.

The UE can notify the network of the contents of the identification information by transmitting the identification information. The identification information may be included in these messages to indicate a request of the UE. Besides, two or more pieces of identification information of the identification information may be configured as one or more pieces of identification information.

Besides, when the SMF_222 receives the PDU session establishment request message from the AMF_210 (S904), SMF_222 can recognize what the UE requests and recognize various identification information included in the PDU session establishment request message.

Besides, the SMF_222 and/or the AMF_210 may transmit the PDU session establishment accept message including at least one piece of the 31st to 36th, and 38th identification information. Here, the contents indicated by the 31st to 36th, and 38th identification information may be as described above, but an RSN (Redundant Sequence Number) indicated by the 32nd identification information preferably indicates that a PDU session to be established is the second PDU session. Besides, the content indicated by the 33rd identification information may be the same as or different from the content indicated by the 23rd identification information included in the PDU session establishment request message of the present embodiment. Besides, the content indicated by the 34th identification information may be the same as or different from the content indicated by the 24th identification information included in the PDU session establishment request message of the present embodiment.

Besides, the content indicated by the 35th identification information may be the same as or different from the content indicated by the 25th identification information included in the PDU session establishment request message of the present embodiment. Further, a DNN indicated by the 35th identification information is preferably the DNN indicated by the 14th identification information included in the registration accept message of Embodiment 6.1. Besides, the content indicated by the 36th identification information may be the same as or different from the content indicated by the 26th identification information included in the PDU session establishment request message of the present embodiment. Further, S-NSSAI indicated by the 36th identification information is preferably the S-NSSAI indicated by the 15th identification information included in the registration accept message of Embodiment 6.1.

Besides, the content indicated by the 38th identification information may be the same as or different from the content indicated by the 28th identification information included in the PDU session establishment request message of the present embodiment. Besides, the PDU session ID indicated by the 38th identification information is preferably different from the PDU session ID indicated by the 28th identification information included in the PDU session establishment request message of Embodiment 6.2, preferably different from the PDU session ID indicated by the 38th identification information included in the PDU session establishment accept message of Embodiment 6.2, and preferably the same as but may be different from the PDU session ID indicated by the 28th identification information included in the PDU session establishment request message of the present embodiment. The SMF_222 and/or the AMF_210 can notify the UE of the contents of the identification information by transmitting the identification information. In addition, the SMF_222 and/or the AMF_210 may indicate, by transmitting the identification information, that the network supports each function or that the request of the UE has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

Besides, the UE can recognize, by receiving a PDU session establishment accept message, that the request of the UE based on the PDU session establishment request has been accepted and/or the contents of various identification information included in the PDU session establishment accept message.

The differences between the present procedure and the procedure in Embodiment 5.3 are described as above. In addition, the description in Embodiment 5.3 can be applied to the parts not described in the present embodiment.

When the present procedure is completed, each apparatus may be in a state where the second PDU session is established for a DN that is the same as the DN for which the first PDU session has been already established.

The UE can perform redundant communication by using the second PDU session established as described above together with the first PDU session.

6.4. Cases where a PDU Session Establishment Procedure for Establishing a Second PDU Session is Restricted from being Performed Immediately after a PDU Session Establishment Procedure for Establishing a First PDU Session is Performed The cases of the present embodiment may be the same as the descriptions in Embodiment 5.4 of the second embodiment, and thus the descriptions thereof will be omitted.

6.5. Procedure for Changing a PDU Session Anchor that Provides SSC Mode 3 Second PDU Session The "procedure for changing the PDU session anchor that provides the SSC mode 3 second PDU session" in the present embodiment may be the same as the "procedure for changing the PDU session anchor that provides the SSC mode 3 second PDU session" (i.e., the procedure in Embodiment 5.5) in the second embodiment, and thus the description thereof will be omitted.

7. Fourth Embodiment

Next, the fourth embodiment will be described. Hereinafter, the fourth embodiment will be referred to as the present embodiment.

The present embodiment is described in the order of Embodiment 7.1 "Registration Procedure", Embodiment 7.2 "PDU Session Establishment Procedure for Establishing a First PDU Session", Embodiment 7.3 "PDU Session Establishment Procedure for Establishing a Second PDU Session", Embodiment 7.4 "Cases where a PDU session establishment procedure for establishing a second PDU session is restricted from being performed immediately after a PDU session establishment procedure for establishing a first PDU session is performed", and Embodiment 7.5 "Procedure for Changing a PDU Session Anchor that provides SSC Mode 3 Second PDU Session".

First, each apparatus transitions to a state in which a UE is registered with the network by performing a registration procedure described in Embodiment 7.1.

Next, each apparatus establishes a first PDU session by performing the PDU session establishment procedure described in Embodiment 7.2, and transitions to a state in which communication using the first PDU session can be performed between the UE and a DN.

Next, each apparatus establishes a second PDU session by performing the PDU session establishment procedure described in Embodiment 7.3, and transitions to a state in which communication using the second PDU session can be performed between the UE and a DN. In this case, since the UE can transmit and/or receive user data by using the first PDU session and the second PDU session, it can be said that each apparatus is in a state where redundant communication can be performed.

Next, cases where each apparatus is restricted from immediately performing the PDU session establishment procedure for establishing the second PDU session after performing the PDU session establishment procedure described in Embodiment 7.2 will be described in Embodiment 7.4.

Finally, the procedure for changing the PDU session anchor (i.e., UPF) while continuing the session, by releasing the second (existing) PDU session after establishing a third (new) PDU session by performing a procedure for changing the PDU session anchor that provides the SSC mode 3 PDU session in a case that each apparatus performs the procedure described in Embodiment 7.5 so that the SSC mode of the second PDU session is SSC mode 3, will be described.

In addition, in the procedure of the present embodiment, each apparatus may exchange URLLC support information, redundant communication support information, and/or IP address preservation support information between the UE and the network in the registration procedure.

Further, in the PDU session establishment procedure, each apparatus may establish a PDU session supporting URLLC, a PDU session supporting redundant communication, or a PDU session supporting IP address preservation between the UE and the network based on the information exchanged in the registration procedure. In addition, the PDU session supporting URLLC, the PDU session supporting redundant communication, and the PDU session supporting IP address preservation may be PDU sessions that can be established only for a specific DN. Here, the specific DN may be, for example, an LADN.

Further, each apparatus may perform, by using an established PDU session, user data communication supporting URLLC, redundant communication, or user data communication supporting IP address preservation.

Besides, the contents described in the present embodiment can also be applied to a case where the above-mentioned apparatuses are configured as different apparatuses (i.e., different physical hardware, different logical hardware, or different software).

7.1. Registration Procedure

The registration procedure of the present embodiment may be the same as the registration procedure of the third embodiment (i.e., the registration procedure of Embodiment 6.1), and thus the description thereof will be omitted. Each apparatus (particularly, the UE_10 and the AMF_210) can transition to a registered state (RM-REGISTERED state) based on completion of the registration procedure.

7.2. PDU Session Establishment Procedure for Establishing a First PDU Session The PDU session establishment procedure for establishing the first PDU session according to the present embodiment may be the same as the PDU session establishment procedure for establishing the first PDU session according to the third embodiment (i.e., the PDU session establishment procedure in Embodiment 6.2), and thus the description thereof will be omitted. When the present procedure is completed, each apparatus is in a state where the first PDU session for the DN is established.

7.3. PDU Session Establishment Procedure for Establishing a Second PDU Session Next, each apparatus performs a PDU session establishment procedure in order to establish a second PDU session for the same DN for which the first PDU session is established. Here, the PDU session establishment procedure is also referred to as the present procedure. The present procedure is basically the same as the PDU session establishment procedure of Embodiment 6.3, but the identification information included in the PDU session establishment request message and/or the NAS message and the identification information included in the PDU session establishment accept message are different from the identification information in Embodiment 6.3. However, since there are many parts in common with the description of Embodiment 6.3, the description of the common parts will be omitted, and the description will focus on the different parts. In addition, the apparatuses related to the present procedure are UE, gNB_110, gNB_112, AMF_210, SMF_222, UPF_232, and DN_300, which are the same as those in Embodiment 6.3.

First, the UE can transmit a PDU session establishment request message and/or a NAS message including at least one piece of the 21st to 28th identification information. Here, the NAS message may also be an uplink NAS transport (UL NAS TRANSPORT) message. Further, the contents indicated by the 21st to 26th, and 28th identification information may be the same as those in Embodiment 6.3. Besides, the content indicated by the 27th identification information may be the same as that in Embodiment 5.3. The UE can notify the network of the contents of the identification information by transmitting the identification information. The identification information may be included in these messages to indicate a request of the UE. Besides, two or more pieces of identification information of the identification information may be configured as one or more pieces of identification information.

Besides, when the SMF_222 receives the PDU session establishment request message from the AMF_210 (S904), SMF_222 can recognize what the UE requests and recognize various identification information included in the PDU session establishment request message.

Besides, the SMF_222 and/or the AMF_210 may transmit the PDU session establishment accept message including at least one piece of the 31st to 38th identification information. Here, the contents indicated by the 31st to 36th, and 38th identification information may be the same as those in Embodiment 6.3. Besides, the content indicated by the 37th identification information may be the same as that in Embodiment 5.3. The SMF_222 and/or the AMF_210 can notify the UE of the contents of the identification information by transmitting the identification information. In addition, the SMF_222 and/or the AMF_210 may indicate, by transmitting the identification information, that the network supports each function or that the request of the UE has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

Besides, the UE can recognize, by receiving a PDU session establishment accept message, that the request of the UE based on the PDU session establishment request has been accepted and/or the contents of various identification information included in the PDU session establishment accept message.

The differences between the present procedure and the procedure in Embodiment 6.3 are described as above. In addition, the description in Embodiment 6.3 can be applied to the parts not described in the present embodiment.

When the present procedure is completed, each apparatus may be in a state where the second PDU session is established for a DN that is the same as the DN for which the first PDU session has been already established.

The UE can perform redundant communication by using the second PDU session established as described above together with the first PDU session.

7.4. Cases where a PDU Session Establishment Procedure for Establishing a Second PDU Session is Restricted from being Performed Immediately after a PDU Session Establishment Procedure for Establishing a First PDU Session is Performed The cases of the present embodiment may be the same as the descriptions in Embodiment 6.4 of the third embodiment, and thus the descriptions thereof will be omitted.

7.5. Procedure for Changing a PDU Session Anchor that Provides SSC Mode 3 Second PDU Session The "procedure for changing the PDU session anchor that provides the SSC mode 3 second PDU session" in the present embodiment may be the same as the "procedure for changing the PDU session anchor that provides the SSC mode 3 second PDU session" (i.e., the procedure in Embodiment 6.5) in the third embodiment, and thus the description thereof will be omitted.

8. Fifth Embodiment

Next, the fifth embodiment will be described. Hereinafter, the fifth embodiment will be referred to as the present embodiment. The present embodiment is different from the first to fourth embodiments in that a certain apparatus includes two independent UEs, and each UE establishes its own PDU session to enable redundant communication.

Besides, the two UEs (UE_10 and UE_12) of the present embodiment may exchange information directly via a bus inside the apparatus, may exchange information via a storage unit in the apparatus, or may exchange information via an antenna included in each of the UEs. That is, the information originally stored in the UE_10 and the information acquired by the UE_10 by performing various procedures may be provided to the UE_12. Similarly, the information originally stored in the UE_12 and the information acquired by the UE_12 by performing various procedures may be provided to the UE_10.

The present embodiment is described in the order of Embodiment 8.1 "Registration Procedure", Embodiment 8.2 "PDU Session Establishment Procedure for Establishing a First PDU Session", Embodiment 8.3 "PDU Session Establishment Procedure for Establishing a Second PDU Session", and Embodiment 8.4 "Cases where a PDU session establishment procedure for establishing a second PDU session is restricted from being performed immediately after a PDU session establishment procedure for establishing a first PDU session is performed".

First, each apparatus transitions to a state in which a UE is registered with the network by performing a registration procedure described in Embodiment 8.1. The procedure is performed by the UE_10 and the UE_12.

Next, each apparatus establishes a first PDU session by performing the PDU session establishment procedure described in Embodiment 8.2, and transitions to a state in which communication using the first PDU session can be performed between the UE_10 and a DN.

Next, each apparatus establishes a second PDU session by performing the PDU session establishment procedure described in Embodiment 8.3, and transitions to a state in which communication using the second PDU session can be performed between the UE_12 and a DN. In this case, since the apparatus can transmit and/or receive user data by using the first PDU session and the second PDU session, it can be said that each apparatus is in a state where redundant communication can be performed.

Finally, cases where each apparatus is restricted from immediately performing the PDU session establishment procedure for establishing the second PDU session after performing the PDU session establishment procedure described in Embodiment 8.2 will be described in Embodiment 8.4.

In addition, in the procedure of the present embodiment, each apparatus may exchange URLLC support information, redundant communication support information, and/or IP address preservation support information between the UE and the network in the registration procedure.

Further, in the PDU session establishment procedure, each apparatus may establish a PDU session supporting URLLC, a PDU session supporting redundant communication, or a PDU session supporting IP address preservation between the UE and the network based on the information exchanged in the registration procedure. In addition, the PDU session supporting URLLC, the PDU session supporting redundant communication, and the PDU session supporting IP address preservation may be PDU sessions that can be established only for a specific DN. Here, the specific DN may be, for example, an LADN.

Further, each apparatus may perform, by using an established PDU session, user data communication supporting URLLC, redundant communication, or user data communication supporting IP address preservation.

Besides, the contents described in the present embodiment can also be applied to a case where the above-mentioned apparatuses are configured as different apparatuses (i.e., different physical hardware, different logical hardware, or different software).

8.1. Registration Procedure

Here, a case where the UE_10 performs a registration procedure first and then the UE_12 executes a registration procedure will be described. Of course, the UE_12 may perform the registration procedure first, and then the UE_10 may perform the registration procedure.

First, a registration procedure initiated by the UE_10 will be described.

The registration procedure initiated by the UE_10 is basically the same as the registration procedure of the first embodiment (i.e., the registration procedure of Embodiment 4.1), but the identification information included in the registration request message and the identification information included in the registration accept message are different from the identification information in Embodiment 4.1. However, since there are many parts in common with the description of Embodiment 4.1, the description of the common parts will be omitted, and the description will focus on the different parts.

First, the UE_10 can transmit a registration request message and/or an RRC message including at least one piece of the 1st and 2nd identification information, and the AMF_210 can receive the registration request message. Here, the contents indicated by the 1st and 2nd identification information may be as described above. Besides, the UE_10 can notify the network of the contents of the identification information by transmitting the identification information. The identification information may be included in the messages to indicate a request of the UE. Besides, two or more pieces of identification information of the identification information may be configured as one or more pieces of identification information.

When the AMF_210 receives the registration request message, AMF_210 can recognize what the UE_10 requests and/or various identification information included in the registration request message.

Besides, the AMF_210 can transmit a registration accept message including at least one piece of the 11th, 12th, 14th, and 15th identification information, and the UE_10 can receive the registration accept message. Further, the AMF_210 can transmit the registration accept message including information that identifies the UE_10, and the UE_10 can receive the registration accept message. Here, the contents indicated by the 11th, 12th, 14th, and 15th identification information may be as described above. The AMF_210 can notify the UE_10 of the contents of the identification information by transmitting at least one piece of the identification information. Besides, the AMF_210 may indicate, by transmitting the identification information, that the network supports each function or that the request of the UE has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

The UE_10 can recognize, by receiving the registration accept message, that the request of the UE_10 based on the registration request message has been accepted and/or the contents of various identification information included in the registration accept message.

The differences between the present procedure and the registration procedure in Embodiment 4.1 are described as above. In addition, the registration procedure in Embodiment 4.1 can be applied to the parts not described in the present embodiment.

When the present procedure is completed, each apparatus (particularly, the UE_10 and the AMF_210) can transition to a registered state (RM-REGISTERED state).

Next, a registration procedure initiated by the UE_12 will be described. The registration procedure is basically the same as the registration procedure performed by the UE_10 in the present embodiment, but the UE_10 needs to be replaced with UE_12, the gNB_110 needs to be replaced with gNB_112, the AMF_210 needs to be replaced with AMF_212, the SMF_220 needs to be replaced with SMF_222, and the UPF_230 needs to be replaced with UPF_232. Besides, the identification information included in the registration request message and the identification information included in the registration accept message are different from the those in the registration procedure performed by the UE_10 in the present embodiment. However, since there are many parts in common with those in the registration procedure performed by the UE_10 in the present embodiment, the description of the common parts will be omitted, and the description will focus on the different parts.

First, the UE_12 can transmit a registration request message and/or an RRC message including at least one piece of the 1st to 3rd identification information, and the AMF_212 can receive the registration request message. Here, the contents indicated by the 1st to 3rd identification information may be as described above, but the group indicated by the 2nd identification information may be a group different from the group to which the UE_10 belongs. In other words, the content indicated by the 2nd identification information is preferably different from the content indicated by the 2nd identification information included in the registration request message of the registration procedure initiated by the UE_10, and preferably different from the content indicated by the 12th identification information included in the registration accept message of the registration procedure initiated by the UE_10. Besides, the information, indicated by the 3rd identification information, for identifying the UE may be information for identifying the UE_10. In other words, the information, indicated by the 3rd identification information, for identifying the UE may be the same as the information, included in the registration accept message of the registration procedure initiated by the UE_10, for identifying the UE_10.

Besides, the UE_12 can notify the network of the contents of the identification information by transmitting the identification information. The identification information may be included in the messages to indicate a request of the UE. Besides, two or more pieces of identification information of the identification information may be configured as one or more pieces of identification information.

When the AMF_212 receives the registration request message, AMF_212 can recognize what the UE_12 requests and/or various identification information included in the registration request message.

Besides, the AMF_212 can transmit a registration accept message including at least one piece of the 11th to 15th identification information, and the UE_12 can receive the registration accept message. Further, the AMF_210 can transmit the registration accept message including information that identifies the UE_12, and the UE_12 can receive the registration accept message. Here, the contents indicated by the 11th to 15th identification information may be as described above, but the content indicated by the 12th identification information may be the same as the content indicated by the 2nd identification information. Besides, the content indicated by the 13th identification information may be the same as the content indicated by the 3rd identification information.

Besides, the group indicated by the 12th identification information may be a group different from the group to which the UE_10 belongs. In other words, the content indicated by the 12th identification information is preferably different from the content indicated by the 2nd identification information included in the registration request message of the registration procedure initiated by the UE_10, and preferably different from the content indicated by the 12th identification information included in the registration accept message of the registration procedure initiated by the UE_10. Besides, the information, indicated by the 13th identification information, for identifying the UE may be information for identifying the UE_10. In other words, the information, indicated by the 13th identification information, for identifying the UE may be the same as the information, included in the registration accept message of the registration procedure initiated by the UE_10, for identifying the UE_10.

Besides, the information identifying the UE_12 may be different from the information identifying the UE_10. In other words, the information identifying the UE_12 may be different from the information indicated by the 3rd identification information of the present procedure or may be different from the information indicated by the 13th identification information of the present procedure.

The AMF_212 can notify the UE_12 of the contents of the identification information by transmitting at least one piece of the identification information. Besides, the AMF_212 may indicate, by transmitting the identification information, that the network supports each function or that the request of the UE_12 has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

The UE_12 can recognize, by receiving the registration accept message, that the request of the UE_12 based on the registration request message has been accepted and/or the contents of various identification information included in the registration accept message.

The difference between the registration procedure performed by the UE_12 and the registration procedure performed by the UE_10 in the present embodiment is as described above. In addition, the registration procedure performed by the UE_10 in the present embodiment can be applied to the parts not described in the present embodiment.

When the present procedure is completed, each apparatus (particularly, the UE_12 and the AMF_212) can transition to a registered state (RM-REGISTERED state).

8.2. PDU Session Establishment Procedure for Establishing a First PDU Session Next, an outline of a PDU session establishment procedure performed to establish a PDU session for a certain DN will be described with reference to FIG. 10. Here, the PDU session establishment procedure is also referred to as the present procedure. The present procedure is basically the same as the PDU session establishment procedure of Embodiment 4.2, but the identification information included in the PDU session establishment request message and/or the NAS message and the identification information included in the PDU session establishment accept message are different from the identification information in Embodiment 4.2. However, since there are many parts in common with the description of Embodiment 4.2, the description of the common parts will be omitted, and the description will focus on the different parts. In addition, the UE, gNB_110, AMF_210, SMF_220, and UPF_230 are the same as those in Embodiment 4.2.

First, the UE_10 can transmit a PDU session establishment request message and/or a NAS message including at least one piece of the 21st, 23rd, and 28th identification information. Here, the NAS message may also be an uplink NAS transport (UL NAS TRANSPORT) message. Further, the contents indicated by the 21st, 23rd, and 28th identification information may be as described above, but the SSC mode indicated by the 23rd identification information is preferably the SSC mode 1. In addition, it is not excluded that the SSC mode indicated by the 23rd identification information is the SSC mode 2 or the SSC mode 3. The UE_10 can notify the network of the contents of the identification information by transmitting the identification information. Besides, the identification information may be included in these messages to indicate a request of the UE_10. Besides, two or more pieces of identification information of the identification information may be configured as one or more pieces of identification information.

When the SMF_220 receives the PDU session establishment request message, SMF_220 can recognize what the UE requests and/or various identification information included in the PDU session establishment request message.

Besides, the SMF_220 and/or the AMF_210 may transmit the PDU session establishment accept message including at least one piece of the 31st, 33rd, and 38th identification information. Here, the contents indicated by the 31st, 33rd, and 38th identification information may be as described above, but the SSC mode indicated by the 33rd identification information is preferably the SSC mode 1. Besides, the PDU session ID indicated by the 38th identification information may be the same as or different from the PDU session ID indicated by the 28th identification information included in the PDU session establishment request message of the present embodiment. The SMF_220 and/or the AMF_210 can notify the UE_10 of the contents of the identification information by transmitting at least one piece of the identification information. In addition, the SMF_220 and/or the AMF_210 may indicate, by transmitting the identification information, that the network supports each function or that the request of the UE_10 has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

The UE_10 can recognize, by receiving a PDU session establishment accept message, that the request of the UE_10 based on the PDU session establishment request has been accepted and/or the contents of various identification information included in the PDU session establishment accept message.

The differences between the present procedure and the procedure in Embodiment 4.2 are described as above. In addition, the description in Embodiment 4.2 can be applied to the parts not described in the present embodiment.

When the present procedure is completed, each apparatus is in a state where the first PDU session for the DN is established.

8.3. PDU Session Establishment Procedure for Establishing a Second PDU Session

Next, each apparatus performs a PDU session establishment procedure in order to establish a second PDU session for the same DN for which the first PDU session is established. Here, the PDU session establishment procedure is also referred to as the present procedure. The present procedure is basically the same as the PDU session establishment procedure of Embodiment 8.2, but the UE_10 needs to be replaced with UE_12, the gNB_110 needs to be replaced with gNB_112, the AMF_210 needs to be replaced with AMF_212, the SMF_220 needs to be replaced with SMF_222, and the UPF_230 needs to be replaced with UPF_232. Further, the identification information included in the PDU session establishment request message and/or the NAS message and the identification information included in the PDU session establishment accept message are different from the identification information in Embodiment 8.2. However, since there are many parts in common with the description of Embodiment 8.2, the description of the common parts will be omitted, and the description will focus on the different parts. In addition, the DN_300 is the same as that in Embodiment 8.2.

First, the UE_12 can transmit a PDU session establishment request message and/or a NAS message including at least one piece of the 21st, 23rd, and 28th identification information. Here, the NAS message may also be an uplink NAS transport (UL NAS TRANSPORT) message. Further, the contents indicated by the 21st, 23rd, and 28th identification information may be as described above, but the SSC mode indicated by the 23rd identification information is preferably the SSC mode 1.

Besides, the PDU session ID indicated by the 28th identification information is preferably different from the PDU session ID indicated by the 28th identification information included in the PDU session establishment request message of Embodiment 8.2, and preferably different from the PDU session ID indicated by the 38th identification information included in the PDU session establishment accept message of Embodiment 8.2.

The UE_12 can notify the network of the contents of the identification information by transmitting the identification information. Besides, the identification information may be included in these messages to indicate a request of the UE_12. Besides, two or more pieces of identification information of the identification information may be configured as one or more pieces of identification information.

When the SMF_222 receives the PDU session establishment request message, SMF_222 can recognize what the UE_12 requests and/or various identification information included in the PDU session establishment request message.

Besides, the SMF_222 and/or the AMF_212 may transmit the PDU session establishment accept message including at least one piece of the 31st, 33rd, and 38th identification information. Here, the contents indicated by the 31st, 33rd, and 38th identification information may be as described above, but the SSC mode indicated by the 33rd identification information is preferably the SSC mode 1. Besides, the PDU session ID indicated by the 38th identification information is preferably different from the PDU session ID indicated by the 28th identification information included in the PDU session establishment request message of Embodiment 8.2, preferably different from the PDU session ID indicated by the 38th identification information included in the PDU session establishment accept message of Embodiment 8.2, and preferably the same as but may be different from the PDU session ID indicated by the 28th identification information included in the PDU session establishment request message of the present embodiment. The SMF_222 and/or the AMF_212 can notify the UE_10 of the contents of the identification information by transmitting at least one piece of the identification information. In addition, the SMF_222 and/or the AMF_212 may indicate, by transmitting the identification information, that the network supports each function or that the request of the UE_12 has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

The UE_12 can recognize, by receiving a PDU session establishment accept message, that the request of the UE_12 based on the PDU session establishment request has been accepted and/or the contents of various identification information included in the PDU session establishment accept message.

The differences between the present procedure and the procedure in Embodiment 8.2 are described as above. In addition, the description in Embodiment 8.2 can be applied to the parts not described in the present embodiment.

When the present procedure is completed, each apparatus may be in a state where the second PDU session is established for a DN that is the same as the DN for which the first PDU session has been already established.

The apparatus_20 can perform redundant communication by using the second PDU session established as described above together with the first PDU session.

8.4. Cases where a PDU Session Establishment Procedure for Establishing a Second PDU Session is Restricted from being Performed Immediately after a PDU Session Establishment Procedure for Establishing a First PDU Session is Performed Each apparatus can establish a first PDU session by performing the procedure of Embodiment 8.2 and then immediately establish a second PDU session by performing the procedure of Embodiment 8.3, so as to perform redundant communication. However, depending on some situations, for example, in the case of congestion, each apparatus may not be able to establish the second PDU session immediately after establishing the first PDU session. In the present embodiment, those situations are described in four cases.

8.4.1. Case 1

Case 1 is a case where the establishment of the second PDU session is restricted in the PDU session establishment procedure of Embodiment 8.2 performed to establish the first PDU session.

More specifically, this is a case where when the UE_10 transmits a PDU session establishment request message to the SMF_220 in the PDU session establishment procedure of Embodiment 8.2, the UE may receive a PDU session establishment accept message including at least one piece of the 40th to 41st identification information from the SMF_220, thereby restricting the establishment of the second PDU session performed by the UE_12.

Here, the contents indicated by the 40th identification information and the 41st identification information may also be as described above.

In other words, when the UE_10 receives the PDU session establishment accept message including at least one piece of the 40th to 41st identification information in the PDU session establishment procedure of Embodiment 8.2, the UE_12 cannot perform the PDU session establishment procedure of Embodiment 8.3 until a time period indicated by the 41st identification information elapses (for example, a timer expires). Further, the UE_12 can perform the PDU session establishment procedure of Embodiment 8.3 after the time period indicated by the 41st identification information has elapsed (for example, a timer has expired). In other words, the UE_10 that has received a timer value included in the PDU session establishment accept message of Embodiment 8.2 forwards the timer value to the UE_12, and the UE_12 sets a timer with the timer value that restricts the execution of the PDU session establishment procedure of Embodiment 8.3, so that the UE_12 can initiate the procedure (i.e., the PDU session establishment procedure of Embodiment 8.3) for establishing the second PDU session after the set timer expires.

In addition, when the UE_10 receives the timer value included in the PDU session establishment accept message of Embodiment 8.2, the UE_10 may forward the timer value to the storage unit and the control unit of the apparatus, so that the UE_10 and the UE_12 may be managed by the same timer. Further, when UE_10 receives the timer value included in the PDU session establishment accept message of Embodiment 8.2, the UE_10 may set a timer with the timer value that restricts the execution of the PDU session establishment procedure of Embodiment 8.3, so as to restrict the establishment of the second PDU session perform by the UE_12 until the timer expires. Besides, when the UE_10 receives the timer value included in the PDU session establishment accept message of Embodiment 8.2, the UE_10 may forward the timer value to the UE_12, and the UE_12 may set the timer with the timer value that restricts the execution of the PDU session establishment procedure of Embodiment 8.3, so as to restrict the establishment of the second PDU session performed by the UE_12 until the timer expires.

8.4.2. Case 2

Case 2 is the same as Case 1 and is a case where the establishment of the second PDU session is restricted in the PDU session establishment procedure of Embodiment 8.2 performed to establish the first PDU session.

More specifically, this is a case where when the UE_10 transmits a PDU session establishment request message to the SMF_220 in the PDU session establishment procedure of Embodiment 8.2, the UE may receive a PDU session establishment accept message including at least one piece of the 40th to 41st identification information from the SMF_220, thereby restricting the establishment of the second PDU session performed by the UE_12.

Here, the contents indicated by the 40th identification information and the 41st identification information may also be as described above.

In other words, when the UE_10 receives the PDU session establishment accept message including at least one piece of the 40th to 41st identification information in the PDU session establishment procedure of Embodiment 8.2, the UE_12 cannot perform the PDU session establishment procedure of Embodiment 8.3 until a time period indicated by the 41st identification information elapses (for example, a timer expires). Up to this point, it is the same as Case 1.

However, the UE_12 may be configured to perform the PDU session establishment procedure of Embodiment 8.3 before the time period indicated by the 41st identification information elapses (for example, the timer expires) by a PDU session modification command message transmitted from the core network side after the PDU session establishment procedure of Embodiment 8.2 is completed but before the time period indicated by the 41st identification information elapses (for example, the timer expires), or the time period indicated by the 41st identification information (i.e., the time period in which the PDU session establishment procedure of Embodiment 8.3 cannot be performed) may be configured to be set to be extended or shortened.

Further, after the PDU session establishment procedure of Embodiment 8.2 is completed, if the UE_12 does not perform the PDU session establishment procedure of Embodiment 8.3 even after the period indicated by the 41st identification information has elapsed (for example, the timer has expired), the time period indicated by the 41st identification information (i.e., the period in which the PDU session establishment procedure of Embodiment 4.3 cannot be performed) can be reset by a PDU session modification command message transmitted from the core network side.

Further, when the UE_10 receives a PDU session establishment accept message including at least the 40th identification information in the PDU session establishment procedure of Embodiment 8.2, the UE_12 may be configured to be able to perform the PDU session establishment procedure of Embodiment 8.3 and to initiate the PDU session establishment procedure of Embodiment 8.3 by a PDU session modification command message transmitting from the core network side. In this case, the PDU session establishment accept message may not include the 41st identification information.

More specifically, after the PDU session establishment procedure of Embodiment 4.2 is completed, the UE_10 can change, by the PDU session modification command message including at least one piece of the 61st to 62nd identification information received from the SMF_220, the timing at which the procedure for establishing the second PDU session is initiated by the UE_12.

Here, the contents indicated by the 61st identification information and the 62nd identification information may also be as described above.

In addition, preferably, the 61st identification information is information indicating a PDU session ID for identifying a PDU session established as the first PDU session, or information indicating a PDU session ID for identifying a PDU session established as the second PDU session, or information indicating empty (null).

Further, when the 61st identification information is information indicating a PDU session ID for identifying a PDU session established as the first PDU session, the 62nd identification information may be information indicating that the establishment of the second PDU session is allowed and/or information indicating that the second PDU session can be established and/or information indicating that communication using the second PDU session is allowed and/or information indicating that communication using the second PDU session can be performed.

Further, when the 61st identification information is information indicating a PDU session ID for identifying a PDU session established as the second PDU session, the 62nd identification information may be information indicating that the establishment of the second PDU session is allowed and/or information indicating that the second PDU session can be established and/or information indicating that communication using the second PDU session is allowed and/or information indicating that communication using the second PDU session can be performed.

Further, when the 61st identification information is information indicating a PDU session ID for identifying a PDU session established as the second PDU session, the 62nd identification information may be information indicating a request for reactivation of the PDU session, more specifically, may be the 39th 5GSM cause value (5GSM cause), or may be information indicating a reactivation request. In addition, when the 61st identification information is information indicating a PDU session ID for identifying the PDU session established as the second PDU session, the PDU session modification command message further includes information that identifies the UE_12.

Further, when the 61st identification information is information indicating empty (null), the 62nd identification information may be information indicating that the establishment of the second PDU session is allowed and/or information indicating that the second PDU session can be established and/or information indicating that communication using the second PDU session is allowed and/or information indicating that communication using the second PDU session can be performed.

Further, when the 61st identification information is information indicating empty (null), the 62nd identification information may be information indicating a request for reactivation of the PDU session, more specifically, may be the 39th 5GSM cause value (5GSM cause), or may be information indicating a reactivation request.

In addition, the PDU session modification command message may indicate empty (null) by excluding the 61st identification information. In other words, when the PDU session modification command message does not include the 61st identification information, the 62nd identification information may be information indicating that the establishment of the second PDU session is allowed and/or information indicating that the second PDU session can be established and/or information indicating that communication using the second PDU session is allowed and/or information indicating that communication using the second PDU session can be performed.

Besides, when the PDU session modification command message does not include the 61st identification information, the 62nd identification information may be information indicating a request for reactivation of the PDU session, more specifically, may be the 39th 5GSM cause value (5GSM cause), or may be information indicating a reactivation request.

Besides, the PDU session modification command message may include the 41st identification information. When the PDU session modification command message includes the 41st identification information, it may include the 62nd identification information but may not include the 62nd identification information. In addition, when the PDU session modification command message includes the 41st identification information and the 62nd identification information, the information indicated by the 62nd identification information may be interpreted preferentially with the information indicated by the 41st identification information ignored, or the information indicated by the 62nd identification information may be ignored with the information indicated by the 41st identification information interpreted preferentially.

Here, the content indicated by the 41st identification information may be as described above, but may indicate, for example, a time period (timer value) during which the second PDU session is not allowed to be established.

For example, when the timer value indicated by the 41st identification information is zero, the UE_12 sets a timer with the timer value that restricts the execution of the PDU session establishment procedure of Embodiment 4.3 and can perform the PDU session establishment procedure of Embodiment 4.3 after the set timer expires.

Besides, when the timer value indicated by the 41st identification information is a non-zero value, the UE_12 sets a timer with the timer value that restricts the execution of the PDU session establishment procedure of Embodiment 4.3 and waits until the set timer expires, and then can perform the PDU session establishment procedure of Embodiment 4.3 after the set timer expires.

In addition, the expression "performing the PDU session establishment procedure of Embodiment 4.3 after the timer expires" may also mean "performing the PDU session establishment procedure of Embodiment 4.3 by the UE immediately after the timer expires," or may mean "performing the PDU session establishment procedure of Embodiment 4.3 by the UE at any time after the timer expires."

8.4.3. Case 3

Next, Case 3 is different from Case 1 and Case 2 and is a case where the establishment of the second PDU session is restricted in the PDU session establishment procedure of Embodiment 8.3 performed by the UE_12 to establish the second PDU session.

More specifically, this is a case where the UE_12 performs the PDU session establishment procedure of Embodiment 8.3 after the PDU session establishment procedure of Embodiment 8.2 is completed, but the establishment of the second PDU session is restricted in the PDU session establishment procedure of Embodiment 8.3. More specifically, this is a case where when the UE_12 transmits a PDU session establishment request message to the SMF_222 in the PDU session establishment procedure of Embodiment 8.3, the UE_12 may receive a PDU session establishment reject message including at least one piece of the 51st to 52nd identification information from the SMF_222, thereby restricting the establishment of the second PDU session.

Here, the contents indicated by the 51st identification information and the 52nd identification information may also be as described above.

In other words, when the UE_12 receives the PDU session establishment reject message including at least one piece of the 51st to 52nd identification information at any time in the PDU session establishment procedure of Embodiment 8.3 performed by the UE_12 after the PDU session establishment procedure of Embodiment 8.2 is completed and the first PDU session is established, the UE_12 cannot perform the PDU session establishment procedure of Embodiment 8.3 again until a time period indicated by the 52nd identification information elapses (for example, a timer expires).

Further, the UE_12 can perform the PDU session establishment procedure of Embodiment 8.3 again after the time period indicated by the 52nd identification information has elapsed (for example, a timer has expired). In other words, the UE_12 that has received a timer value included in the PDU session establishment reject message of Embodiment 8.3 from the SMF_222 sets a timer again with the timer value that restricts the execution of the PDU session establishment procedure of Embodiment 8.3, and the UE_12 can initiate the procedure (i.e., the PDU session establishment procedure of Embodiment 8.3) for establishing the second PDU session after the set timer expires. In other words, the UE_12 can transmit the PDU session establishment request message to the SMF_222 again after the timer expires.

8.4.4. Case 4

Case 4 is the same as Case 3 and is a case where the establishment of the second PDU session is restricted in the PDU session establishment procedure of Embodiment 8.3 performed by the UE_12 to establish the second PDU session.

However, the difference between Case 4 and Case 3 is that the establishment of the second PDU session is restricted by the PDU session establishment grant message in Case 4 while the establishment of the second PDU session is restricted by the PDU session establishment reject message in Case 3.

More specifically, this is a case where the UE_12 performs the PDU session establishment procedure of Embodiment 8.3 after the PDU session establishment procedure of Embodiment 8.2 is completed, but the establishment of the second PDU session is restricted in the PDU session establishment procedure of Embodiment 8.3. More specifically, this is a case where when the UE_12 transmits a PDU session establishment request message to the SMF_222 in the PDU session establishment procedure of Embodiment 8.3, the UE_12 may receive a PDU session establishment grant message including at least one piece of the 40th to 41st identification information from the SMF_222, thereby restricting the establishment of the second PDU session.

Here, the contents indicated by the 40th identification information and the 41st identification information may also be as described above.

In addition, since the UE_12 receives the PDU session establishment grant message in the PDU session establishment procedure of Embodiment 4.3 performed for establishing the second PDU session, the procedure itself may be successful (normally completed), but the UE may be in a state where the second PDU session cannot be established. Here, the expression that "the second PDU session cannot be established" may mean that "the second PDU session is established but cannot be used". Further, the expression that "the second PDU session cannot be established" may mean that "the PDU session cannot be established by the UE_12" or may mean that "the PDU session cannot be used by the UE_12".

In other words, when the UE_12 receives the PDU session establishment accept message including at least one piece of the 40th to 41st identification information at any time in the PDU session establishment procedure of Embodiment 8.3 performed by the UE_12 after the PDU session establishment procedure of Embodiment 8.2 is completed and the first PDU session is established, the UE_12 cannot establish the second PDU session until a time period indicated by the 41st identification information elapses (for example, a timer expires). Further, the UE_12 can establish the second PDU session after the time period indicated by the 41st identification information has elapsed (for example, a timer has expired). Here, the expression that "the second PDU session can be established" may mean that "the second PDU session is established and can be used". Further, the expression that "the second PDU session can be established" may mean that "the PDU session can be established by the UE_12" or may mean that "the established PDU session can be used by the UE_12".

In other words, the UE_12 that has received a timer value included in the PDU session establishment accept message of Embodiment 8.3 sets a timer with the timer value that restricts the establishment of the second PDU session, and the UE_12 can establish the second PDU session after the set timer expires.

However, the UE_12 may be configured to establish the second PDU session before the time period indicated by the 41st identification information elapses (for example, the timer expires) by a PDU session modification command message transmitted from the core network side after the PDU session establishment accept message is received but before the time period indicated by the 41st identification information elapses (for example, the timer expires), or the time period indicated by the 41st identification information (i.e., the time period in which the second PDU session cannot be established) may be configured to be set to be extended or shortened.

Further, after the PDU session establishment accept message is received, if the second PDU session is not established even after the period indicated by the 41st identification information has elapsed (for example, the timer has expired), the UE_12 can reset the time period indicated by the 41st identification information (i.e., the period in which the second PDU session cannot be established) by a PDU session modification command message transmitted from the core network side.

In addition, when the UE_12 receives a PDU session establishment accept message including at least the 40th identification information in the PDU session establishment procedure of Embodiment 8.3, the UE_12 may be configured to be able to establish the second PDU session and to perform communication using the second PDU session by a PDU session modification command message transmitting from the core network side. In this case, the PDU session establishment accept message may not include the 41st identification information.

More specifically, after the PDU session establishment procedure of Embodiment 8.3 is completed, the UE_12 can change, by the PDU session modification command message including at least one piece of the 61st to 62nd identification information received from the SMF_222, the timing at which the second PDU session is established.

Here, the contents indicated by the 61st identification information and the 62nd identification information may also be as described above.

In addition, the 61st identification information is preferably information indicating a PDU session ID for identifying the PDU session established as the second PDU session. Further, when the 61st identification information is information indicating a PDU session ID for identifying the PDU session established as the second PDU session, the PDU session modification command message further includes information that identifies the UE_12.

Besides, the 62nd identification information may be information indicating that the establishment of the second PDU session is allowed and/or information indicating that the second PDU session can be established and/or information indicating that communication using the second PDU session is allowed and/or information indicating that communication using the second PDU session can be performed, information indicating a request for reactivation of the PDU session, more specifically, the 39th 5GSM cause value (5GSM cause), or information indicating a reactivation request.

Further, the 62nd identification information may be information indicating a request for reactivation of the PDU session, more specifically, may be the 39th 5GSM cause value (5GSM cause), or may be information indicating a reactivation request.

Further, the PDU session modification command message may include the 41st identification information. When the PDU session modification command message includes the 41st identification information, it may include the 62nd identification information but may not include the 62nd identification information. In addition, when the PDU session modification command message includes the 41st identification information and the 62nd identification information, the information indicated by the 62nd identification information may be interpreted preferentially with the information indicated by the 41st identification information ignored, or the information indicated by the 62nd identification information may be ignored with the information indicated by the 41st identification information interpreted preferentially.

Here, the content indicated by the 41st identification information may be as described above, but may indicate, for example, a time period (timer value) during which the second PDU session is not allowed to be established.

For example, when the timer value indicated by the 41st identification information is zero, the UE_12 sets a timer with the timer value that restricts the establishment of the second PDU session and can establish the second PDU session after the set timer expires.

Besides, when the timer value indicated by the 41st identification information is a non-zero value, the UE_12 sets a timer with the timer value that restricts the establishment of the second PDU session and waits until the set timer expires, and then can establish the second PDU session after the set timer expires.

In addition, the expression "establishing the second PDU session after the timer expires" may also mean "establishing the second PDU session by the UE immediately after the timer expires," or may mean "establishing the second PDU session by the UE at any time after the timer expires".

9. Sixth Embodiment

Next, the sixth embodiment will be described. Hereinafter, the sixth embodiment will be referred to as the present embodiment. The present embodiment is the same as the fifth embodiment but different from the first to fourth embodiments in that a certain apparatus includes two independent UEs, and each UE establishes its own PDU session to enable redundant communication.

Besides, the two UEs (UE_10 and UE_12) of the present embodiment may exchange information directly via a bus inside the apparatus, may exchange information via a storage unit in the apparatus, or may exchange information via an antenna included in each of the UEs. That is, the information originally stored in the UE_10 and the information acquired by the UE_10 by performing various procedures may be provided to the UE_12. Similarly, the information originally stored in the UE_12 and the information acquired by the UE_12 by performing various procedures may be provided to the UE_10.

The present embodiment is described in the order of Embodiment 9.1 "Registration Procedure", Embodiment 9.2 "PDU Session Establishment Procedure for Establishing a First PDU Session", Embodiment 9.3 "PDU Session Establishment Procedure for Establishing a Second PDU Session", Embodiment 9.4 "Cases where a PDU session establishment procedure for establishing a second PDU session is restricted from being performed immediately after a PDU session establishment procedure for establishing a first PDU session is performed", and Embodiment 9.5 "Procedure for Changing a PDU Session Anchor that provides SSC Mode 3 Second PDU Session".

First, each apparatus transitions to a state in which a UE is registered with the network by performing a registration procedure described in Embodiment 9.1. The procedure is performed by the UE_10 and the UE_12.

Next, each apparatus establishes a first PDU session by performing the PDU session establishment procedure described in Embodiment 9.2, and transitions to a state in which communication using the first PDU session can be performed between the UE_10 and a DN.

Next, each apparatus establishes a second PDU session by performing the PDU session establishment procedure described in Embodiment 9.3, and transitions to a state in which communication using the second PDU session can be performed between the UE_12 and a DN. In this case, since the apparatus can transmit and/or receive user data by using the first PDU session and the second PDU session, it can be said that each apparatus is in a state where redundant communication can be performed.

Next, cases where each apparatus is restricted from immediately performing the PDU session establishment procedure for establishing the second PDU session after performing the PDU session establishment procedure described in Embodiment 9.2 will be described in Embodiment 9.4.

Finally, the procedure for changing the PDU session anchor (i.e., UPF) while continuing the session, by releasing the second (existing) PDU session after establishing a third (new) PDU session by performing a procedure for changing the PDU session anchor that provides the SSC mode 3 PDU session in a case that each apparatus performs the procedure described in Embodiment 9.5 so that the SSC mode of the second PDU session is SSC mode 3, will be described.

In addition, in the procedure of the present embodiment, each apparatus may exchange URLLC support information, redundant communication support information, and/or IP address preservation support information between the UE and the network in the registration procedure.

Further, in the PDU session establishment procedure, each apparatus may establish a PDU session supporting URLLC, a PDU session supporting redundant communication, or a PDU session supporting IP address preservation between the UE and the network based on the information exchanged in the registration procedure. In addition, the PDU session supporting URLLC, the PDU session supporting redundant communication, and the PDU session supporting IP address preservation may be PDU sessions that can be established only for a specific DN. Here, the specific DN may be, for example, an LADN.

Further, each apparatus may perform, by using an established PDU session, user data communication supporting URLLC, redundant communication, or user data communication supporting IP address preservation.

Besides, the contents described in the present embodiment can also be applied to a case where the above-mentioned apparatuses are configured as different apparatuses (i.e., different physical hardware, different logical hardware, or different software).

9.1. Registration Procedure

The registration procedure of the present embodiment may be the same as the registration procedure of the fifth embodiment (i.e., the registration procedure of Embodiment 8.1), and thus the description thereof will be omitted. Each apparatus (particularly, the UE_10 and the AMF_210) can transition to a registered state (RM-REGISTERED state) based on completion of the registration procedure. Besides, each apparatus (particularly, the UE_12 and the AMF_212) can transition to a registered state (RM-REGISTERED state) based on completion of the registration procedure.

9.2. PDU Session Establishment Procedure for Establishing a First PDU Session Next, an outline of a PDU session establishment procedure performed to establish a PDU session for a certain DN will be described with reference to FIG. 10. Here, the PDU session establishment procedure is also referred to as the present procedure. The present procedure is basically the same as the PDU session establishment procedure of Embodiment 8.2, but the identification information included in the PDU session establishment request message and/or the NAS message and the identification information included in the PDU session establishment accept message are different from the identification information in Embodiment 8.2. However, since there are many parts in common with the description of Embodiment 8.2, the description of the common parts will be omitted, and the description will focus on the different parts. In addition, the UE, gNB_110, AMF_210, SMF_220, and UPF_230 are the same as those in Embodiment 8.2.

First, the UE_10 can transmit a PDU session establishment request message and/or a NAS message including at least one piece of the 21st, 23rd to 26th, and 28th identification information. Here, the NAS message may also be an uplink NAS transport (UL NAS TRANSPORT) message. Further, the contents indicated by the 21st, 23rd to 26th, and 28th identification information may be as described above, but the SSC mode indicated by the 23rd identification information may be the SSC mode 1, may be the SSC mode 2, or may be the SSC mode 3. Further, a DNN indicated by the 25th identification information is preferably the DNN indicated by the 14th identification information included in the registration accept message of Embodiment 9.1. Further, S-NSSAI indicated by the 26th identification information is preferably the S-NSSAI indicated by the 15th identification information included in the registration accept message of Embodiment 9.1.

The UE_10 can notify the network of the contents of the identification information by transmitting the identification information. Besides, the identification information may be included in these messages to indicate a request of the UE_10. Besides, two or more pieces of identification information of the identification information may be configured as one or more pieces of identification information.

When the SMF_220 receives the PDU session establishment request message, SMF_220 can recognize what the UE_10 requests and/or various identification information included in the PDU session establishment request message.

Besides, the SMF_222 and/or the AMF_210 may transmit the PDU session establishment accept message including at least one piece of the 31st, 33rd to 36th, and 38th identification information. Here, the contents indicated by the 31st, 33rd to 36th, and 38th identification information may be as described above, but the SSC mode indicated by the 33rd identification information may be the SSC mode 1, may be the SSC mode 2, or may be the SSC mode 3.

Further, the content indicated by the 35th identification information may be the same as or different from the content indicated by the 25th identification information included in the PDU session establishment request message of the present embodiment. Further, a DNN indicated by the 35th identification information is preferably the DNN indicated by the 14th identification information included in the registration accept message of Embodiment 9.1. Further, the content indicated by the 36th identification information may be the same as or different from the content indicated by the 26th identification information included in the PDU session establishment request message of the present embodiment. Further, S-NSSAI indicated by the 36th identification information is preferably the S-NSSAI indicated by the 15th identification information included in the registration accept message of Embodiment 9.1.

Besides, the PDU session ID indicated by the 38th identification information may be the same as or different from the PDU session ID indicated by the 28th identification information included in the PDU session establishment request message of the present embodiment. The SMF_220 and/or the AMF_210 can notify the UE_10 of the contents of the identification information by transmitting at least one piece of the identification information. In addition, the SMF_220 and/or the AMF_210 may indicate, by transmitting the identification information, that the network supports each function or that the request of the UE_10 has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

The UE_10 can recognize, by receiving a PDU session establishment accept message, that the request of the UE_10 based on the PDU session establishment request has been accepted and/or the contents of various identification information included in the PDU session establishment accept message.

The differences between the present procedure and the procedure in Embodiment 8.2 are described as above. In addition, the description in Embodiment 8.2 can be applied to the parts not described in the present embodiment.

When the present procedure is completed, each apparatus is in a state where the first PDU session for the DN is established.

9.3. PDU Session Establishment Procedure for Establishing a Second PDU Session Next, each apparatus performs a PDU session establishment procedure in order to establish a second PDU session for the same DN for which the first PDU session is established. Here, the PDU session establishment procedure is also referred to as the present procedure. The present procedure is basically the same as the PDU session establishment procedure of Embodiment 8.3, but the identification information included in the PDU session establishment request message and/or the NAS message and the identification information included in the PDU session establishment accept message are different from the identification information in Embodiment 8.3. However, since there are many parts in common with the description of Embodiment 8.3, the description of the common parts will be omitted, and the description will focus on the different parts. In addition, the apparatuses related to the present procedure are UE_12, gNB_112, AMF_212, SMF_222, UPF_232, and DN_300, which are the same as those in Embodiment 8.3.

First, the UE_12 can transmit a PDU session establishment request message and/or a NAS message including at least one piece of the 3rd, 13rd, 21st, and 23rd to 28th identification information. Here, the NAS message may also be an uplink NAS transport (UL NAS TRANSPORT) message. Further, the contents indicated by the 3rd, 13rd, 21st, and 23rd to 28th identification information may be as described above, but the content indicated by the 23rd identification information is preferably the same as the content indicated by the 33rd identification information included in the PDU session establishment accept message of Embodiment 9.2. Besides, the content indicated by the 24th identification information is preferably the same as the content indicated by the 34th identification information included in the PDU session establishment accept message of Embodiment 9.2.

Besides, the content indicated by the 25th identification information is preferably the same as the content indicated by the 35th identification information included in the PDU session establishment accept message of Embodiment 9.2. Further, a DNN indicated by the 25th identification information is preferably the DNN indicated by the 14th identification information included in the registration accept message of Embodiment 9.1. Besides, the content indicated by the 26th identification information is preferably the same as the content indicated by the 36th identification information included in the PDU session establishment accept message of Embodiment 9.2. Further, S-NSSAI indicated by the 26th identification information is preferably the S-NSSAI indicated by the 15th identification information included in the registration accept message of Embodiment 9.1.

Besides, the content indicated by the 27th identification information is preferably the same as the content indicated by the 28th identification information included in the PDU session establishment request message of Embodiment 9.2, and preferably the same as the content indicated by the 38th identification information included in the PDU session establishment accept message of Embodiment 9.2. Besides, the content indicated by the 28th identification information is preferably different from the content indicated by the 28th identification information included in the PDU session establishment request message of Embodiment 9.2, and preferably different from the content indicated by the 38th identification information included in the PDU session establishment accept message of Embodiment 9.2. In addition, the 27th identification information may be transmitted in association with the 3rd identification information and/or the 13th identification information. Besides, the 27th identification information may be transmitted in association with the 3rd identification information and/or the 13th identification information to indicate that the UE_10 has established the PDU session ID indicated by the 27th identification information.

The UE_12 can notify the network of the contents of the identification information by transmitting the identification information. Besides, the identification information may be included in these messages to indicate a request of the UE_12. Besides, two or more pieces of identification information of the identification information may be configured as one or more pieces of identification information.

When the SMF_222 receives the PDU session establishment request message, SMF_222 can recognize what the UE_12 requests and/or various identification information included in the PDU session establishment request message.

Besides, the SMF_222 and/or the AMF_212 may transmit the PDU session establishment accept message including at least one piece of the 3rd, 13th, 31st, and 33rd to 38th identification information. Further, the contents indicated by the 3rd, 13th, 31st, and 33rd to 38th identification information may be as described above, but the content indicated by the 33rd identification information may be the same as or different from the content indicated by the 23rd identification information included in the PDU session establishment request message of the present embodiment. Besides, the content indicated by the 34th identification information may be the same as or different from the content indicated by the 24th identification information included in the PDU session establishment request message of the present embodiment.

Besides, the content indicated by the 35th identification information may be the same as or different from the content indicated by the 25th identification information included in the PDU session establishment request message of the present embodiment. Further, a DNN indicated by the 35th identification information is preferably the DNN indicated by the 14th identification information included in the registration accept message of Embodiment 9.1. Besides, the content indicated by the 36th identification information may be the same as or different from the content indicated by the 26th identification information included in the PDU session establishment request message of the present embodiment. Further, S-NSSAI indicated by the 36th identification information is preferably the S-NSSAI indicated by the 15th identification information included in the registration accept message of Embodiment 9.1.

Besides, the content indicated by the 37th identification information may be the same as or different from the content indicated by the 27th identification information included in the PDU session establishment request message of the present embodiment. Besides, the content indicated by the 38th identification information may be the same as or different from the content indicated by the 28th identification information included in the PDU session establishment request message of the present embodiment. Besides, the PDU session ID indicated by the 38th identification information is preferably different from the PDU session ID indicated by the 28th identification information included in the PDU session establishment request message of Embodiment 9.2, preferably different from the PDU session ID indicated by the 38th identification information included in the PDU session establishment accept message of Embodiment 9.2, and preferably the same as but may be different from the PDU session ID indicated by the 28th identification information included in the PDU session establishment request message of the present embodiment. In addition, the 37th identification information may be transmitted in association with the 3rd identification information and/or the 13th identification information. Besides, the 37th identification information may be transmitted in association with the 3rd identification information and/or the 13th identification information to indicate that the UE_10 has established the PDU session ID indicated by the 37th identification information. The SMF_222 and/or the AMF_212 can notify the UE_12 of the contents of the identification information by transmitting at least one piece of the identification information. In addition, the SMF_222 and/or the AMF_212 may indicate, by transmitting the identification information, that the network supports each function or that the request of the UE_12 has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

The UE_12 can recognize, by receiving a PDU session establishment accept message, that the request of the UE_12 based on the PDU session establishment request has been accepted and/or the contents of various identification information included in the PDU session establishment accept message.

The differences between the present procedure and the procedure in Embodiment 8.3 are described as above. In addition, the description in Embodiment 8.3 can be applied to the parts not described in the present embodiment.

When the present procedure is completed, each apparatus may be in a state where the second PDU session is established for a DN that is the same as the DN for which the first PDU session has been already established.

The apparatus_20 can perform redundant communication by using the second PDU session established as described above together with the first PDU session.

9.4. Cases where a PDU Session Establishment Procedure for Establishing a Second PDU Session is Restricted from being Performed Immediately after a PDU Session Establishment Procedure for Establishing a First PDU Session is Performed The cases of the present embodiment may be the same as the descriptions in Embodiment 8.4 of the fifth embodiment, and thus the descriptions thereof will be omitted.

9.5. Procedure for Changing a PDU Session Anchor that Provides SSC Mode 3 Second PDU Session Next, a procedure for changing the PDU session anchor (PSA) that provides a PDU session, in a case that the second PDU session is established by performing the PDU session establishment procedure in Embodiment 9.3 and that the SSC mode of the PDU session is the SSC mode 3, will be described with reference to FIG. 11. This procedure is a procedure triggered by a network (SMF) and is a procedure for releasing an existing (old) PDU session associated with an old PDU session anchor after a new PDU session for the same DN is established with a new PDU session anchor. In addition, in this procedure, an AMF is not changed, but an SMF may be changed.

The UE_12 transmits and/or receives user data by using the second PDU session. Specifically, the UE_12 transmits and/or receives uplink data and/or downlink data to and/or from the DN_300 via the UPF_232 (S1100).

When the SMF_222 determines that the UPF and/or the SMF need to be changed (S1102), the SMF_222 transmits to the AMF_212 an N1 SM (Session Management) container including a PDU session modification command message including at least one piece of the 61st to 62nd identification information (S1104). In addition, the N1 SM container can also be a NAS message. Further, the NAS message may also be a downlink NAS transport (DL NAS transport) message.

Here, the contents indicated by the 61st to 62nd identification information may be as described above, but the 61st identification information may be information indicating a PDU session ID for identifying a PDU session established as the second PDU session, and the 62nd identification information may be information indicating that a PDU session needs to be re-established for the same DN.

Besides, as a method for transmitting the 61st identification information, the SMF_222 may transmit an N1 SM (Session Management) container including a PDU session modification command message including the 62nd identification information and the 61st identification information, separately. These may also be transmitted as a NAS message.

The AMF_212 forwards the NAS message received from the SMF_222 to the UE_12 (S1106).

In addition, the SMF_222 and/or AMF_210 may indicate, by transmitting the identification information, a request for establishing a new PDU session and releasing the old PDU session. Further, two or more pieces of identification information of the identification information may be configured as one or more pieces of identification information.

When the UE_12 receive the NAS message, it may determine to initiate a PDU session establishment procedure for the same DN (S1108). The UE_12 can, by receiving the PDU session modification command message, request for establishing a new PDU session, release an old PDU session, and/or recognize the content of each piece of identification information included in the PDU session modification command message. The PDU session establishment procedure is basically the same as the PDU session establishment procedure of Embodiment 9.3, but the SMF_222 needs to be replaced with SMF_224, and the UPF_232 needs to be replaced with UPF_234. Further, the identification information included in the PDU session establishment request message and/or the NAS message and the identification information included in the PDU session establishment accept message are different from the identification information in Embodiment 9.3. However, since there are many parts in common with the description of Embodiment 9.3, the description of the common parts will be omitted, and the description will focus on the different parts. In addition, the UE_12, gNB_112, AMF_212, and DN are the same as those in Embodiment 9.3.

First, the UE_12 initiates a PDU session establishment procedure by transmitting a NAS message including a PDU session establishment request message to the SMF_224 via the 5G AN and the AMF_212 (S900) (S902) (S904). More specifically, when the UE_12 transmits the NAS message including the PDU session establishment request message to the gNB_112 (S900), the gNB_112 transmits the NAS message to the AMF_212 via the N2 interface.

Here, the UE_12 can transmit the PDU session establishment request message and/or the NAS message including at least one piece of the 3rd, 13rd, 21st, and 23rd to 29th identification information, but the at least one piece of the 3rd, 13rd, 21st, and 23rd to 29th identification information may also be included in a control message different from the above messages, e.g., a control message of a layer lower than the NAS layer (e.g., an RRC layer, an MAC layer, an RLC layer, and a PDCP layer) to be transmitted. Here, the NAS message may also be an uplink NAS transport (UL NAS TRANSPORT) message. Further, the contents indicated by the 3rd, 13rd, 21st, and 23rd to 29th identification information may be as described above, but the content indicated by the 23rd identification information is preferably the same as the content indicated by the 33rd identification information included in the PDU session establishment accept message of Embodiment 9.3 and/or preferably the same as the content indicated by the 23rd identification information included in the PDU session establishment request message of Embodiment 9.3 Besides, the content indicated by the 24th identification information is preferably the same as the content indicated by the 34th identification information included in the PDU session establishment accept message of Embodiment 9.3, and/or preferably the same as the content indicated by the 24th identification information included in the PDU session establishment request message of Embodiment 9.3. Besides, the content indicated by the 25th identification information is preferably the same as the content indicated by the 35th identification information included in the PDU session establishment accept message of Embodiment 9.3, and/or preferably the same as the content indicated by the 25th identification information included in the PDU session establishment request message of Embodiment 9.3. Besides, the content indicated by the 26th identification information is preferably the same as the content indicated by the 36th identification information included in the PDU session establishment accept message of Embodiment 9.3, and/or preferably the same as the content indicated by the 36th identification information included in the PDU session establishment request message of Embodiment 9.3.

Besides, the PDU session ID indicated by the 27th identification information preferably indicates the PDU session ID established by the PDU session establishment procedure of Embodiment 9.2. Besides, the PDU session ID indicated by the 28th identification information is preferably different from the PDU session ID indicated by the 27th identification information of the present embodiment, and is also preferably different from the PDU session ID indicated by the 29th identification information of the present embodiment. Besides, the PDU session ID indicated by the 28th identification information may preferably indicate a newly established PDU session ID. Besides, the PDU session ID indicated by the 29th identification information preferably indicates the PDU session ID established by the PDU session establishment procedure of Embodiment 9.3. In addition, the 27th identification information may be transmitted in association with the 3rd identification information and/or the 13th identification information. Besides, the 27th identification information may be transmitted in association with the 3rd identification information and/or the 13th identification information to indicate that the UE_10 has established the PDU session ID indicated by the 27th identification information. The UE_12 can notify the network of the contents of the identification information by transmitting the identification information. The identification information may be included in these messages to indicate a request of the UE_12. Besides, two or more pieces of identification information of the identification information may be configured as one or more pieces of identification information.

Besides, when the AMF_212 receives the PDU session establishment request message, it selects the SMF_224 as its forwarding destination (S902) and forwards the PDU session establishment request message to the SMF_224 via the N11 interface (S904).

Besides, when the SMF_224 receives the PDU session establishment request message from the AMF_212 (S904), SMF_224 can recognize what the UE_12 requests and recognize various identification information included in the PDU session establishment request message.

Further, the SMF_224 selects the UPF_234 as the UPF to which the PDU session is to be established and transmits the session establishment request message to the UPF_234 via the N4 interface (S906).

When the UPF_234 receives the session establishment request message from the SMF_224, the UPF_234 creates a context for the PDU session and transmits a session establishment response message to the SMF_224 via the N4 interface (S908).

When the SMF_224 receives the session establishment response message from UPF_234, it may perform address assignment to assign an address to the UE_12. The SMF_224 transmits a PDU session establishment accept message to the UE_12 via the AMF_212 (S910) (S912). More specifically, the SMF_224 transmits the PDU session establishment accept message to the AMF_212 via the N11 interface (S910), and then the AMF_212 that receives the PDU session establishment accept message transmits a NAS message including the PDU session establishment accept message to the UE_12 via the N1 interface (S912). More specifically, the AMF_212 transmits the PDU session establishment accept message to the gNB_112 via the N2 interface, and then the gNB_112 transmits the NAS message including the PDU session establishment accept message to the UE_12.

Here, the SMF_224 and/or the AMF_212 can transmit the PDU session establishment accept message including at least one piece of the 3rd, 13rd, 31st, and 33rd to 39th identification information. Further, the contents indicated by the 3rd, 13rd, 31st, and 33rd to 39th identification information may be as described above, but the content indicated by the 33rd identification information may be the same as the content indicated by the 23rd identification information included in the PDU session establishment request message of the present embodiment. Besides, the content indicated by the 34th identification information may be the same as the content indicated by the 24th identification information included in the PDU session establishment request message of the present embodiment. Besides, the content indicated by the 35th identification information may be the same as the content indicated by the 25th identification information included in the PDU session establishment request message of the present embodiment. Besides, the content indicated by the 36th identification information may be the same as the content indicated by the 26th identification information included in the PDU session establishment request message of the present embodiment. Besides, the content indicated by the 37th identification information may be the same as the content indicated by the 27th identification information included in the PDU session establishment request message of the present embodiment. Besides, the content indicated by the 38th identification information may be the same as the content indicated by the 28th identification information included in the PDU session establishment request message of the present embodiment. Besides, the content indicated by the 39th identification information may be the same as the content indicated by the 29th identification information included in the PDU session establishment request message of the present embodiment. In addition, the 37th identification information may be transmitted in association with the 3rd identification information and/or the 13th identification information. Besides, the 37th identification information may be transmitted in association with the 3rd identification information and/or the 13th identification information to indicate that the UE_10 has established the PDU session ID indicated by the 37th identification information. The SMF_224 and/or the AMF_212 can notify the UE_12 of the contents of the identification information by transmitting the identification information. In addition, the SMF_224 and/or the AMF_212 may indicate, by transmitting the identification information, that the network supports each function or that the request of the UE_12 has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

The UE_12 can recognize, by receiving a PDU session establishment accept message, that the request of the UE_12 based on the PDU session establishment request has been accepted and/or the contents of various identification information included in the PDU session establishment accept message.

The differences between the present procedure and the procedure in Embodiment 9.3 are described as above. In addition, the description in Embodiment 9.3 can be applied to the parts not described in the present embodiment.

As described above, a new PDU session for redundant communication can be established. In other words, when the present procedure is completed, the UE_12 can transmit and/or receive uplink data and/or downlink data via the UPF_234 as a new UPF (S1110). In other words, the apparatus can perform redundant communication by using the PDU session established by the PDU session establishment procedure in Embodiment 9.2, the PDU session established by the PDU session establishment procedure in Embodiment 9.3, and the PDU session established by the procedure in the present embodiment.

Then, after the new PDU session is established, each apparatus performs a PDU session release procedure (S1112) so as to release the old PDU session (i.e., the PDU session established by the PDU session establishment procedure in Embodiment 9.3). In addition, the PDU session release procedure may also be initiated by expiration of a timer of the UE_12 or expiration of a timer of the SMF_222.

According to the above, the PDU session anchor for the redundant communication can be changed from the UPF_232 to the UPF_234. That is, the apparatus_20 can perform the redundant communication by using the PDU session established by the PDU session establishment procedure in Embodiment 9.2 and the PDU session established by the procedure in the present embodiment.

10. Seventh Embodiment

Next, the seventh embodiment will be described. Hereinafter, the seventh embodiment will be referred to as the present embodiment. The present embodiment is the same as the fifth to sixth embodiments but different from the first to fourth embodiments in that a certain apparatus includes two independent UEs, and each UE establishes its own PDU session to enable redundant communication.

Besides, the two UEs (UE_10 and UE_12) of the present embodiment may exchange information directly via a bus inside the apparatus, may exchange information via a storage unit in the apparatus, or may exchange information via an antenna included in each of the UEs. That is, the information originally stored in the UE_10 and the information acquired by the UE_10 by performing various procedures may be provided to the UE_12. Similarly, the information originally stored in the UE_12 and the information acquired by the UE_12 by performing various procedures may be provided to the UE_10.

The present embodiment is described in the order of Embodiment 10.1 "Registration Procedure", Embodiment 10.2 "PDU Session Establishment Procedure for Establishing a First PDU Session", Embodiment 10.3 "PDU Session Establishment Procedure for Establishing a Second PDU Session", Embodiment 10.4 "Cases where a PDU session establishment procedure for establishing a second PDU session is restricted from being performed immediately after a PDU session establishment procedure for establishing a first PDU session is performed", and Embodiment 10.5 "Procedure for Changing a PDU Session Anchor that provides SSC Mode 3 Second PDU Session".

First, each apparatus transitions to a state in which a UE is registered with the network by performing a registration procedure described in Embodiment 10.1. The procedure is performed by the UE_10 and the UE_12.

Next, each apparatus establishes a first PDU session by performing the PDU session establishment procedure described in Embodiment 10.2, and transitions to a state in which communication using the first PDU session can be performed between the UE_10 and a DN.

Next, each apparatus establishes a second PDU session by performing the PDU session establishment procedure described in Embodiment 10.3, and transitions to a state in which communication using the second PDU session can be performed between the UE_12 and a DN. In this case, since the apparatus can transmit and/or receive user data by using the first PDU session and the second PDU session, it can be said that each apparatus is in a state where redundant communication can be performed.

Next, cases where each apparatus is restricted from immediately performing the PDU session establishment procedure for establishing the second PDU session after performing the PDU session establishment procedure described in Embodiment 10.2 will be described in Embodiment 10.4.

Finally, the procedure for changing the PDU session anchor (i.e., UPF) while continuing the session, by releasing the second (existing) PDU session after establishing a third (new) PDU session by performing a procedure for changing the PDU session anchor that provides the SSC mode 3 PDU session in a case that each apparatus performs the procedure described in Embodiment 10.5 so that the SSC mode of the second PDU session is SSC mode 3, will be described.

In addition, in the procedure of the present embodiment, each apparatus may exchange URLLC support information, redundant communication support information, and/or IP address preservation support information between the UE and the network in the registration procedure.

Further, in the PDU session establishment procedure, each apparatus may establish a PDU session supporting URLLC, a PDU session supporting redundant communication, or a PDU session supporting IP address preservation between the UE and the network based on the information exchanged in the registration procedure. In addition, the PDU session supporting URLLC, the PDU session supporting redundant communication, and the PDU session supporting IP address preservation may be PDU sessions that can be established only for a specific DN. Here, the specific DN may be, for example, an LADN.

Further, each apparatus may perform, by using an established PDU session, user data communication supporting URLLC, redundant communication, or user data communication supporting IP address preservation.

Besides, the contents described in the present embodiment can also be applied to a case where the above-mentioned apparatuses are configured as different apparatuses (i.e., different physical hardware, different logical hardware, or different software).

10.1. Registration Procedure

The registration procedure of the present embodiment may be the same as the registration procedure of the sixth embodiment (i.e., the registration procedure of Embodiment 9.1), and thus the description thereof will be omitted. Each apparatus (particularly, the UE_10 and the AMF_210) can transition to a registered state (RM-REGISTERED state) based on completion of the registration procedure. Besides, each apparatus (particularly, the UE_12 and the AMF_212) can transition to a registered state (RM-REGISTERED state) based on completion of the registration procedure.

10.2. PDU Session Establishment Procedure for Establishing a First PDU Session The PDU session establishment procedure for establishing the first PDU session according to the present embodiment may be the same as the PDU session establishment procedure for establishing the first PDU session according to the sixth embodiment (i.e., the PDU session establishment procedure in Embodiment 9.2), and thus the description thereof will be omitted. When the present procedure is completed, each apparatus is in a state where the first PDU session for the DN is established.

10.3. PDU Session Establishment Procedure for Establishing a Second PDU Session Next, each apparatus performs a PDU session establishment procedure in order to establish a second PDU session for the same DN for which the first PDU session is established. Here, the PDU session establishment procedure is also referred to as the present procedure. The present procedure is basically the same as the PDU session establishment procedure of Embodiment 9.3, but the identification information included in the PDU session establishment request message and/or the NAS message and the identification information included in the PDU session establishment accept message are different from the identification information in Embodiment 9.3. However, since there are many parts in common with the description of Embodiment 9.3, the description of the common parts will be omitted, and the description will focus on the different parts. In addition, the apparatuses related to the present procedure are UE_12, gNB_112, AMF_212, SMF_222, UPF_232, and DN_300, which are the same as those in Embodiment 9.3.

First, the UE_12 can transmit a PDU session establishment request message and/or a NAS message including at least one piece of the 21st, 23rd to 26th, and 28th identification information. Here, the NAS message may also be an uplink NAS transport (UL NAS TRANSPORT) message. Further, the contents indicated by the 21st, 23rd to 26th, and 28th identification information may be as described above, but the content indicated by the 23rd identification information is preferably different from the content indicated by the 33rd identification information included in the PDU session establishment accept message of Embodiment 10.2. Besides, the content indicated by the 24th identification information is preferably different from the content indicated by the 34th identification information included in the PDU session establishment accept message of Embodiment 10.2.

Besides, the content indicated by the 25th identification information is preferably different from the content indicated by the 35th identification information included in the PDU session establishment accept message of Embodiment 10.2. Further, a DNN indicated by the 25th identification information is preferably the DNN indicated by the 14th identification information included in the registration accept message of Embodiment 10.1. Besides, the content indicated by the 26th identification information is preferably different from the content indicated by the 36th identification information included in the PDU session establishment accept message of Embodiment 10.2. Further, S-NSSAI indicated by the 26th identification information is preferably the S-NSSAI indicated by the 15th identification information included in the registration accept message of Embodiment 10.1.

Besides, the content indicated by the 28th identification information is preferably different from the content indicated by the 28th identification information included in the PDU session establishment request message of Embodiment 10.2, and preferably different from the content indicated by the 38th identification information included in the PDU session establishment accept message of Embodiment 10.2.

The UE_12 can notify the network of the contents of the identification information by transmitting the identification information. Besides, the identification information may be included in these messages to indicate a request of the UE_12. Besides, two or more pieces of identification information of the identification information may be configured as one or more pieces of identification information.

When the SMF_222 receives the PDU session establishment request message, SMF_222 can recognize what the UE_12 requests and/or various identification information included in the PDU session establishment request message.

Besides, the SMF_222 and/or the AMF_212 may transmit the PDU session establishment accept message including at least one piece of the 31st, 33rd to 36th, and 38th identification information. Further, the contents indicated by the 31st, and 33rd to 36th, and 38th identification information may be as described above, but the content indicated by the 33rd identification information may be the same as or different from the content indicated by the 23rd identification information included in the PDU session establishment request message of the present embodiment. Besides, the content indicated by the 34th identification information may be the same as or different from the content indicated by the 24th identification information included in the PDU session establishment request message of the present embodiment.

Besides, the content indicated by the 35th identification information may be the same as or different from the content indicated by the 25th identification information included in the PDU session establishment request message of the present embodiment. Further, a DNN indicated by the 35th identification information is preferably the DNN indicated by the 14th identification information included in the registration accept message of Embodiment 10.1. Besides, the content indicated by the 36th identification information may be the same as or different from the content indicated by the 26th identification information included in the PDU session establishment request message of the present embodiment. Further, S-NSSAI indicated by the 36th identification information is preferably the S-NSSAI indicated by the 15th identification information included in the registration accept message of Embodiment 10.1.

Besides, the content indicated by the 38th identification information may be the same as or different from the content indicated by the 28th identification information included in the PDU session establishment request message of the present embodiment. Besides, the PDU session ID indicated by the 38th identification information is preferably different from the PDU session ID indicated by the 28th identification information included in the PDU session establishment request message of Embodiment 10.2, preferably different from the PDU session ID indicated by the 38th identification information included in the PDU session establishment accept message of Embodiment 10.2, and preferably the same as but may be different from the PDU session ID indicated by the 28th identification information included in the PDU session establishment request message of the present embodiment. The SMF_222 and/or the AMF_212 can notify the UE_12 of the contents of the identification information by transmitting at least one piece of the identification information. In addition, the SMF_222 and/or the AMF_212 may indicate, by transmitting the identification information, that the network supports each function or that the request of the UE_12 has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

The UE_12 can recognize, by receiving a PDU session establishment accept message, that the request of the UE_12 based on the PDU session establishment request has been accepted and/or the contents of various identification information included in the PDU session establishment accept message.

The differences between the present procedure and the procedure in Embodiment 9.3 are described as above. In addition, the description in Embodiment 9.3 can be applied to the parts not described in the present embodiment.

When the present procedure is completed, each apparatus may be in a state where the second PDU session is established for a DN that is the same as the DN for which the first PDU session has been already established.

The apparatus_20 can perform redundant communication by using the second PDU session established as described above together with the first PDU session.

10.4. Cases where a PDU Session Establishment Procedure for Establishing a Second PDU Session is Restricted from being Performed Immediately after a PDU Session Establishment Procedure for Establishing a First PDU Session is Performed The cases of the present embodiment may be the same as the descriptions in Embodiment 9.4 of the sixth embodiment, and thus the descriptions thereof will be omitted.

10.5. Procedure for Changing a PDU Session Anchor that Provides SSC Mode 3 Second PDU Session The "procedure for changing the PDU session anchor that provides the SSC mode 3 second PDU session" in the present embodiment may be the same as the "procedure for changing the PDU session anchor that provides the SSC mode 3 second PDU session" (i.e., the procedure in Embodiment 9.5) in the sixth embodiment, and thus the description thereof will be omitted.

11. Eighth Embodiment

Next, the eighth embodiment will be described. Hereinafter, the eighth embodiment will be referred to as the present embodiment. The present embodiment is the same as the fifth to seventh embodiments but different from the first to fourth embodiments in that a certain apparatus includes two independent UEs, and each UE establishes its own PDU session to enable redundant communication.

Besides, the two UEs (UE_10 and UE_12) of the present embodiment may exchange information directly via a bus inside the apparatus, may exchange information via a storage unit in the apparatus, or may exchange information via an antenna included in each of the UEs. That is, the information originally stored in the UE_10 and the information acquired by the UE_10 by performing various procedures may be provided to the UE_12. Similarly, the information originally stored in the UE_12 and the information acquired by the UE_12 by performing various procedures may be provided to the UE_10.

The present embodiment is described in the order of Embodiment 11.1 "Registration Procedure", Embodiment 11.2 "PDU Session Establishment Procedure for Establishing a First PDU Session", Embodiment 11.3 "PDU Session Establishment Procedure for Establishing a Second PDU Session", Embodiment 11.4 "Cases where a PDU session establishment procedure for establishing a second PDU session is restricted from being performed immediately after a PDU session establishment procedure for establishing a first PDU session is performed", and Embodiment 11.5 "Procedure for Changing a PDU Session Anchor that provides SSC Mode 3 Second PDU Session".

First, each apparatus transitions to a state in which a UE is registered with the network by performing a registration procedure described in Embodiment 11.1. The procedure is performed by the UE_10 and the UE_12.

Next, each apparatus establishes a first PDU session by performing the PDU session establishment procedure described in Embodiment 11.2, and transitions to a state in which communication using the first PDU session can be performed between the UE_10 and a DN.

Next, each apparatus establishes a second PDU session by performing the PDU session establishment procedure described in Embodiment 11.3, and transitions to a state in which communication using the second PDU session can be performed between the UE_12 and a DN. In this case, since the apparatus can transmit and/or receive user data by using the first PDU session and the second PDU session, it can be said that each apparatus is in a state where redundant communication can be performed.

Next, cases where each apparatus is restricted from immediately performing the PDU session establishment procedure for establishing the second PDU session after performing the PDU session establishment procedure described in Embodiment 11.2 will be described in Embodiment 11.4.

Finally, the procedure for changing the PDU session anchor (i.e., UPF) while continuing the session, by releasing the second (existing) PDU session after establishing a third (new) PDU session by performing a procedure for changing the PDU session anchor that provides the SSC mode 3 PDU session in a case that each apparatus performs the procedure described in Embodiment 11.5 so that the SSC mode of the second PDU session is SSC mode 3, will be described.

In addition, in the procedure of the present embodiment, each apparatus may exchange URLLC support information, redundant communication support information, and/or IP address preservation support information between the UE and the network in the registration procedure.

Further, in the PDU session establishment procedure, each apparatus may establish a PDU session supporting URLLC, a PDU session supporting redundant communication, or a PDU session supporting IP address preservation between the UE and the network based on the information exchanged in the registration procedure. In addition, the PDU session supporting URLLC, the PDU session supporting redundant communication, and the PDU session supporting IP address preservation may be PDU sessions that can be established only for a specific DN. Here, the specific DN may be, for example, an LADN.

Further, each apparatus may perform, by using an established PDU session, user data communication supporting URLLC, redundant communication, or user data communication supporting IP address preservation.

Besides, the contents described in the present embodiment can also be applied to a case where the above-mentioned apparatuses are configured as different apparatuses (i.e., different physical hardware, different logical hardware, or different software).

11.1. Registration Procedure

The registration procedure of the present embodiment may be the same as the registration procedure of the seventh embodiment (i.e., the registration procedure of Embodiment 10.1), and thus the description thereof will be omitted. Each apparatus (particularly, the UE_10 and the AMF_210) can transition to a registered state (RM-REGISTERED state) based on completion of the registration procedure. Besides, each apparatus (particularly, the UE_12 and the AMF_212) can transition to a registered state (RM-REGISTERED state) based on completion of the registration procedure.

11.2. PDU Session Establishment Procedure for Establishing a First PDU Session The PDU session establishment procedure for establishing the first PDU session according to the present embodiment may be the same as the PDU session establishment procedure for establishing the first PDU session according to the seventh embodiment (i.e., the PDU session establishment procedure in Embodiment 10.2), and thus the description thereof will be omitted. When the present procedure is completed, each apparatus is in a state where the first PDU session for the DN is established.

11.3. PDU Session Establishment Procedure for Establishing a Second PDU Session Next, each apparatus performs a PDU session establishment procedure in order to establish a second PDU session for the same DN for which the first PDU session is established. Here, the PDU session establishment procedure is also referred to as the present procedure. The present procedure is basically the same as the PDU session establishment procedure of Embodiment 10.3, but the identification information included in the PDU session establishment request message and/or the NAS message and the identification information included in the PDU session establishment accept message are different from the identification information in Embodiment 10.3. However, since there are many parts in common with the description of Embodiment 10.3, the description of the common parts will be omitted, and the description will focus on the different parts. In addition, the apparatuses related to the present procedure are UE_12, gNB_112, AMF_212, SMF_222, UPF_232, and DN_300, which are the same as those in Embodiment 10.3.

First, the UE can transmit a PDU session establishment request message and/or a NAS message including at least one piece of the 3rd, 13rd, 21st, and 23rd to 28th identification information. Here, the NAS message may also be an uplink NAS transport (UL NAS TRANSPORT) message. Further, the contents indicated by the 21st, 23rd to 26th, and 28th identification information may be the same as those in Embodiment 10.3. Besides, the content indicated by the 27th identification information may be the same as that in Embodiment 9.3. In addition, the 27th identification information may be transmitted in association with the 3rd identification information and/or the 13th identification information. Besides, the 27th identification information may be transmitted in association with the 3rd identification information and/or the 13th identification information to indicate that the UE_10 has established the PDU session ID indicated by the 27th identification information.

The UE_12 can notify the network of the contents of the identification information by transmitting the identification information. Besides, the identification information may be included in these messages to indicate a request of the UE_12. Besides, two or more pieces of identification information of the identification information may be configured as one or more pieces of identification information.

When the SMF_222 receives the PDU session establishment request message, SMF_222 can recognize what the UE_12 requests and/or various identification information included in the PDU session establishment request message.

Besides, the SMF_222 and/or the AMF_212 may transmit the PDU session establishment accept message including at least one piece of the 3rd, 13rd, 31st, and 33rd to 38th identification information. Here, the contents indicated by the 31st, 33rd to 36th, and 38th identification information may be the same as those in Embodiment 10.3. Besides, the content indicated by the 37th identification information may be the same as that in Embodiment 9.3. In addition, the 37th identification information may be transmitted in association with the 3rd identification information and/or the 13th identification information. Besides, the 37th identification information may be transmitted in association with the 3rd identification information and/or the 13th identification information to indicate that the UE_10 has established the PDU session ID indicated by the 37th identification information. The SMF_222 and/or the AMF_212 can notify the UE_12 of the contents of the identification information by transmitting at least one piece of the identification information. In addition, the SMF_222 and/or the AMF_212 may indicate, by transmitting the identification information, that the network supports each function or that the request of the UE_12 has been accepted. Further, two or more pieces of identification information of the identification information may be configured as one or more pieces of identification information. In addition, the information indicating the support of each function and information indicating the request for the use of each function may be transmitted and/or received as the same identification information or may be transmitted and/or received as different identification information.

The UE_12 can recognize, by receiving a PDU session establishment accept message, that the request of the UE_12 based on the PDU session establishment request has been accepted and/or the contents of various identification information included in the PDU session establishment accept message.

The differences between the present procedure and the procedure in Embodiment 10.3 are described as above. In addition, the description in Embodiment 10.3 can be applied to the parts not described in the present embodiment.

When the present procedure is completed, each apparatus may be in a state where the second PDU session is established for a DN that is the same as the DN for which the first PDU session has been already established.

The apparatus_20 can perform redundant communication by using the second PDU session established as described above together with the first PDU session.

11.4. Cases where a PDU Session Establishment Procedure for Establishing a Second PDU Session is Restricted from being Performed Immediately after a PDU Session Establishment Procedure for Establishing a First PDU Session is Performed The cases of the present embodiment may be the same as the descriptions in Embodiment 10.4 of the seventh embodiment, and thus the descriptions thereof will be omitted.

11.5. Procedure for Changing a PDU Session Anchor that Provides SSC Mode 3 Second PDU Session The "procedure for changing the PDU session anchor that provides the SSC mode 3 second PDU session" in the present embodiment may be the same as the "procedure for changing the PDU session anchor that provides the SSC mode 3 second PDU session" (i.e., the procedure in Embodiment 10.5) in the seventh embodiment, and thus the description thereof will be omitted.

12. Modified Example

The program running in the apparatuses according to the present invention may be a program that controls a central processing unit (CPU) to operate a computer so as to implement the functions of the embodiment according to the present invention. Programs or information processed by the programs are temporarily stored in a volatile memory such as a random-access memory (RAM), a non-volatile memory such as a flash memory, a hard disk drive (HDD), or other storage device system.

In addition, a program for implementing such functions of the embodiment according to the present invention may be recorded on a computer-readable recording medium. It may be implemented by loading the program recorded on the recording medium into a computer system and executing the program. The "computer system" described herein refers to a computer system built into the apparatuses and includes an operating system and hardware components such as peripheral devices. Besides, the "computer-readable recording medium" may be any of a semiconductor recording medium, an optical recording medium, a magnetic recording medium, a medium dynamically retaining the program for a short time, or any other computer readable recording medium.

Besides, the various functional blocks or various features of the apparatuses used in the above-mentioned embodiments may be installed or performed by a circuit, such as an integrated circuit or multiple integrated circuits. Circuits designed to execute the functions described in the present description may include general-purpose processors, digital signal processors (DSPs), application specific integrated circuits (ASICs), field programmable gate arrays (FPGAs) or other programmable logic devices, discrete gates or transistor logic, discrete hardware components, or any combination of the above. The general-purpose processor may be a microprocessor, or may be a conventional processor, controller, microcontroller, or state machine. The above-mentioned circuit may also include a digital circuit or may include an analog circuit. In addition, in a case that with advances in semiconductor technology, a new circuit integration technology may appear to replace the present technology for integrated circuits, one or more aspects of the present invention may also use a new integrated circuit based on the new circuit integration technology.

In addition, the present invention is not limited to the above-described embodiments. In the embodiments, apparatuses have been described as an example, but the invention of the present application is not limited to these apparatuses and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail with reference to the accompanying drawings, but the specific configuration is not limited to the present embodiments and includes design modification and the like without departing from the scope of the present invention. Besides, various modifications within the scope presented by the claims may be made to the present invention, and embodiments obtained by suitably combining technical means disclosed by the different embodiments may also be included in the technical scope of the present invention. Further, a configuration in which constituent elements, described in the respective embodiments and having mutually the same effects, are substituted for one another may also be included in the technical scope of the present invention.

What is claimed is:

1. A user equipment (UE), comprising:
  one or more processors; and
  at least one non-transitory computer-readable medium coupled to at least one of the one or more processors and storing computer-executable instructions that, when executed by the at least one of the one or more processors, cause the UE to:
  perform a registration procedure;
  receive, during the registration procedure, a registration accept message including a Data Network Name (DNN) and Single Network Slice Selection Assistance Information (S-NSSAI) for Ultra-Reliable and Low Latency Communications (URLLC);
  perform a first Protocol Data Unit (PDU) session establishment procedure for establishing a first PDU session after the registration procedure is completed;
  receive, during the first PDU session establishment procedure, a first PDU session establishment accept message including information indicating that a Session and Service Continuity (SSC) mode for a PDU session for the URLLC is an SSC mode 1;
  establish the first PDU session based on the reception of the first PDU session establishment accept message;
  perform a second PDU session establishment procedure for establishing a second PDU session after the first PDU session establishment procedure is completed;
  transmit, during the second PDU session establishment procedure, a PDU session establishment request message including information indicating that the SSC mode for the PDU session for the URLLC is the SSC mode 1;
  receive a second PDU session establishment accept message as a response to the PDU session establishment request message;
  establish the second PDU session based on the reception of the second PDU session establishment accept message; and
  perform redundant communication by using the first PDU session and the second PDU session.

2. The UE according to claim 1, wherein:
  the first PDU session establishment accept message further includes a back-off timer value and a 5G Session Management (5GSM) cause indicating that establishment of the second PDU session is restricted, and
  the computer-executable instructions, when executed by the at least one of the one or more processors, further cause the UE to:
  when receiving, during the first PDU session establishment procedure, the first PDU session establishment accept message,
  set a timer with the back-off timer value to restrict execution of the second PDU session establishment procedure;
  forgo performing the second PDU session establishment procedure until the timer expires; and
  perform the second PDU session establishment procedure after the timer expires.

3. The UE according to claim 1, wherein:
  the first PDU session establishment accept message further includes a back-off timer value and a 5G Session Management (5GSM) cause indicating that establishment of the second PDU session is restricted, and
  the computer-executable instructions, when executed by the at least one of the one or more processors, further cause the UE to:
  when receiving, during the first PDU session establishment procedure, the first PDU session establishment accept message, set a timer with the back-off timer value to restrict execution of the second PDU session establishment procedure; and
  when receiving a PDU session identification (ID) indicating the second PDU session and a PDU session change command including a 5GSM cause before the timer expires, perform, based on the 5GSM cause, the second PDU session establishment procedure until the timer expires.

4. The UE according to claim 1, wherein:
  during the second PDU session establishment procedure, when receiving, in response to transmitting the PDU session establishment request message, a PDU session establishment reject message that includes a back-off timer value and a 5G Session Management (5GSM) cause indicating that establishment of the second PDU session is restricted, the computer-executable instructions, when executed by the at least one of the one or more processors, further cause the UE to:
  set a timer with the back-off timer value to restrict execution of the second PDU session establishment procedure;
  forgo performing the second PDU session establishment procedure until the timer expires; and
  perform the second PDU session establishment procedure again after the timer expires.

5. The UE according to claim 1, wherein:
the second PDU session establishment accept message includes a back-off timer value and a 5G Session Management (5GSM) cause indicating that establishment of the second PDU session is restricted, and
the computer-executable instructions, when executed by the at least one of the one or more processors, further cause the UE to:
when receiving, during the second PDU session establishment procedure, the second PDU session establishment accept message, set a timer with the back-off timer value to restrict execution of the second PDU session establishment procedure; and
when receiving a PDU session identification (ID) indicating the second PDU session and a PDU session change command including a 5GSM cause before the timer expires, perform the second PDU session establishment procedure again based on the 5GSM cause until the timer expires.

6. A method performed by a user equipment for wireless communication, the method comprising:
performing a registration procedure;
receiving, during the registration procedure, a registration accept message including a Data Network Name (DNN) and Single Network Slice Selection Assistance Information (S-NSSAI) for Ultra-Reliable and Low Latency Communications (URLLC);
performing, after the registration procedure is completed, a first Protocol Data Unit (PDU) session establishment procedure for establishing a first PDU session;
receiving, during the first PDU session establishment procedure, a first PDU session establishment accept message including information indicating that a Session and Service Continuity (SSC) mode for a PDU session for the URLLC is an SSC mode 1;
establishing the first PDU session based on the reception of the first PDU session establishment accept message;
performing a second PDU session establishment procedure for establishing a second PDU session after the first PDU session establishment procedure is completed;
transmitting, during the second PDU session establishment procedure, a PDU session establishment request message including information indicating that the SSC mode for the PDU session for the URLLC is the SSC mode 1;
receiving a second PDU session establishment accept message as a response to the PDU session establishment request message;
establishing the second PDU session based on the reception of the second PDU session establishment accept message; and
performing redundant communication by using the first PDU session and the second PDU session.

7. The method according to claim 6, wherein:
the first PDU session establishment accept message further includes a back-off timer value and a 5G Session Management (5GSM) cause indicating that establishment of the second PDU session is restricted, the method further comprising, when receiving, during the first PDU session establishment procedure, the first PDU session establishment accept message:
setting a timer with the back-off timer value to restrict execution of the second PDU session establishment procedure;
forgo performing the second PDU session establishment procedure until the timer expires; and
performing the second PDU session establishment procedure after the timer expires.

8. The method according to claim 6, wherein:
the first PDU session establishment accept message further includes a back-off timer value and a 5G Session Management (5GSM) cause indicating that establishment of the second PDU session is restricted, the method further comprising:
when receiving, during the first PDU session establishment procedure, the first PDU session establishment accept message, setting a timer with the back-off timer value to restrict execution of the second PDU session establishment procedure; and
when receiving a PDU session identification (ID) indicating the second PDU session and a PDU session change command including a 5GSM cause before the timer expires, performing, based on the 5GSM cause, the second PDU session establishment procedure until the timer expires.

9. The method according to claim 6, further comprising, during the second PDU session establishment procedure, when receiving, in response to transmitting the PDU session establishment request message, a PDU session establishment reject message that includes a back-off timer value and a 5G Session Management (5GSM) cause indicating that establishment of the second PDU session is restricted:
setting a timer with the back-off timer value to restrict execution of the second PDU session establishment procedure;
forgo performing the second PDU session establishment procedure until the timer expires; and
performing the second PDU session establishment procedure again after the timer expires.

10. The method according to claim 6, wherein:
the second PDU session establishment accept message includes a back-off timer value and a 5G Session Management (5GSM) cause indicating that establishment of the second PDU session is restricted, the method further comprising:
when receiving, during the second PDU session establishment procedure, the second PDU session establishment accept message, setting a timer with the back-off timer value to restrict execution of the second PDU session establishment procedure; and
when receiving a PDU session identification (ID) indicating the second PDU session and a PDU session change command including a 5GSM cause before the timer expires, performing the second PDU session establishment procedure again based on the 5GSM cause until the timer expires.

* * * * *